US012608180B2

(12) United States Patent
LaPlante et al.

(10) Patent No.: US 12,608,180 B2
(45) Date of Patent: Apr. 21, 2026

(54) SYSTEM AND METHOD FOR CREATING EXECUTABLE SOFTWARE CODE

(71) Applicant: CitizenDeveloper, LLC, Dauphin, PA (US)

(72) Inventors: Treff LaPlante, Dauphin, PA (US); Drew McLain, Etters, PA (US); Noah Woodley, Austin, TX (US)

(73) Assignee: CITIZENDEVELOPER, LLC, Dauphin, PA (US)

( * ) Notice: Subject to any disclaimer, the term of this patent is extended or adjusted under 35 U.S.C. 154(b) by 282 days.

(21) Appl. No.: 18/480,941

(22) Filed: Oct. 4, 2023

(65) Prior Publication Data

US 2024/0176597 A1 May 30, 2024

Related U.S. Application Data

(60) Provisional application No. 63/428,588, filed on Nov. 29, 2022.

(51) Int. Cl.
*G06F 8/34* (2018.01)

(52) U.S. Cl.
CPC ..................................... *G06F 8/34* (2013.01)

(58) Field of Classification Search
CPC ....................................................... G06F 8/34
USPC ................................................ 717/101–113
See application file for complete search history.

(56) References Cited

U.S. PATENT DOCUMENTS

| 11,681,870 | B2 * | 6/2023 | Bowers | G06F 40/30 |
| | | | | 704/231 |
| 11,775,895 | B2 * | 10/2023 | Bar-on | G06Q 10/063114 |
| | | | | 717/103 |
| 11,875,287 | B2 * | 1/2024 | Vlasov | G06F 3/04817 |
| 2021/0049524 | A1 * | 2/2021 | Nachum | G06Q 10/067 |

OTHER PUBLICATIONS

Atlassian Forums, "I am looking for a JQL to list all stories and subtasks similar to parent and child relationship", 2019, retrieved from https://community.atlassian.com/forums/Jira-questions/I-am-looking-for-a-JQL-to-list-all-stories-and-subtasks-similar/qaq-p/1227382 , 2 pages. (Year: 2019).*
Olga Cheban, "Jira Epic vs Story vs Task: What to Use and When", 2020, TitanApps Blog, https://titanapps.io/blog/epic-vs-story-vs-task/, 15 pages. (Year: 2020).*
Raatikainen et al., "Improved Management of Issue Dependencies in ssue Trackers of Large Collaborative Projects", 2023, IEEE Transactions on Software Engineering, vol. 49, No. 4, pp. 2128-2148. (Year: 2023).*

* cited by examiner

*Primary Examiner* — Ted T. Vo
(74) *Attorney, Agent, or Firm* — MH2 Technology Law Group LLP

(57) ABSTRACT

A method, a computer system, and a non-transitory computer readable medium are disclosed that perform the method including providing a software subtask builder computer-generated user interface, wherein the software subtask builder computer-generated user interface comprises one or more user selectable software subtasks; receiving a first software subtask selection from the one or more user selectable software subtasks provided by the software subtask builder computer-generated user interface; and creating, by a hardware processor, a first computer-executable software subtask application based on the first software subtask.

17 Claims, 73 Drawing Sheets

× each Epic.

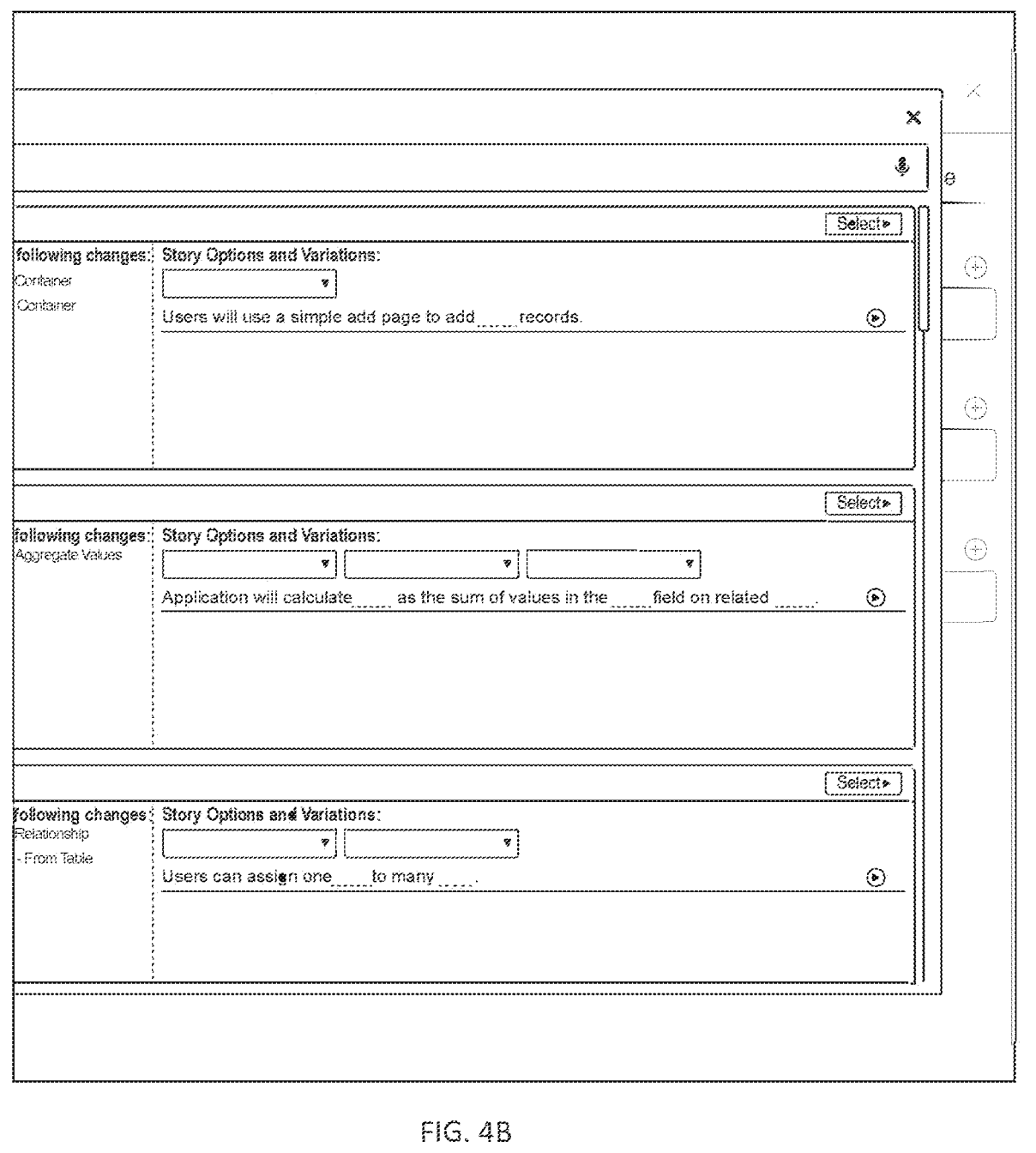

Select▸ following changes: Story Options and Variations:
Container
Container

Users will use a simple add page to add ____ records. ⊙

Select▸ following changes: Story Options and Variations:
Aggregate Values

Application will calculate ____ as the sum of values in the ____ field on related ____. ⊙

Select▸ following changes: Story Options and Variations:
Relationship
- From Table Users can assign one ____ to many ____. ⊙

FIG. 4B

500

Architect Dashboard

Design

Application Summary

Technical
Documentation

Sprint Estimate

License Block Estimate

Total Cost of Ownership

Auto-Implementation

User Story Builder

Story Subject
- ☐ Current Field (4)
- ☐ Current Page (23)
- ☐ Current Table (2)

Story Subject
Data Layer
- ☑ Table (4)
- ☐ Hold (23)
- ☐ Relationship (2)
- ☐ Query (31)

Logic Layer
- ☐ Expression (4)
- ☐ Logic (23)

Presentation Layer
- ☐ UX (4)
- ☐ UI (23)
- ☐ Field (2)
- ☐ Visibility (31)

Confidentiality Layer
- ☐ Security (4)
- ☐ Compliance (23)

Clear filters

Add Custom Story

Natural Language Processor

Create Business Document Table — 502

Common use cases:
- Track Invoices
- Track Purchase Orders
- Track Statements

[ Table ] [ Add + ]

Create Communication Table — 504

Common use cases:
- Store outbound Email and/or SMS History
- Track Internal Messages

[ Table ] [ Add + ]

Create Company Table — 506

Common use cases:
- Store Healthcare Providers
- Store Business Customer Accounts
- Store Vendors
- Store Partner Companies

FIG. 5A (NLP)     ✕

🎤

Select▾

Makes the following changes:
- Create Empty Table
- Create Business Document Fields
- Create Primary CRUD Navigation
- Auto-Increment ID
- Set Creation Time

Story Options and Variations:

| No options to choose from ▾ |

Users can manage records in a Business Document table that stores common business document data. ▶

Select▾

Makes the following changes:
- Create Empty Table
- Create Communication Fields
- Create Primary CRUD Navigation
- Auto-Increment ID
- Set Creation Time

Story Options and Variations:

| No options to choose from ▾ |

Users can manage records in a Communication table that stores common communication data ▶

Select▾

Makes the following changes:
- Create Empty Table
- Create Company Fields
- Create Primary CRUD Navigation
- Auto-Increment ID
- Set Creation Time

Story Options and Variations:

| No options to choose from ▾ |

Users can manage records in a Company table that stores common company data. ▶

FIG. 5B

600

Architect Dashboard

User Story Builder     Natural Language Processor (NLP)

Design

Application Sum

Technical
Documentation

Sprint Estimate

License Block Es

Total Cost of Ow

Auto-Implementa

Create Company Table

Common use cases:
- Store Healthcare Providers
- Store Business Customer Accounts
- Store Vendors
- Store Partner Companies

[ Table ] [ Add + ]

---

Users can manage records in a Company table that stores common
company data.

---

Each record will be called a:

| Company |

Multiple records in this table will be called:

| Companies |

| Action | Story Name | Story |
|--------|-----------|-------|

Includes the following stories:

| | Create Empty Table | Users can |
| | Create Company Fields | The |
| Remove | Primary CRUD Navigation | Users will standard |
| Remove | Auto-Increment Upon Creation | When new |
| Remove | Set Created On Date/Time | When new |
| Add | Set Create By | When new |
| Add | Enable Audit Logs | Whenever |
| Add | Simple Auditing | Will set when a |

Alternates:

| switch | Create Empty Table | Users can |
| switch | Create Event Table | Users can |
| switch | Create System Log Table | The will be |
| switch | Create Other Business Document Table | Users can |

[ Save and Close ]

FIG. 6A

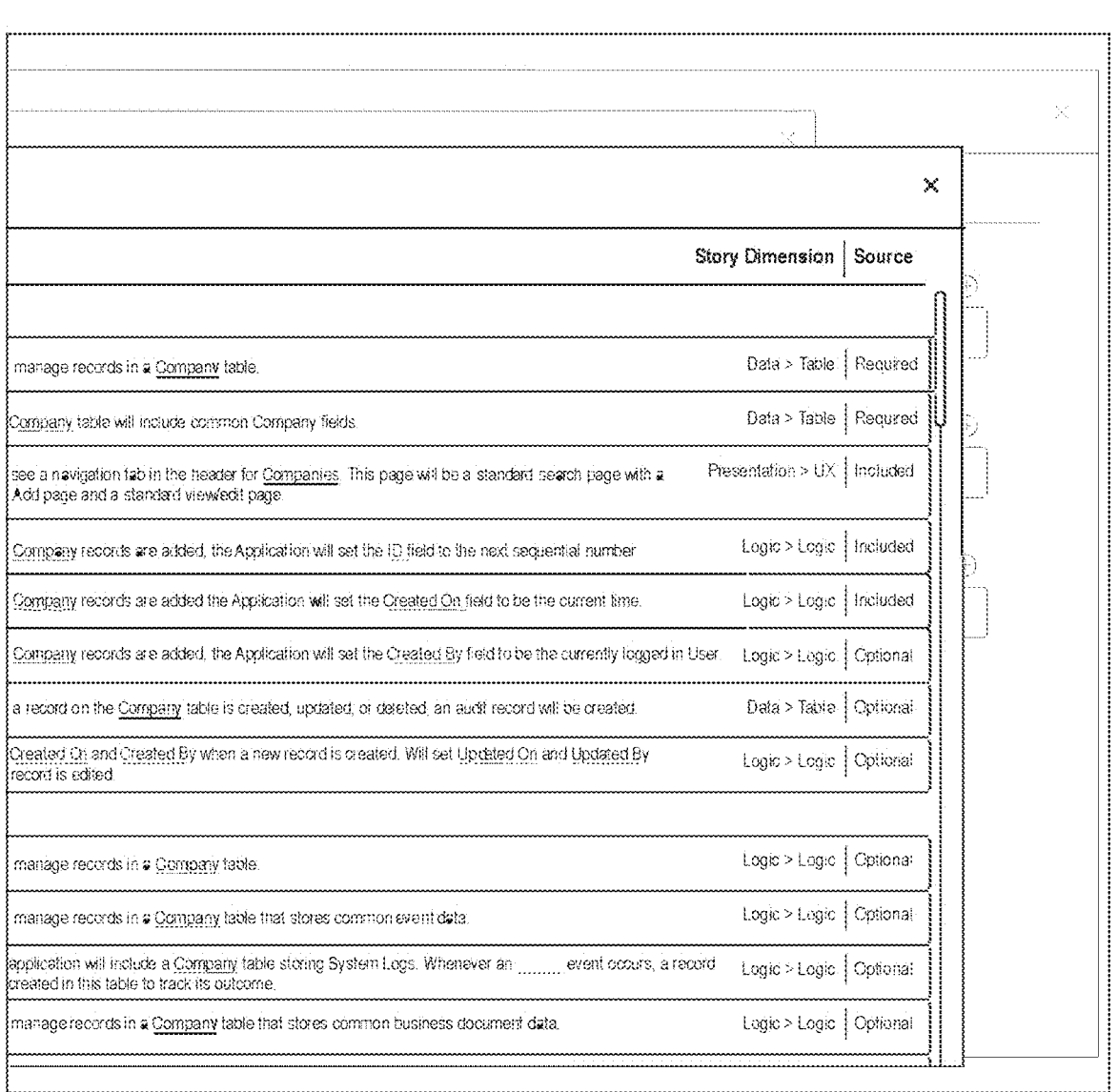

| | Story Dimension | Source |
|---|---|---|
| manage records in a Company table. | Data > Table | Required |
| Company table will include common Company fields. | Data > Table | Required |
| see a navigation tab in the header for Companies. This page will be a standard search page with a Add page and a standard view/edit page. | Presentation > UX | Included |
| Company records are added, the Application will set the ID field to the next sequential number | Logic > Logic | Included |
| Company records are added the Application will set the Created On field to be the current time. | Logic > Logic | Included |
| Company records are added, the Application will set the Created By field to be the currently logged in User | Logic > Logic | Optional |
| a record on the Company table is created, updated, or deleted, an audit record will be created. | Data > Table | Optional |
| Created On and Created By when a new record is created. Will set Updated On and Updated By record is edited | Logic > Logic | Optional |
| manage records in a Company table. | Logic > Logic | Optional |
| manage records in a Company table that stores common event data. | Logic > Logic | Optional |
| application will include a Company table storing System Logs. Whenever an ........ event occurs, a record created in this table to track its outcome. | Logic > Logic | Optional |
| manage records in a Company table that stores common business document data. | Logic > Logic | Optional |

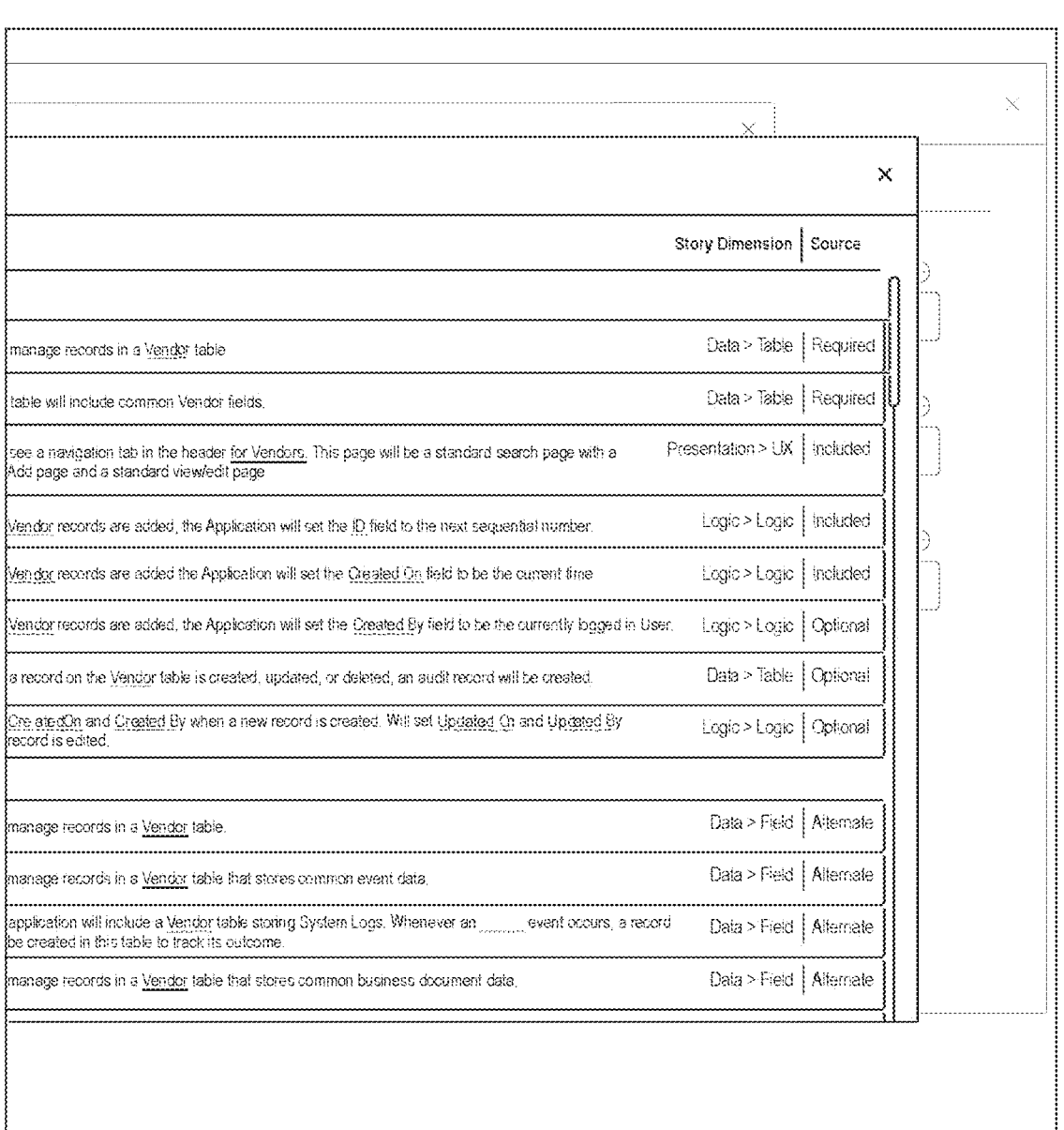

| | Story Dimension | Source |
|---|---|---|
| manage records in a Vendor table | Data > Table | Required |
| table will include common Vendor fields. | Data > Table | Required |
| see a navigation tab in the header for Vendors. This page will be a standard search page with a Add page and a standard view/edit page | Presentation > UX | Included |
| Vendor records are added, the Application will set the ID field to the next sequential number. | Logic > Logic | Included |
| Vendor records are added the Application will set the Created On field to be the current time | Logic > Logic | Included |
| Vendor records are added, the Application will set the Created By field to be the currently logged in User. | Logic > Logic | Optional |
| a record on the Vendor table is created, updated, or deleted, an audit record will be created. | Data > Table | Optional |
| CreatedOn and Created By when a new record is created. Will set Updated On and Updated By record is edited. | Logic > Logic | Optional |
| manage records in a Vendor table. | Data > Field | Alternate |
| manage records in a Vendor table that stores common event data. | Data > Field | Alternate |
| application will include a Vendor table storing System Logs. Whenever an _____ event occurs, a record be created in this table to track its outcome. | Data > Field | Alternate |
| manage records in a Vendor table that stores common business document data. | Data > Field | Alternate |

FIG. 7B

800

Architect Dashboard

Design

Application Summary

Technical
Documentation

Sprint Estimate

License Block Estimate

Total Cost of Ownership

Auto-Implementation

| Action | Story Name | Story |
|---|---|---|

Managing Vendors  Users can select and recommend different Vendors to determine who

| | Create Company Table | Users can manage records in a Vendor table that stores |
| ○ | Create Selection with Pre-Defined Options | Users can select one Billing Status for a Vendor from |

Managing Invoices  Users can issue, receive, log, and send bills for the products or

| | Create Invoice Table | Users can Create, Read, Update and Delete (CRUD) |
| | Create Assignment | Users can assign one Vendor to many Invoices. |

Managing Payments  Users can process and log the payments made against Invoices.

| | Create Transaction Table | Users can Create, Read, Update and Delete (CRUD) |
| | Create Assignment | Users can assign one Invoice to many Payments. |
| | Aggregate Value | Application will calculate Payment Amount as the sum of |

Add Epic

Wireframe Notes

Many stories have now been added. In one of those stories the
user had not answered all the configuration questions.

FIG. 8A

Figure 8B:
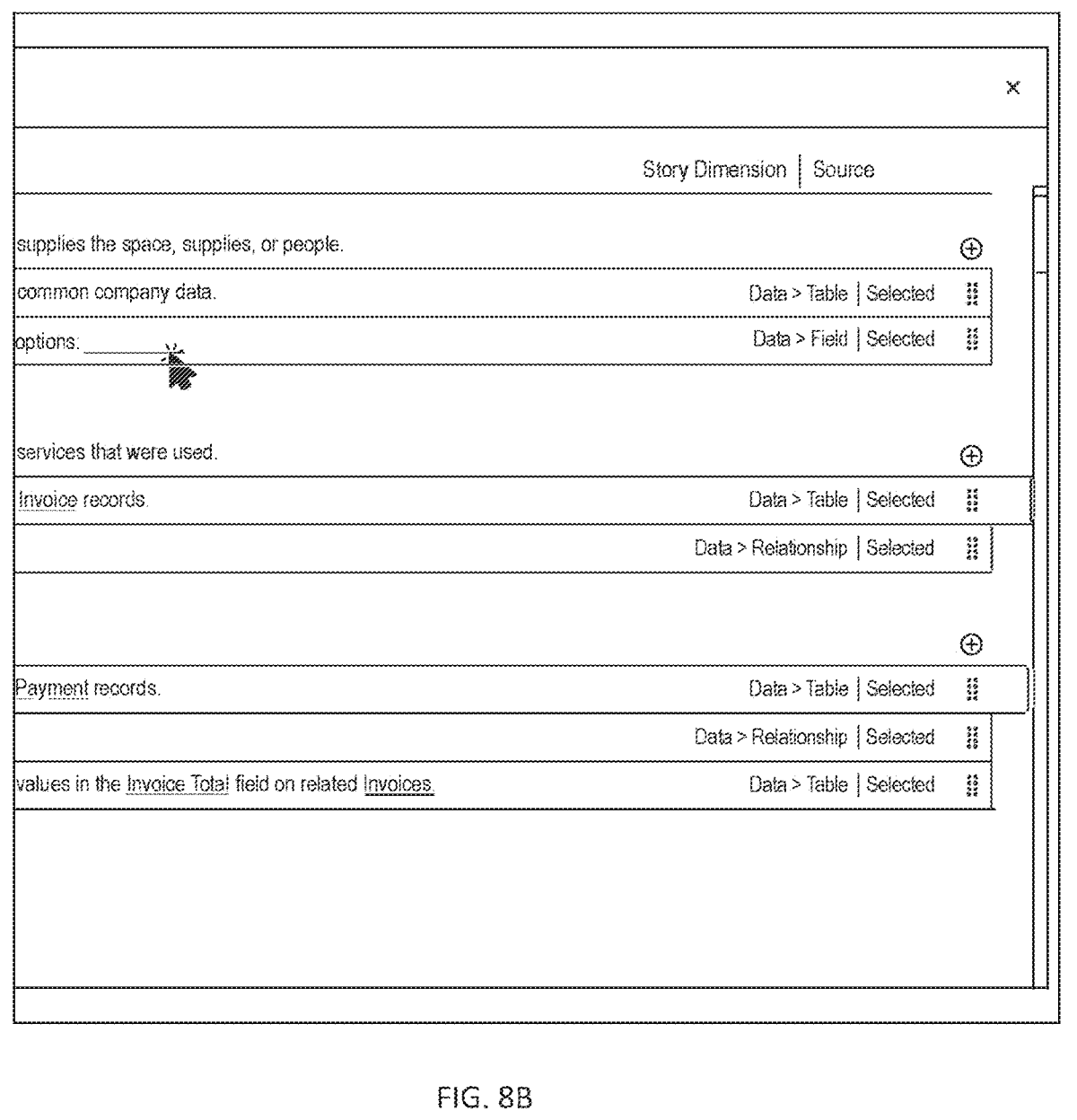

| | Story Dimension | Source |
|---|---|---|
| supplies the space, supplies, or people. | | ⊕ |
| common company data. | Data > Table | Selected ⋮⋮ |
| options. | Data > Field | Selected ⋮⋮ |
| services that were used. | | ⊕ |
| Invoice records. | Data > Table | Selected ⋮⋮ |
| | Data > Relationship | Selected ⋮⋮ |
| | | ⊕ |
| Payment records. | Data > Table | Selected ⋮⋮ |
| | Data > Relationship | Selected ⋮⋮ |
| values in the Invoice Total field on related Invoices. | Data > Table | Selected ⋮⋮ |

Architect Dashboard

Create Selection with Pre-Defined Options

Design

Application Sum

Technical
Documentation

Sprint Estimate

License Block E

Total Cost of Ov

Auto-Implement

Common use cases:
• Track statuses that are not
  expected to change
• Track yes and no questions
• Track gender

[Field] [Add +]

Users can select one Billing Status for a Vendor from options: Pending,
Complete, Canceled How many options should users be able to select?
○ one
○ many What should this field be named?

Billing Status

On which table should this field be tracked?

Vendor                                    ⌄

On which table should this field be tracked?

Pending, Complete, Canceled

Save and Close ⌄

| Action | Story Name |
| --- | --- |

Includes the following stories:

Create Field

Set Static Selection Field
Options

Set the Edit Variant for a Static
Selection Field

[Remove]  Color-Coded Selection

Alternates:

[switch]  Create Selection with Options
          from Table

[switch]  Create Short Text Field

FIG. 9A

Architect Dashboard

| Action | Story Name | Story |
|---|---|---|

Managing Vendors Users can select and recommend different Vendors to determine who

| | Create Company Table | Users can manage records in a Vendor table that stores |
|---|---|---|
| | Create Selection with Pre-Defined Options | Users can select one Billing Status for a Vendor from |

Managing Invoices Users can issue, receive, log, and send bills for the products or services

| | Create Invoice Table | Users can Create, Read, Update and Delete (CRUD) |
|---|---|---|
| | Create Assignment | Users can assign one Vendor to many Invoices. |

Managing Payments Users can process and log the payments made against Invoices.

| | Create Transaction Table | Users can Create, Read, Update and Delete (CRUD) |
|---|---|---|
| | Create Assignment | Users can assign one Invoice to many Payments. |
| | Aggregate Value | Application will calculate Payment Amount as the sum of |

Design

Application Summary

Technical Documentation

Sprint Estimate

License Block Estimate

Total Cost of Ownership

Auto-Implementation

Add Epic

Wireframe Notes

The incomplete story has now been saved, closed, and resolved.

FIG. 10A

Figure 10B:
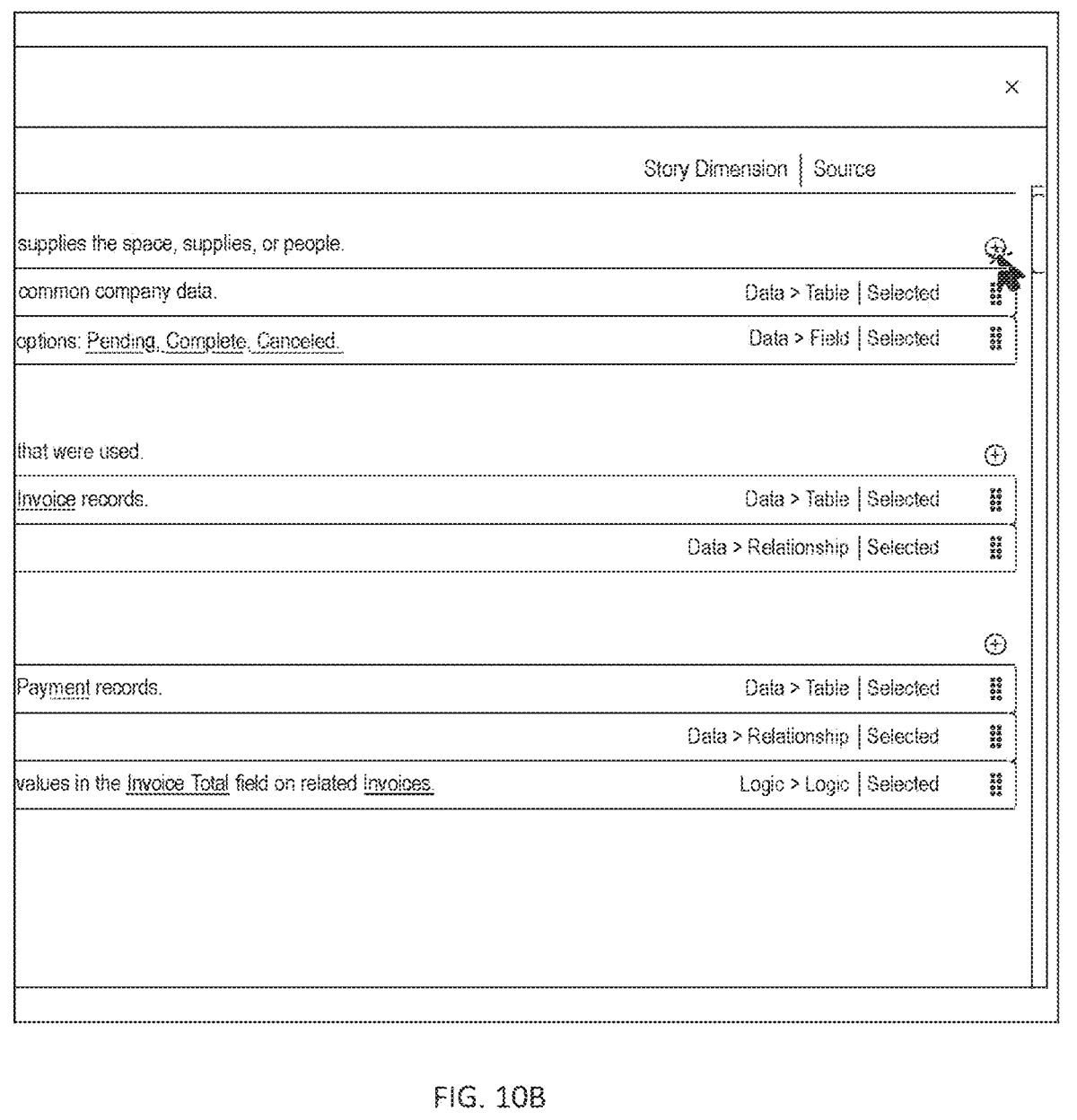

| | Story Dimension | Source |
|---|---|---|
| supplies the space, supplies, or people. | | |
| common company data. | Data > Table | Selected |
| options: Pending, Complete, Canceled. | Data > Field | Selected |
| that were used. | | |
| Invoice records. | Data > Table | Selected |
| | Data > Relationship | Selected |
| Payment records. | Data > Table | Selected |
| | Data > Relationship | Selected |
| values in the Invoice Total field on related Invoices. | Logic > Logic | Selected |

Architect Dashboard

Design

Application Summary

Technical
Documentation

Sprint Estimate

License Block Estimate

Total Cost of Ownership

Auto-implementation

---

User Story Builder

Story Subject
- ☐ Current Field          (4)
- ☐ Current Page          (23)
- ☐ Current Table          (2)

Story Subject
*Data Layer*
- ☐ Table          (4)
- ☐ Hold          (23)
- ☐ Relationship          (2)
- ☐ Query          (31)

*Logic Layer*
- ☐ Expression          (4)
- ☐ Logic          (23)

*Presentation Layer*
- ☐ UX          (4)
- ☐ UI          (23)
- ☐ Field          (2)
- ☐ Visibility          (31)

*Confidentiality Layer*
- ☐ Security          (4)
- ☐ Compliance          (23)

Clear filters

Add Custom Story

---

Natural Language Processor (NLP)

Create Add Page - Simple

| | Makes the following changes: • Create Field Container • Attach Fields to Container |

| UX | Add + |

Aggregate Value

| Common use cases: • Set Invoice Total as the sum of Line Items • Count the number of Employees for each Company • Calculate Average Event Duration by Event Type | Makes the following changes: • Create Logic to Aggregate Values |

| Logic | Add + |

Create Assignment

| Common use cases: • Assign a Task Owner to Tasks • Assign Contacts to Accounts | Makes the following changes: • Create Relationship • Create Selection - From Table |

Architect Dashboard

Design

Application Summary

Technical
Documentation

Sprint Estimate

License Block Estimate

Total Cost of Ownership

Auto-Implementation

User Story Builder

Story Subject
- Current Field　(4)
- Current Page　(23)
- Current Table　(2)

Story Subject
Data Layer
- Table　(4)
- Hold　(23)
- Relationship　(2)
- Query　(31)

Logic Layer
- Expression　(4)
- Logic　(23)

Presentation Layer
- UX　(4)
- UI　(23)
- Field　(2)
- Visibility　(31)

Confidentiality Layer
- Security　(4)
- Compliance　(23)

Clear filters

Add Custom Story

Natural Language Processor (NLP)

Create Add Page - S

[ UX ]　[ Add + ]

Aggregate Value

Common use cases:
- Set Invoice Total as the s
- Count the number of Em
  Company
- Calculate Average Event

[ Logic ]　[ Add + ]

Create Assignment

Common use cases:
- Assign a Task Owner to Tasks
- Assign Contacts to Accounts

Makes the following changes:
- Create Relationship
- Create Selection - From Table

Add Custom Story

User Story Name:

Color-Coding Status

Short Description:

Users will see color-coded Vendors
Status. Vendors in "In Good Standing"
vendors in "In Breach" status will be
"Canceled" status will be red.

*200 character limit*

Architect Dashboard

Design

Application Summary

Technical
Documentation

Sprint Estimate

License Block Estimate

Total Cost of Ownership

Auto-Implementation

| Action | Story Name | Story |
|--------|-----------|-------|

Managing Vendors    Users can select and recommend different Vendors to determine who

| Create Company Table | Users can manage records in a Vendor table that stores |
| Create Selection with Pre-Defined Options | Users can select one Billing Status for a Vendor from options |
| Color-Coding Status | Users will see color-coded Vendors according to their Billing "In Breach" status will be orange, and vendors in "Canceled" |

Managing Invoices Users can issue, receive, log, and send bills for the products or services

| Create Invoice Table | Users can Create, Read, Update and Delete (CRUD) Invoice |
| Create Assignment | Users can assign one Vendor to many Invoices. |

Managing Payments Users can process and log the payments made against Invoices.

| Create Transaction Table | Users can Create, Read, Update and Delete (CRUD) |
| Create Assignment | Users can assign one Invoice to many Payments. |
| Aggregate Value | Application will calculate Payment Amount as the sum of |

Add Epic

Wireframe Notes

A custom story has now been added.

FIG. 13A

Figure 13B:
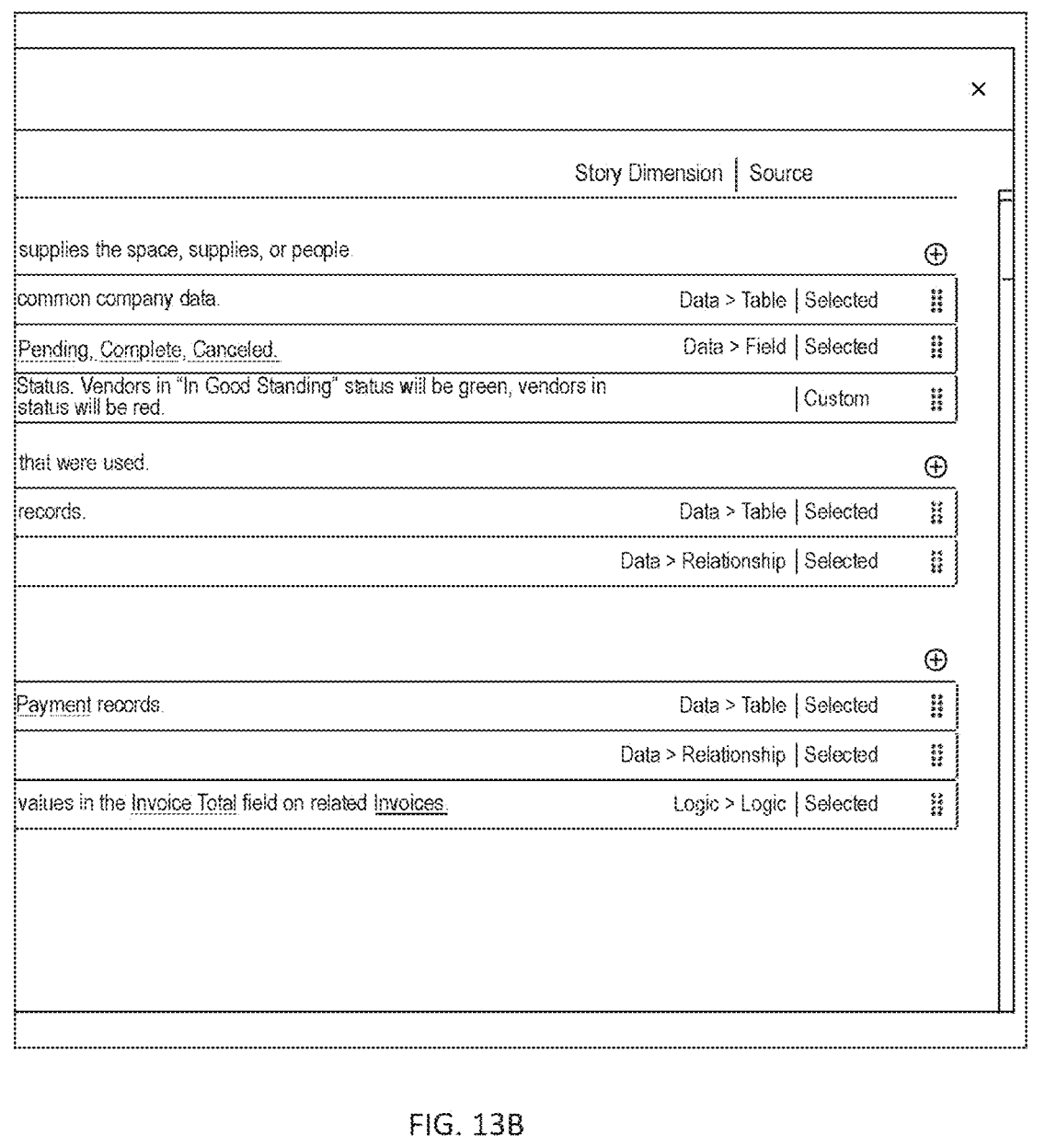

| | Story Dimension | Source | |
|---|---|---|---|
| supplies the space, supplies, or people. | | | ⊕ |
| common company data. | Data > Table | Selected | ⠿ |
| Pending, Complete, Canceled. | Data > Field | Selected | ⠿ |
| Status. Vendors in "In Good Standing" status will be green, vendors in status will be red. | | Custom | ⠿ |
| that were used. | | | ⊕ |
| records. | Data > Table | Selected | ⠿ |
| | Data > Relationship | Selected | ⠿ |
| | | | ⊕ |
| Payment records. | Data > Table | Selected | ⠿ |
| | Data > Relationship | Selected | ⠿ |
| values in the Invoice Total field on related Invoices. | Logic > Logic | Selected | ⠿ |

Architect Dashboard

Design

Application Sum

Technical
Documentation

Sprint Estimate

License Block E

Total Cost of Ow

Auto-Implement

Create Company Table

Common use cases:
• Store Healthcare Providers
• Store Business Customer Accounts
• Store Vendors
• Store Partner Companies

[ Table ] [ Add + ]

- - - - - - - - - - - - - - - - - - - - - - - - - - - - - - - - - - - - -

Users can manage records in a Vendor table that stores common company data.

- - - - - - - - - - - - - - - - - - - - - - - - - - - - - - - - - - - - -

Each record will be called a:

| Vendor |

Multiple records in this table will be called:

| Vendors |

[ Save and Close ]

| Action | Story Name |
|--------|------------|

Includes the following stories:

| | Create Empty Table |
| | Create Vendor Fields |
| Remove | Primary CRUD Navigation |
| Remove | Auto-Increment Upon Creation |
| Remove | Set Created On Date/Time |
| Add | Set Create By |
| Add | Enable Audit Logs |
| Add | Simple Auditing |

Alternates:

| switch | Create Empty Table |
| switch | Create Event Table |
| switch | Create System Log Table |
| switch | Create Other Business Document Table |

FIG. 14A

| Story | Story Dimension | Source |
|---|---|---|
| Users can manage records in a Vendor table. | Data > Table | Required |
| The Vendor table will include common Vendor fields. | Data > Table | Required |
| Users will see a navigation tab in the header for Vendors. This page will be a standard search page with a standard Add page and a standard view/edit page. | Presentation > UX | Included |
| When new Vendor records are added, the Application will set the ID field to the next sequential number. | Logic > Logic | Included |
| When new Vendor records are added the Application will set the Created On field to be the current time. | Logic > Logic | Included |
| When new Vendor records are added, the Application will set the Created By field to be the currently logged in User. | Logic > Logic | Optional |
| Whenever a record on the Vendor table is created, updated, or deleted, an audit record will be created. | Data > Table | Optional |
| Will set Created On and Created By when a new record is created. Will set Updated On and Updated By when a record is edited. | Logic > Logic | Optional |
| Users can manage records in a Vendor table. | Data > Field | Alternate |
| Users can manage records in a Vendor table that stores common event data. | Data > Field | Alternate |
| The application will include a Vendor table storing System Logs. Whenever an _____ event occurs, a record will be created in this table to track its outcome. | Data > Field | Alternate |
| Users can manage records in a Vendor table that stores common business document data. | Data > Field | Alternate |

Architect Dashboard

Design

Application Sumr

Technical
Documentation

Sprint Estimate

License Block Es

Total Cost of Ow

Auto-Implementa

Create Company Table > Create Primary CRUD Navigation

| UX | Add + |

Users will see a navigation tab in the header for Vendors. This page
will be a standard search page with a standard Add page and a
standard view/edit page.

What table should be managed with this Navigation?

Vendor ▾

What should the name of the tab in Navigation tabs be?

Vendors

| Action | Story Name |
|---|---|

Includes the following stories:

Create Search Page - List

Add Single Tab to Navigation
Tabs

Create Standard View/Edit
Page

| Remove | Create Standard Add Page |

Alternates:

| switch | Create Admin CRUD Navigation |
| switch | Create Simple CRUD Navigation |
| switch | Create Secondary CRUD |

Save and Close

FIG. 15A

| Story | Story Dimension | Source |
|---|---|---|
| Users will see a simple search page for Vendor with an Add Button, and a Standard List with the label Search all Vendors. | Presentation > UX | Required |
| The Vendor -_____ navigation tabs fields will show a new single tab. | Presentation > Field | Required |
| Users will see a view link for Vendor that when clicked, will open an inline page for the record. This page will have standard details at the top, with sub navigation tabs that contains standard lists. | Presentation > UX | Required |
| Users will use a standard add page to add Vendor records. | Presentation > UX | Included |
| Users will see a left-hand tab in the Admin navigation tab for Vendor. This tab will have an Admin List, and Add Button, and a Delete button. | Presentation > UX | Alternate |
| To perform CRUD operations on Vendor, users will have a view link, a simple Add Page, and a Simple View/Edit Page. | Presentation > UX | Alternate |
| To perform CRUD operations on Vendor, users will have a view link, a standard Add Page, and a standard View/ Edit Page. | Presentation > UX | Alternate |

FIG. 15B

1600

Architect Dashboard

Design

Application Summ

Technical
Documentation

Sprint Estimate

License Block Es

Total Cost of Ow

Auto-Implementa

Create Company Table > Create Primary CRUD Navigation > Create Search

| Action | Story Name |
| --- | --- |

Includes the following stories:

Create Empty Page

Create List Field

[Remove] Create Add Button

[Add] Create Delete Button

Users will see a standard search page for Vendor with the label
Search All Vendors and Sub Navigation Tabs.

Alternates:

[switch] Create Search Page - Sub - Tabs

[switch] Create Search Page - Calendar

[switch] Create Search Page - Map

What table should this page search?

Vendor ▼

This page should be named:

Search All Vendors

What records should be shown in the list?

▼

What fields should be shown as columns?

▼

What page should the Add Button open?

▼

[UX] [Add +]

Save and Close

FIG. 16A

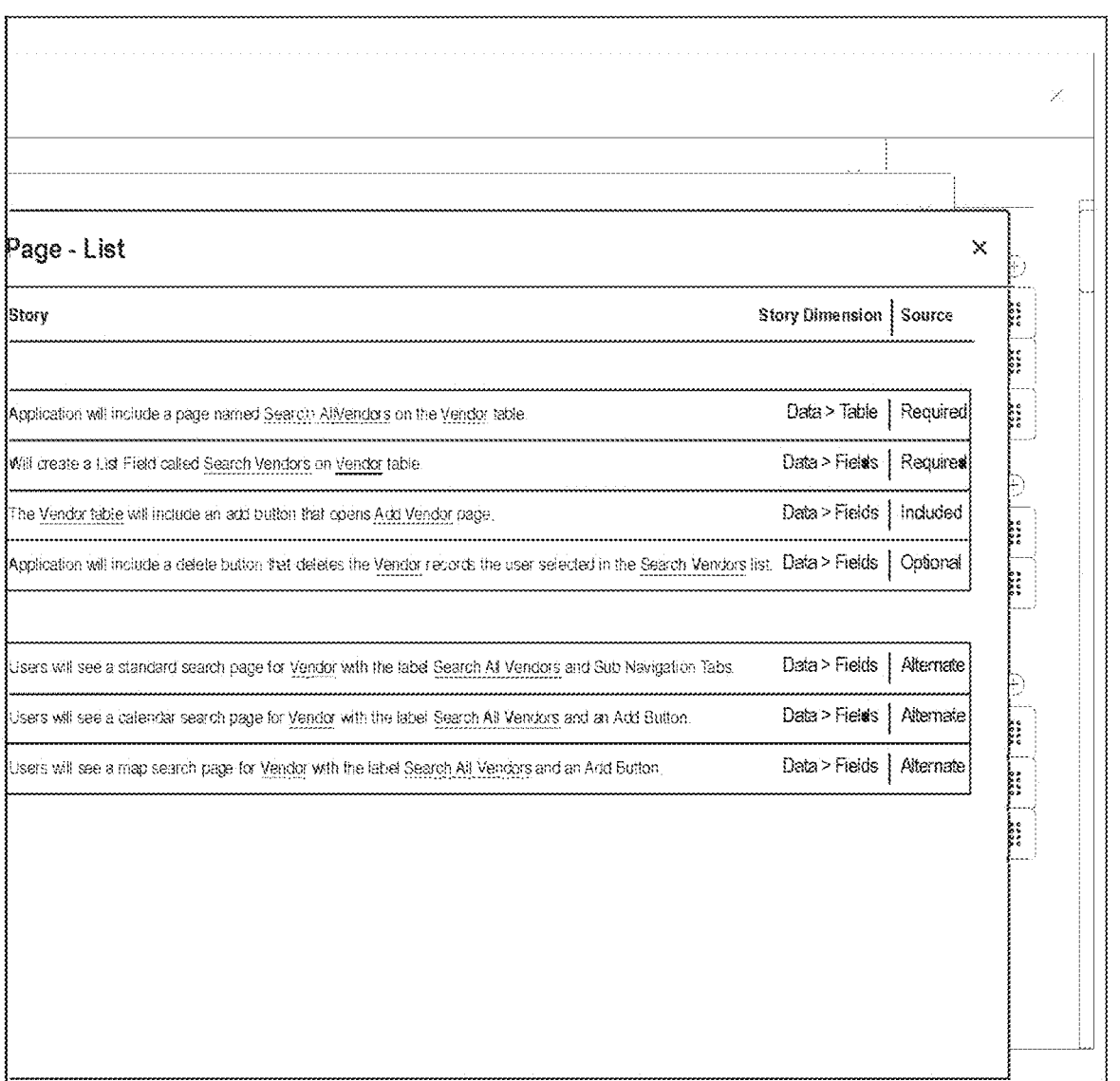

| Story | Story Dimension | Source |
|---|---|---|
| Application will include a page named Search AllVendors on the Vendor table. | Data > Table | Required |
| Will create a List Field called Search Vendors on Vendor table | Data > Fields | Required |
| The Vendor table will include an add button that opens Add Vendor page. | Data > Fields | Included |
| Application will include a delete button that deletes the Vendor records the user selected in the Search Vendors list. | Data > Fields | Optional |
| Users will see a standard search page for Vendor with the label Search All Vendors and Sub Navigation Tabs. | Data > Fields | Alternate |
| Users will see a calendar search page for Vendor with the label Search All Vendors and an Add Button. | Data > Fields | Alternate |
| Users will see a map search page for Vendor with the label Search All Vendors and an Add Button. | Data > Fields | Alternate |

Page - List

Architect Dashboard

| Design | Cr... |
|---|---|

Application Summ

Technical
Documentation

Sprint Estimate

License Block Es

Total Cost of Ow

Auto-Implementa

Create Company Table > Create Primary CRUD Navigation > Create Search

[UX]  [Add +]

-----------------------------------------------

Users will see a standard search page for Vendor with the label
Search All Vendors and an Add Button.

-----------------------------------------------

What table should this page search?

Vendor                              ▼

This page should be named:

Search All Vendors

What records should be shown in the map?

All Records in Table                ▼

What fields stores the Address for each Pin?

Physical Address                    ▼

What page should the Add Button open?

Add Vendor                          ▼

Save and Close

| Action | Story Name |
|---|---|
| | Includes the following stories: |
| | Create Empty Page |
| | Create Map Field |
| | Set Pins to Display Map |
| Remove | Create Add Button |
| Add | Show Clusters on Map for Close Pins |
| Add | Set Shapes to Display on Map |
| Add | Center a Map when it Loads |
| Add | Keyword User Search |
| Add | Multiple User Search Values |
| Add | Address Radius User Search |
| Add | Data User Search |
| Add | Additional Dialog for User Search |
| Add | Selection Pre-Filter |
| | Alternates: |
| switch | Create Search Page - List |

FIG. 17A

Page - Map

| Story | Story Dimension | Source |
|---|---|---|
| Application will include a page named Search All Vendors on the Vendor table. | Data > Table | Required |
| Will create a map field called Search Vendors on Vendor Table | Data > Fields | Required |
| Set records to display as pins on Vendor - ____ map field | Presentation > Fields | Required |
| The Vendor table will include an add button that opens Add Vendors page | Data > Fields | Included |
| Show a cluster on a map when pins are grouped closely together for Vendor - ____ map field. | Presentation > Fields | Optional |
| Set shapes to display on Vendor - ____ map field | Presentation > Fields | Optional |
| When Vendor - ____ map field first loads, it will be centered on a specific location. | Presentation > Fields | Optional |
| Users will see a text box and a search button. | Presentation > UX | Optional |
| Users will see multiple filters with Apply and Reset buttons | Presentation > UX | Optional |
| Users will see a drop-down with options for No Selection, Current Location, and Address I Enter. In the Address Enter selection, users will see an address and radius. Below the dropdown, users will see Apply and Reset button | Presentation > UX | Optional |
| Users will see a static radio selection with options for Today, Tomorrow, and Date. Below the Date option, users will see a Start Date and End Date, and Apply and Reset buttons. | Presentation > UX | Optional |
| Users will see a View More Filters button that opens a dialog with filters, Apply and Reset Buttons | Presentation > UX | Optional |
| Users will see a static radio selection with options matching Vendor - _____ , and Apply and Reset buttons | Presentation > UX | Optional |
| Users will see a standard search page for Vendor with the label Search All Vendors and Sub Navigation Tabs. | Presentation > UX | Alternate |

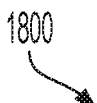

Architect Dashboard

| | |
|---|---|
| Design | Action  | Story Name   | Story |
| Application Summary | |
| Technical Documentation | Managing Vendors   Users can select and recommend different Vendors to determine who |
| Sprint Estimate | Create Company Table     Users can manage records in a Vendor table that stores |
| License Block Estimate | Create Selection with Pre-Defined Options     Users can select one Billing Status for a Vendor from |
| Total Cost of Ownership | Color-Coding Status     Users will see color-coded Vendors according to their "In Breach" status will be orange, and vendors in |
| Auto-Implementation | Managing Invoices   Users can issue, receive, log, and send bills for the products or services |
| | Create Invoice Table     Users can Create, Read, Update and Delete (CRUD) |
| | Create Assignment     Users can assign one Vendor to many Invoices. |
| | |
| | Managing Payments   Users can process and log the payments made against Invoices. |
| | Create Transaction Table     Users can Create, Read, Update and Delete (CRUD) |
| | Create Assignment     Users can assign one Invoice to many Payments. |
| | Aggregate Value     Application will calculate Payment Amount as the sum of |
| | Add Epic |

Wireframe Notes

Each story dialog had been individually saved and closed. The last story, the core story, was also saved and updated.

FIG. 18A

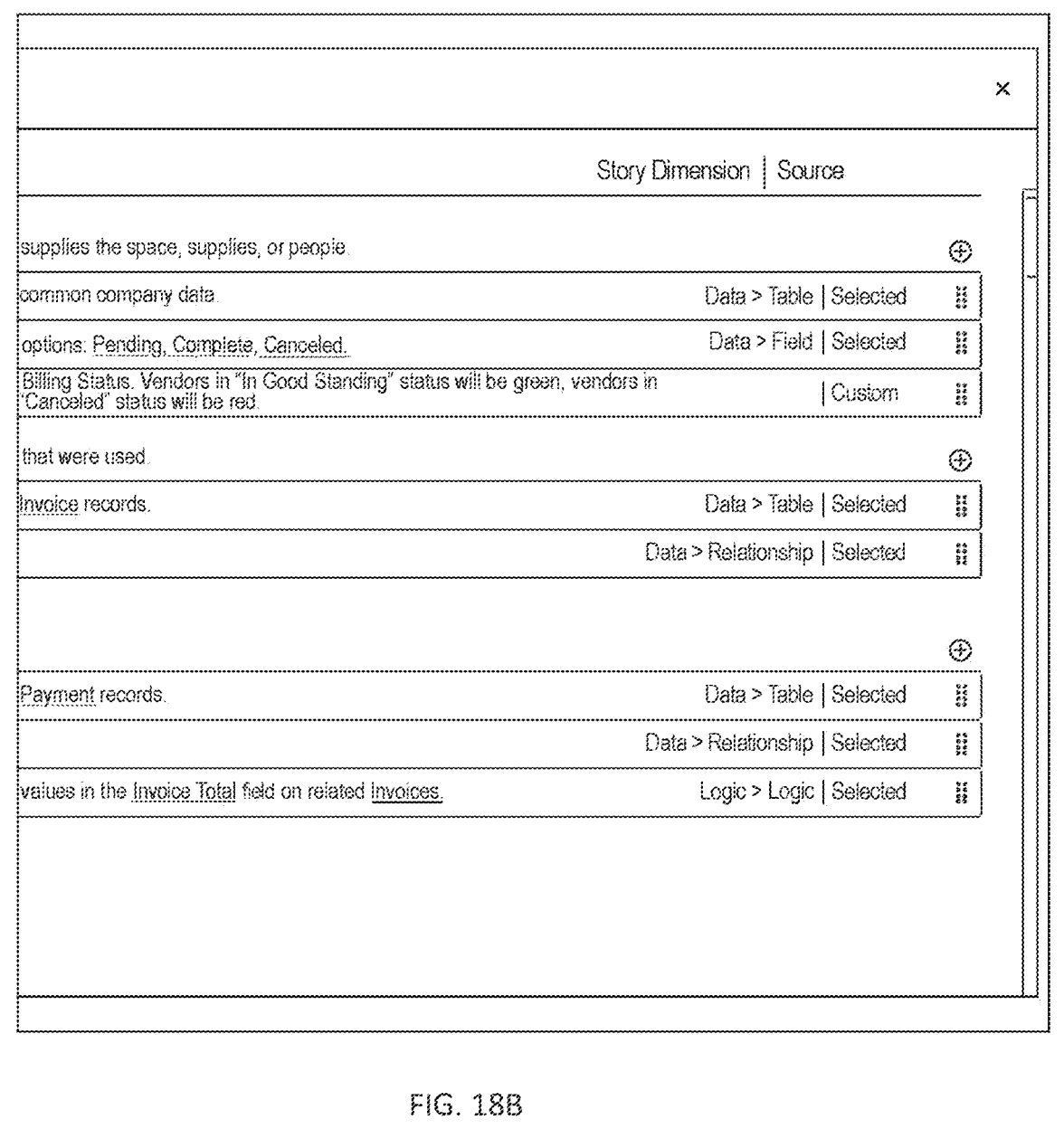

| | Story Dimension | Source | |
|---|---|---|---|
| supplies the space, supplies, or people. | | | ⊕ |
| common company data. | | Data > Table │ Selected | ⁝⁝ |
| options: Pending, Complete, Canceled. | | Data > Field │ Selected | ⁝⁝ |
| Billing Status. Vendors in "In Good Standing" status will be green, vendors in "Canceled" status will be red. | | │ Custom | ⁝⁝ |
| that were used. | | | ⊕ |
| Invoice records. | | Data > Table │ Selected | ⁝⁝ |
| | | Data > Relationship │ Selected | ⁝⁝ |
| | | | ⊕ |
| Payment records. | | Data > Table │ Selected | ⁝⁝ |
| | | Data > Relationship │ Selected | ⁝⁝ |
| values in the Invoice Total field on related Invoices. | | Logic > Logic │ Selected | ⁝⁝ |

FIG. 18B

1900

Architect Dashboard

| Design | Data View ⌄ | | |
|---|---|---|---|
| Application Summary | Table / Field | Table / Field Story | Field Type |
| Technical Documentation | ╋ Application | | |
| | ╋ Installation | | |
| Sprint Estimate | — Invoice | Business Document | |
| License Block Estimate | | | |
| Total Cost of Ownership | Vendor | Common Details | Selection - Dynamic |
| | Due Date | Common Details, Event End Date | Date |
| _____ | Invoice Date | Common Details | Date |
| Auto-Implementation | Invoice Number | Common Details, Table Name | Short Text |
| | Invoice Total | Common Details | Currency |
| | Created By | Created By | Selection - Dynamic |
| | Created On | Created On | Date/Time |
| | ╋ Payment | Transaction | |
| | ╋ User | | |
| | ╋ Vendor | Company | |

Wireframe Notes
These list columns are yet to be decided.

FIG. 19A

| Table Interaction Story | Appearance Story | Logic Story | Visibility Story | Security Story | |
|---|---|---|---|---|---|
| | Navigation - Administration | | | Administrator Only | ⊕ |
| | Navigation - Administration | | | Administrator Only | ⊕ |
| Invoices can have one Vendor Invoices can have one Payment | Navigation - Primary | | | | ⊕ |
| | | | | | ⊕ |
| | | | | | ⊕ |
| | | | | | ⊕ |
| | | Increment ID | View Only | | ⊕ |
| | | | | | ⊕ |
| | | Set Created By | View Only | | ⊕ |
| | | Set Created On | View Only | | ⊕ |
| Payments can have many Invoices | Navigation - Primary | | | | ⊕ |
| | Navigation - Administration | | | Administrator Only | ⊕ |
| Vendors can have many Invoices | Navigation - Primary | | | | ⊕ |

FIG. 19B

2000

Architect Dashboard

Design

Application Summary

Technical
Documentation

Sprint Estimate

License Block Estimate

Total Cost of Ownership

Auto-Implementation

Appearance View

| Table / Field | Table Story | Table Interaction Story |
|---|---|---|
| + Application | | |
| + Installation | | |
| — Invoice | Business Document | Invoices can have one Vendor<br>Invoices can have one Payment |
| Search Invoices | | |
| Add Invoice | | |
| Invoice Details | | |
| + Payment | Transaction | Payments can have many Invoices |
| + User | | |
| + Vendor | Company | Vendors can have many Invoices |

Wireframe Notes
These list columns are yet to be decided.

FIG. 20A

| Appearance Story | Logic Story | Visibility Story | Security Story | |
|---|---|---|---|---|
| Navigation - Administration | | | Administrator Only | ⊕ |
| Navigation - Administration | | | Administrator Only | ⊕ |
| Navigation - Primary | | | | ⊕ |
| Search Page - List | | | | ⊕ |
| Add Page - Simple Dialog | Increment ID | | | ⊕ |
| View/Edit Page - Simple Dialog | | | | ⊕ |
| Navigation - Primary | | | | ⊕ |
| Navigation - Administration | | | Administrator Only | ⊕ |
| Navigation - Primary | | | | ⊕ |

FIG. 20B

2100

Architect Dashboard

| Design | |
|---|---|
| Application Summary | |
| Technical Documentation | |
| Sprint Estimate | |
| License Block Estimate | |
| Total Cost of Ownership | |
| ——————— | |
| Auto-implementation | |

Logic View ▼

| Table / Function | Table Story | Table Interaction Story |
|---|---|---|
| + Application | | |
| + Installation | | |
| — Invoice | Business Document | Invoices can have one Vendor Invoices can have one Payment |
| Increment ID | | |
| Set Created By/On | | |
| + Payment | Transaction | Payments can have many Invoices |
| + User | | |
| + Vendor | Company | Vendors can have many Invoices |
| + Scheduled Logic | | |
| + Incoming API Methods | | |

Wireframe Notes
These list columns are yet to be decided.

FIG. 21A

| | | | | |
|---|---|---|---|---|
| ✕ | | | | |

| Appearance Story | Logic Story | Visibility Story | Security Story | ⊕ |
|---|---|---|---|---|
| Navigation - Administration | | | Administrator Only | ⊕ |
| Navigation - Administration | | | Administrator Only | ⊕ |
| Navigation - Primary | | | | ⊕ |
| | Increment ID | | | ⊕ |
| | Set Created By/On | | | ⊕ |
| Navigation - Primary | | | | ⊕ |
| Navigation - Administration | | | Administrator Only | ⊕ |
| Navigation - Primary | | | | ⊕ |
| | | | | ⊕ |
| | | | | ⊕ |

Search Stories

| | | | application.citizendeveloper.com |
|---|---|---|---|
| ○ ○ ○ | | | |

| [Application Logo] | [Dashboard Tab] | [Primary CRUD Tab] | [Primary CRUD Tab] |
|---|---|---|---|

User Story Builder

Story Dimension

Data Layer
☐ Table
☐ Field
☐ Relationship
☐ Query

Logic Layer
☐ Expression
☐ Logic

Presentation Layer
☐ UX
☐ UI
☐ Field
☐ Visibility

Confidentiality Layer
☐ Security
☐ Compliance

[ Search ]

All Stories

| ☐ | [View Story] | Story Tags | Story Text |
|---|---|---|---|
| ☐ | [Story Name] | [Operation Tag], [Dimension Tag] | Lorem ipsum dolor sit amet_____ . |
| ☐ | [Story Name] | [Operation Tag], [Dimension Tag] | Lorem _____dolor sit amet consectetur do... |
| ☐ | [Story Name] | [Operation Tag], [Dimension Tag] | Lorem ipsum _____sit amet consectetur d... |
| ☐ | [Story Name] | [Operation Tag], [Dimension Tag] | Lorem ipsum dolor sit _____ consectetur. |
| ☐ | [Story Name] | [Operation Tag], [Dimension Tag] | Lorem ipsum dolor sit _____ consectetur. |
| ☐ | | | |
| ☐ | | | |
| ☐ | | | |
| ☐ | | | |
| ☐ | | | |
| ☐ | | | |
| ☐ | | | |

[ Push to Stage ] [ Push to Production ]

FIG. 22A

[Primary CRUD Tab]    Administration                          My Profile        Logout

Add New Story

| Core Story Syno... | Found in Oth... | Last Updated On | Last Stage Push | Last Prod Push | Status ① |
|---|---|---|---|---|---|
| [synonym].[Syn... | 12 | 01/01/2031 1:00pm | 01/01/2031 1:00pm | | Work in Prog... |
| [synonym] | 4 | 01/01/2031 1:00pm | | | Work in Prog... |
| [synonym].[Syn... | 2 | 01/01/2031 1:00pm | 01/01/2031 1:00pm | 01/01/2031 1:00pm | Published in ... |
| [synonym] | 21 | 01/01/2031 1:00pm | | | Published in ... |
| [synonym] | 21 | 01/01/2031 1:00pm | | | Published in ... |
| | | | | | |
| | | | | | |
| | | | | | |
| | | | | | |
| | | | | | |
| | | | | | |
| | | | | | |

FIG. 22B

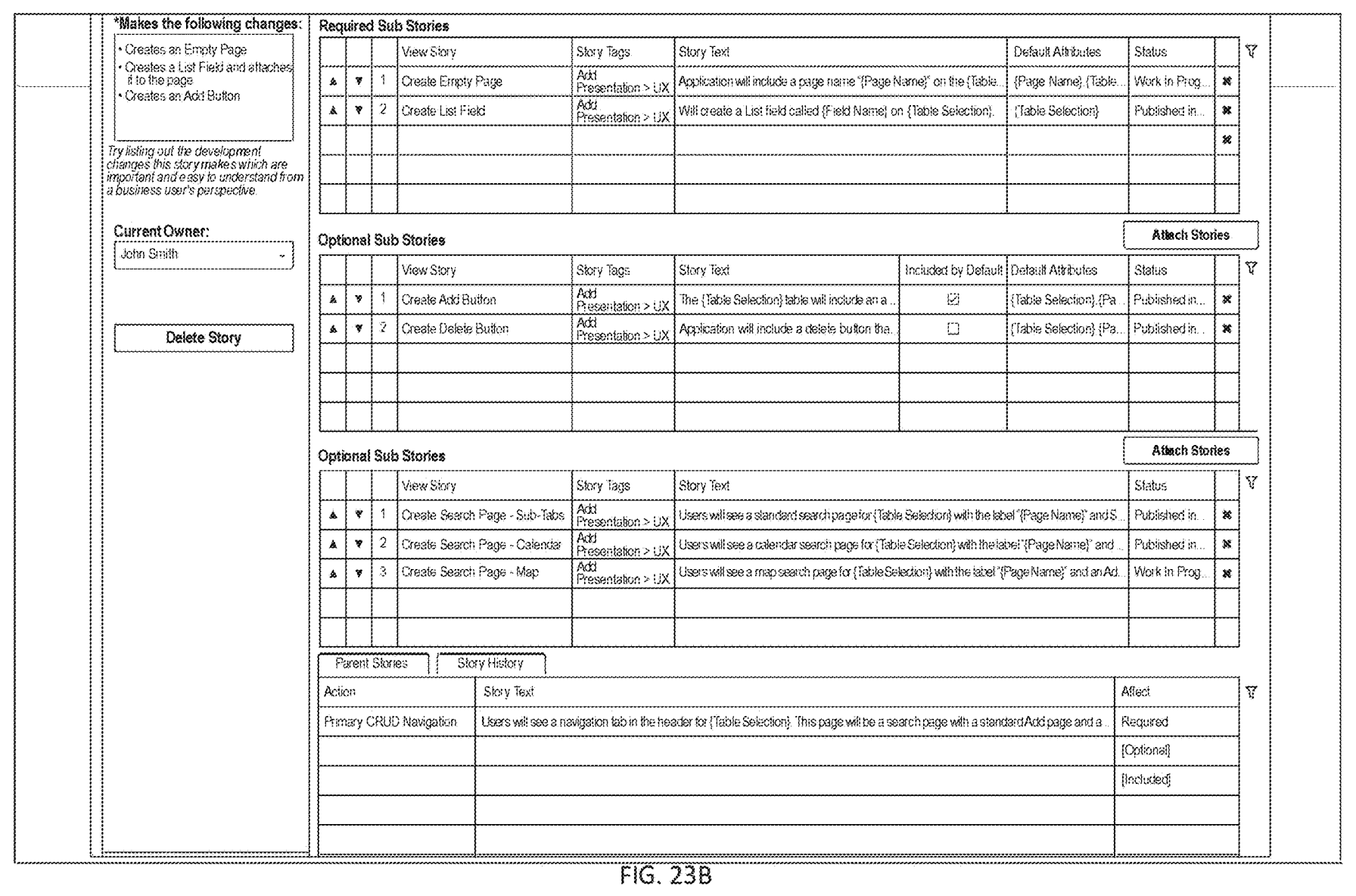

*Makes the following changes:

- Creates an Empty Page
- Creates a List Field and attaches it to the page
- Creates an Add Button

*Try listing out the development changes this story makes which are important and easy to understand from a business user's perspective.*

Current Owner:
John Smith

[ Delete Story ]

Required Sub Stories

| | | | View Story | Story Tags | Story Text | Default Attributes | Status | |
|---|---|---|---|---|---|---|---|---|
| ◢ | ▸ | 1 | Create Empty Page | Add Presentation > UX | Application will include a page name "{Page Name}" on the {Table... | {Page Name}, {Table... | Work in Prog... | ✖ |
| ◢ | ▸ | 2 | Create List Field | Add Presentation > UX | Will create a List field called {Field Name} on {Table Selection}. | {Table Selection} | Published in... | ✖ |
| | | | | | | | | ✖ |

[ Attach Stories ]

Optional Sub Stories

| | | | View Story | Story Tags | Story Text | Included by Default | Default Attributes | Status | |
|---|---|---|---|---|---|---|---|---|---|
| ◢ | ▸ | 1 | Create Add Button | Add Presentation > UX | The {Table Selection} table will include an a... | ☑ | {Table Selection}; {Pa... | Published in... | ✖ |
| ◢ | ▸ | 2 | Create Delete Button | Add Presentation > UX | Application will include a delete button tha... | ☐ | {Table Selection}; {Pa... | Published in... | ✖ |
| | | | | | | | | | |

[ Attach Stories ]

Optional Sub Stories

| | | | View Story | Story Tags | Story Text | Status | |
|---|---|---|---|---|---|---|---|
| ◢ | ▸ | 1 | Create Search Page - Sub-Tabs | Add Presentation > UX | Users will see a standard search page for {Table Selection} with the label "{Page Name}" and S... | Published in... | ✖ |
| ◢ | ▸ | 2 | Create Search Page - Calendar | Add Presentation > UX | Users will see a calendar search page for {Table Selection} with the label "{Page Name}" and ... | Published in... | ✖ |
| ◢ | ▸ | 3 | Create Search Page - Map | Add Presentation > UX | Users will see a map search page for {Table Selection} with the label "{Page Name}" and Ad... | Work in Prog... | ✖ |

Parent Stories | Story History

| Action | Story Text | Affect |
|---|---|---|
| Primary CRUD Navigation | Users will see a navigation tab in the header for {Table Selection}. This page will be a search page with a standard Add page and a... | Required |
| | | [Optional] |
| | | [Included] |
| | | |

FIG. 23B

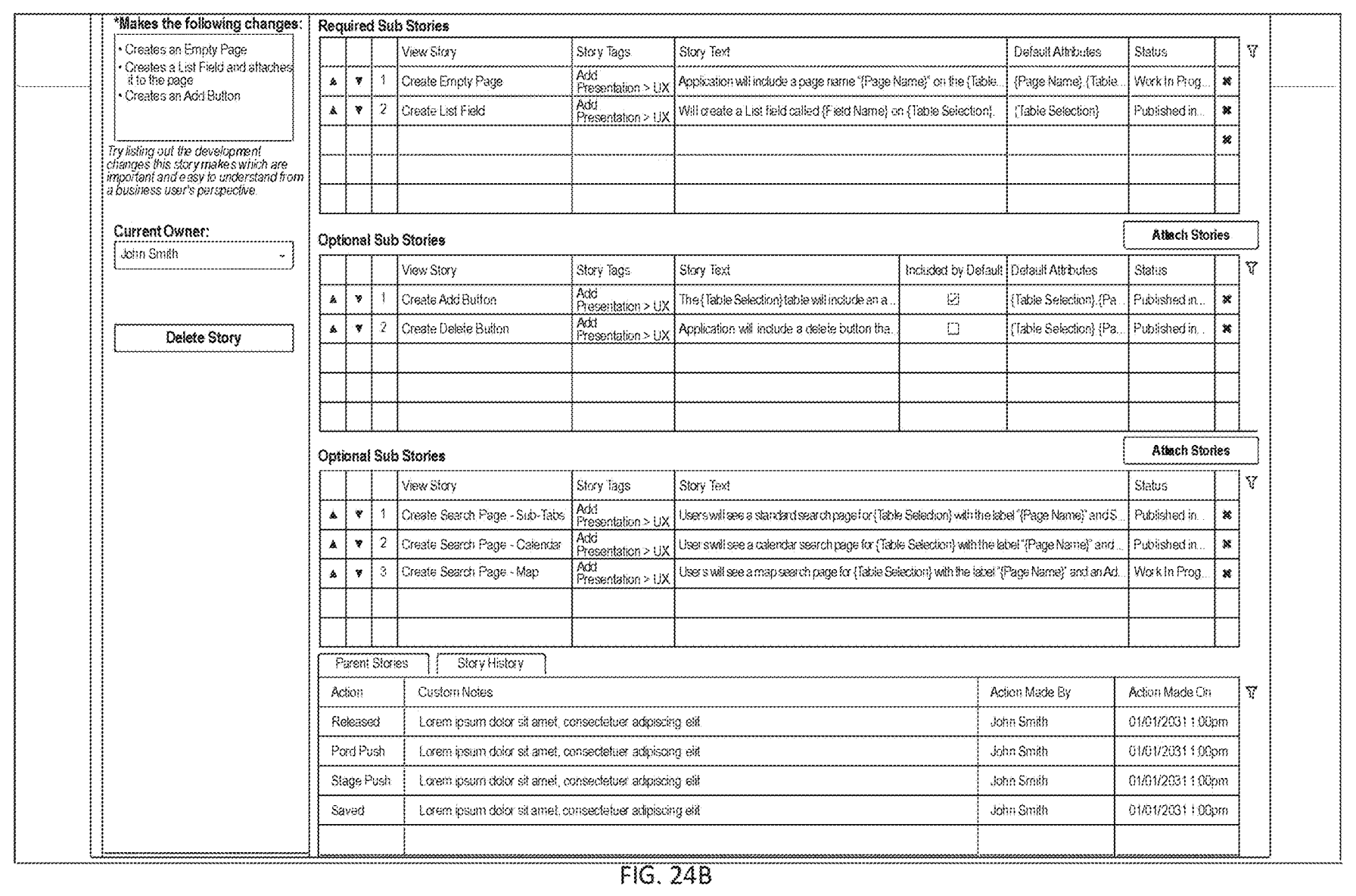

*Makes the following changes:
- Creates an Empty Page
- Creates a List Field and attaches it to the page
- Creates an Add Button

*Try listing out the development changes this story makes, which are important and easy to understand from a business user's perspective.*

Current Owner: John Smith

[Delete Story]

Required Sub Stories

| | | View Story | Story Tags | Story Text | Default Attributes | Status |
|---|---|---|---|---|---|---|
| ▲ | 1 | Create Empty Page | Add Presentation > UX | Application will include a page name "{Page Name}" on the {Table... | {Page Name}, {Table... | Work In Prog... | ✖ |
| ▲ | 2 | Create List Field | Add Presentation > UX | Will create a List field called {Field Name} on {Table Selection}... | {Table Selection} | Published in... | ✖ |
| | | | | | | | ✖ |

Attach Stories

Optional Sub Stories

| | | View Story | Story Tags | Story Text | Included by Default | Default Attributes | Status |
|---|---|---|---|---|---|---|---|
| ▲ | 1 | Create Add Button | Add Presentation > UX | The {Table Selection} table will include an a... | ☑ | {Table Selection}, {Pa... | Published in... | ✖ |
| ▲ | 2 | Create Delete Button | Add Presentation > UX | Application will include a delete button tha... | ☐ | {Table Selection}, {Pa... | Published in... | ✖ |
| | | | | | | | |

Attach Stories

Optional Sub Stories

| | | View Story | Story Tags | Story Text | Status |
|---|---|---|---|---|---|
| ▲ | 1 | Create Search Page - Sub - Tabs | Add Presentation > UX | Users will see a standard search page for {Table Selection} with the label "{Page Name}" and S... | Published in... | ✖ |
| ▲ | 2 | Create Search Page - Calendar | Add Presentation > UX | User swill see a calendar search page for {Table Selection} with the label "{Page Name}" and ... | Published in... | ✖ |
| ▲ | 3 | Create Search Page - Map | Add Presentation > UX | User's will see a map search page for {Table Selection} with the label "{Page Name}" and an Ad... | Work In Prog. | ✖ |
| | | | | | |

| Parent Stories | Custom Notes | Story History |
|---|---|---|

Story History

| Action | | Action Made By | Action Made On |
|---|---|---|---|
| Released | Lorem ipsum dolor sit amet, consectetuer adipiscing elit | John Smith | 01/01/2031 1:00pm |
| Pond Push | Lorem ipsum dolor sit amet, consectetuer adipiscing elit | John Smith | 01/01/2031 1:00pm |
| Stage Push | Lorem ipsum dolor sit amet, consectetuer adipiscing elit | John Smith | 01/01/2031 1:00pm |
| Saved | Lorem ipsum dolor sit amet, consectetuer adipiscing elit | John Smith | 01/01/2031 1:00pm |

FIG. 24B

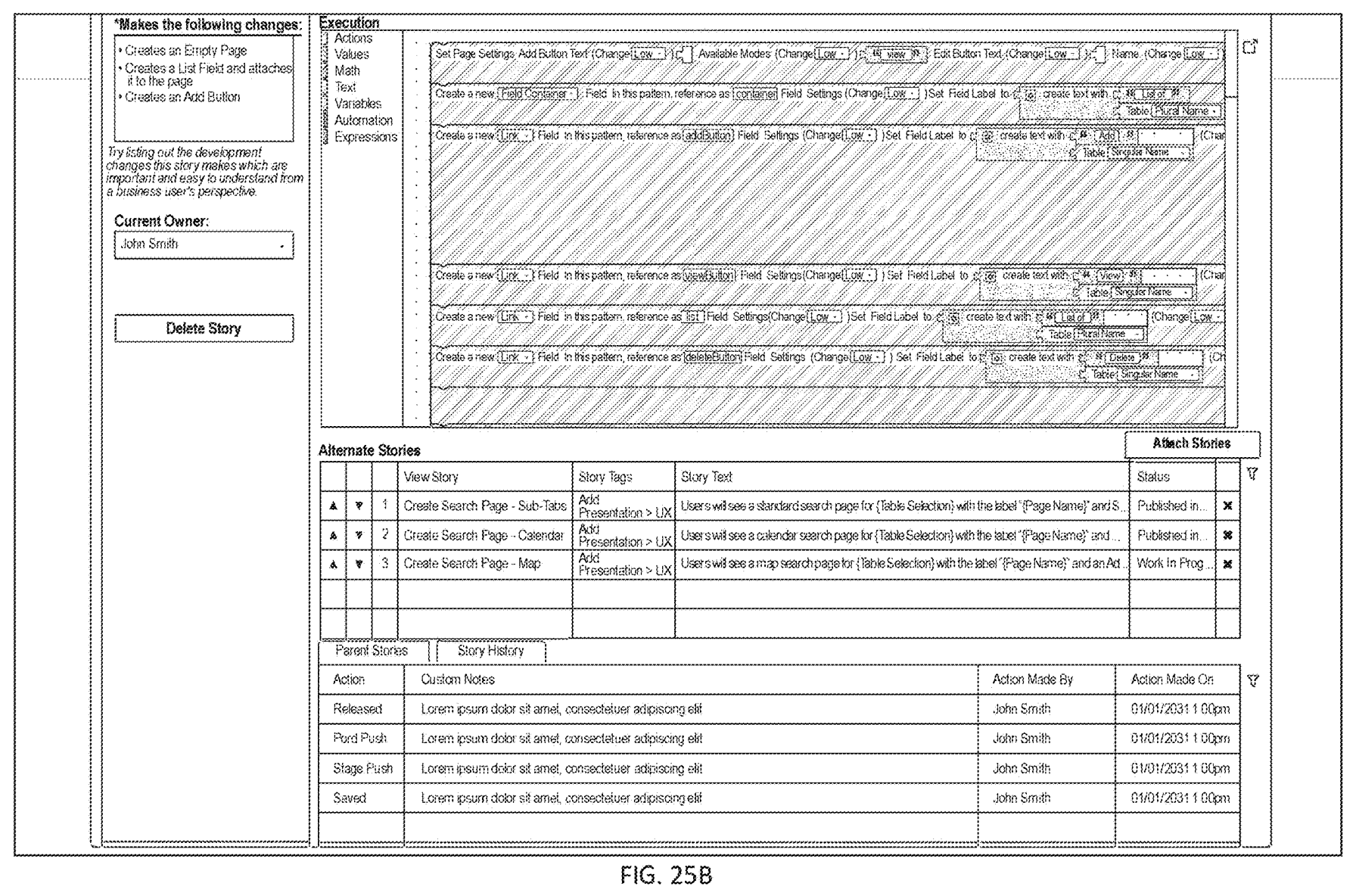

Makes the following changes:
- Creates an Empty Page
- Creates a List Field and attaches it to the page
- Creates an Add Button Try listing out the development changes this story makes which are important and easy to understand from a business user's perspective.

Current Owner:
John Smith

Delete Story

Execution
Actions
Values
Math
Text
Variables
Automation
Expressions

Set Page Settings Add Button Text (Change [Low ▾]) | Available Modes (Change [Low ▾]) | Edit Button Text (Change [Low ▾]) | Name (Change [Low ▾]) (Char...

Create a new [Field Container ▾] Field. In this pattern, reference as [container] Field Settings (Change [Low ▾]) | Set Field Label to [ ] create text with ... Table: Plural Name Create a new [List ▾] Field. In this pattern, reference as [addition] Field Settings (Changed [Low ▾]) | Set Field Label to c... create text with ... Table: Singular Name (Char...

Create a new [Link ▾] Field. In this pattern, reference as [viewButton] Field Settings (Change [Low ▾]) | Set Field Label to ... create text with ... Table: Plural Name (Change [Low ▾])

Create a new [Link ▾] Field. In this pattern, reference as [editButton] Field Settings(Change [Low ▾]) | Set Field Label to ... create text with ... Table: Singular Name Create a new [Link ▾] Field. In this pattern, reference as [deleteButton] Field Settings (Change [Low ▾]) | Set Field Label to ... create text with ... Table: Singular Name

Alternate Stories

Attach Stories

| | | View Story | Story Tags | Story Text | Status |
|---|---|---|---|---|---|
| ▲ | ► | 1 | Create Search Page - Sub-Tabs | Add Presentation > UX | Users will see a standard search page for [Table Selection] with the label "[Page Name]" and S... | Published in... ✖ |
| ▲ | ► | 2 | Create Search Page - Calendar | Add Presentation > UX | Users will see a calendar search page for [Table Selection] with the label "[Page Name]" and ... | Published in... ✖ |
| ▲ | ► | 3 | Create Search Page - Map | Add Presentation > UX | Users will see a map search page for [Table Selection] with the label "[Page Name]" and an Act... | Work in Prog... ✖ |

Parent Stories   Story History

| Action | Custom Notes | Action Made By | Action Made On |
|---|---|---|---|
| Released | Lorem ipsum dolor sit amet, consectetuer adipiscing elit | John Smith | 01/01/2031 1:00pm |
| Prod Push | Lorem ipsum dolor sit amet, consectetuer adipiscing elit | John Smith | 01/01/2031 1:00pm |
| Stage Push | Lorem ipsum dolor sit amet, consectetuer adipiscing elit | John Smith | 01/01/2031 1:00pm |
| Saved | Lorem ipsum dolor sit amet, consectetuer adipiscing elit | John Smith | 01/01/2031 1:00pm |

FIG. 25B

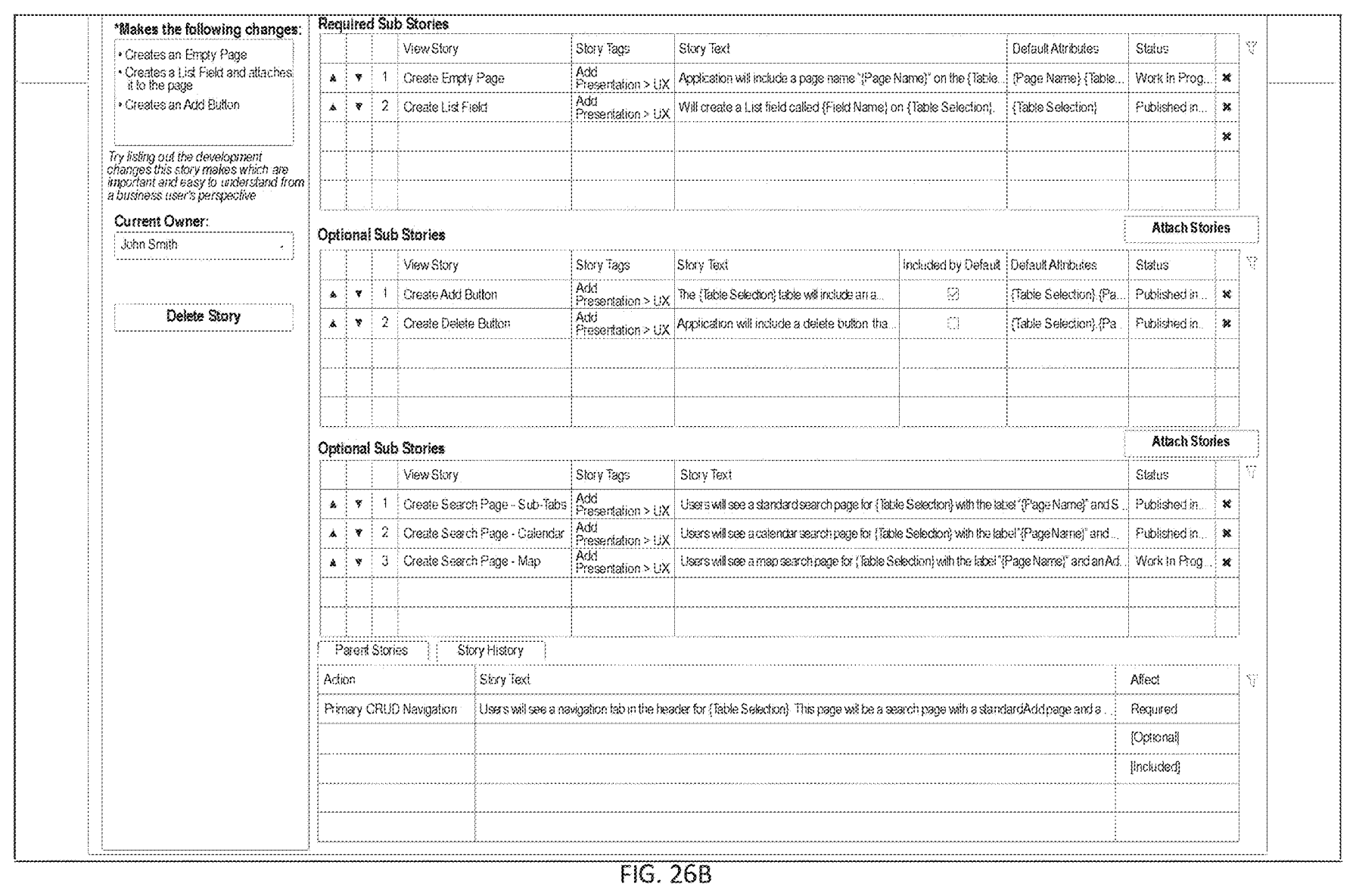

*Makes the following changes:
- Creates an Empty Page
- Creates a List Field and attaches it to the page
- Creates an Add Button

*Try listing out the development changes this story makes which are important and easy to understand from a business user's perspective*

Current Owner:
John Smith

Delete Story

Required Sub Stories

| | | View Story | Story Tags | Story Text | Default Attributes | Status | |
|---|---|---|---|---|---|---|---|
| ▲ | ▼ | 1 | Create Empty Page | Add Presentation > UX | Application will include a page name "{Page Name}" on the {Table... | {Page Name}, {Table... | Work in Prog... | ✖ |
| ▲ | ▼ | 2 | Create List Field | Add Presentation > UX | Will create a List field called {Field Name} on {Table Selection} | {Table Selection} | Published in... | ✖ |

Attach Stories

Optional Sub Stories

| | | View Story | Story Tags | Story Text | Included by Default | Default Attributes | Status | |
|---|---|---|---|---|---|---|---|---|
| ▲ | ▼ | 1 | Create Add Button | Add Presentation > UX | The {Table Selection} table will include an a... | ☑ | {Table Selection}, {Pa... | Published in... | ✖ |
| ▲ | ▼ | 2 | Create Delete Button | Add Presentation > UX | Application will include a delete button tha... | ☐ | {Table Selection}, {Pa... | Published in... | ✖ |

Attach Stories

Optional Sub Stories

| | | View Story | Story Tags | Story Text | Status | |
|---|---|---|---|---|---|---|
| ▲ | ▼ | 1 | Create Search Page - Sub-Tabs | Add Presentation > UX | Users will see a standard search page for {Table Selection} with the label "{Page Name}" and S... | Published in... | ✖ |
| ▲ | ▼ | 2 | Create Search Page - Calendar | Add Presentation > UX | Users will see a calendar search page for {Table Selection} with the label "{Page Name}" and... | Published in... | ✖ |
| ▲ | ▼ | 3 | Create Search Page - Map | Add Presentation > UX | Users will see a map search page for {Table Selection} with the label "{Page Name}" and an Ad... | Work in Prog... | ✖ |

Parent Stories | Story History

| Action | Story Text | Affect |
|---|---|---|
| Primary CRUD Navigation | Users will see a navigation tab in the header for {Table Selection}. This page will be a search page with a standard Add page and a... | Required |
| | | [Optional] |
| | | [Included] |

FIG. 26B

*Makes the following changes:*
- Creates an Empty Page
- Creates a List Field and attaches it to the page
- Creates an Add Button

*Try listing out the development changes this story makes which are important and easy to understand from a business user's perspective*

Current Owner:
John Smith

Delete Story

Required Sub Stories

| | | | View Story | Story Tags | Story Text | Default Attributes | Status | |
|---|---|---|---|---|---|---|---|---|
| ▲ | ▼ | 1 | Create Empty Page | Add Presentation > UX | Application will include a page name "{Page Name}" on the {Table... | {Page Name}, {Table... | Work In Prog... | ✖ |
| ▲ | ▼ | 2 | Create List Field | Add Presentation > UX | Will create a List field called {Field Name} on {Table Selection} | {Table Selection} | Published in... | ✖ |
| | | | | | | | | ✖ |

Attach Stories

Optional Sub Stories

| | | | View Story | Story Tags | Story Text | Included by Default | Default Attributes | Status | |
|---|---|---|---|---|---|---|---|---|---|
| ▲ | ▼ | 1 | Create Add Button | Add Presentation > UX | The {Table Selection} table will include an a... | ☑ | {Table Selection}, {Pa... | Published in... | ✖ |
| ▲ | ▼ | 2 | Create Delete Button | Add Presentation > UX | Application will include a delete button tha... | ☐ | {Table Selection}, {Pa... | Published in... | ✖ |

Attach Stories

Optional Sub Stories

| | | | View Story | Story Tags | Story Text | Status | |
|---|---|---|---|---|---|---|---|
| ▲ | ▼ | 1 | Create Search Page – Sub-Tabs | Add Presentation > UX | Users will see a standard search page for {Table Selection} with the label "{Page Name}" and S... | Published in... | ✖ |
| ▲ | ▼ | 2 | Create Search Page - Calendar | Add Presentation > UX | Users will see a calendar search page for {Table Selection} with the label "{Page Name}" and... | Published in... | ✖ |
| ▲ | ▼ | 3 | Create Search Page - Map | Add Presentation > UX | Users will see a map search page for {Table Selection} with the label "{Page Name}" and an Ad... | Work In Prog... | ✖ |

| Parent Stories | Story History | | |
|---|---|---|---|
| Action | | Story Text | Affect |
| Primary CRUD Navigation | | Users will see a navigation tab in the header for {Table Selection}. This page will be a search page with a standard Add page and a... | Required |
| | | | [Optional] |
| | | | [Included] |

FIG. 27B

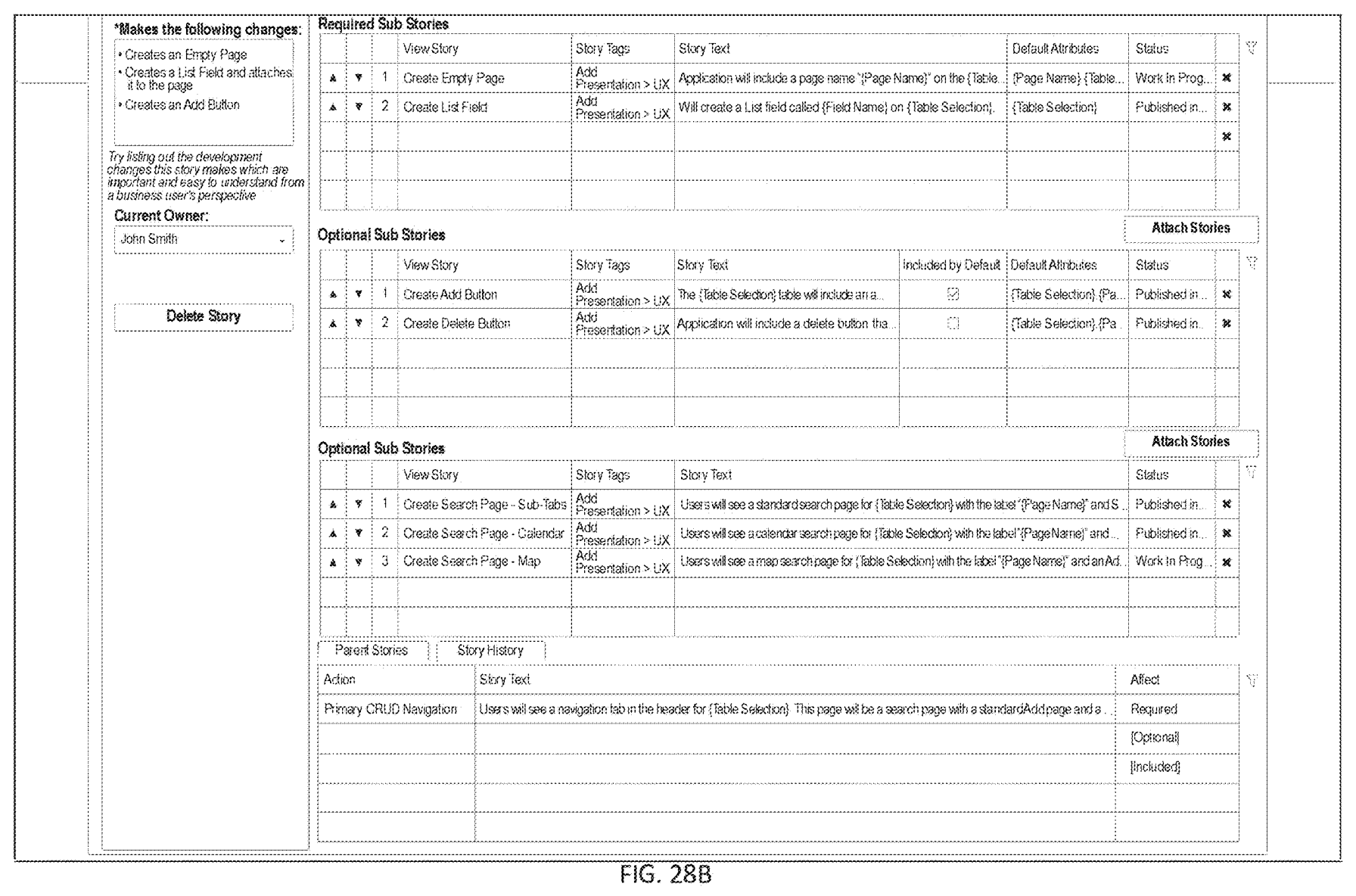

*Makes the following changes:
- Creates an Empty Page
- Creates a List Field and attaches it to the page
- Creates an Add Button Try listing out the development changes this story makes which are important and easy to understand from a business user's perspective Current Owner:
John Smith Delete Story

Required Sub Stories

| | | | View Story | Story Tags | Story Text | Default Attributes | Status | |
|---|---|---|---|---|---|---|---|---|
| ▲ | ▼ | 1 | Create Empty Page | Add Presentation > UX | Application will include a page name "{Page Name}" on the {Table... | {Page Name}, {Table... | Work In Prog.. | ✖ |
| ▲ | ▼ | 2 | Create List Field | Add Presentation > UX | Will create a List field called {Field Name} on {Table Selection}. | {Table Selection} | Published in.. | ✖ |
| | | | | | | | | ✖ |

Attach Stories

Optional Sub Stories

| | | | View Story | Story Tags | Story Text | Included by Default | Default Attributes | Status | |
|---|---|---|---|---|---|---|---|---|---|
| ▲ | ▼ | 1 | Create Add Button | Add Presentation > UX | The {Table Selection} table will include an a... | ☑ | {Table Selection}, {Pa... | Published in.. | ✖ |
| ▲ | ▼ | 2 | Create Delete Button | Add Presentation > UX | Application will include a delete button tha... | ☐ | {Table Selection}, {Pa... | Published in.. | ✖ |
| | | | | | | | | | |

Attach Stories

Optional Sub Stories

| | | | View Story | Story Tags | Story Text | Status | |
|---|---|---|---|---|---|---|---|
| ▲ | ▼ | 1 | Create Search Page - Sub-Tabs | Add Presentation > UX | Users will see a standard search page for {Table Selection} with the label "{Page Name}" and S.. | Published in.. | ✖ |
| ▲ | ▼ | 2 | Create Search Page - Calendar | Add Presentation > UX | Users will see a calendar search page for {Table Selection} with the label "{Page Name}" and... | Published in.. | ✖ |
| ▲ | ▼ | 3 | Create Search Page - Map | Add Presentation > UX | Users will see a map search page for {Table Selection} with the label "{Page Name}" and an Ad.. | Work In Prog.. | ✖ |

| Parent Stories | Story History | | |
|---|---|---|---|
| Action | Story Text | | Affect |
| Primary CRUD Navigation | Users will see a navigation tab in the header for {Table Selection}. This page will be a search page with a standard Add page and a ... | | Required |
| | | | [Optional] |
| | | | [Included] |

FIG. 28B

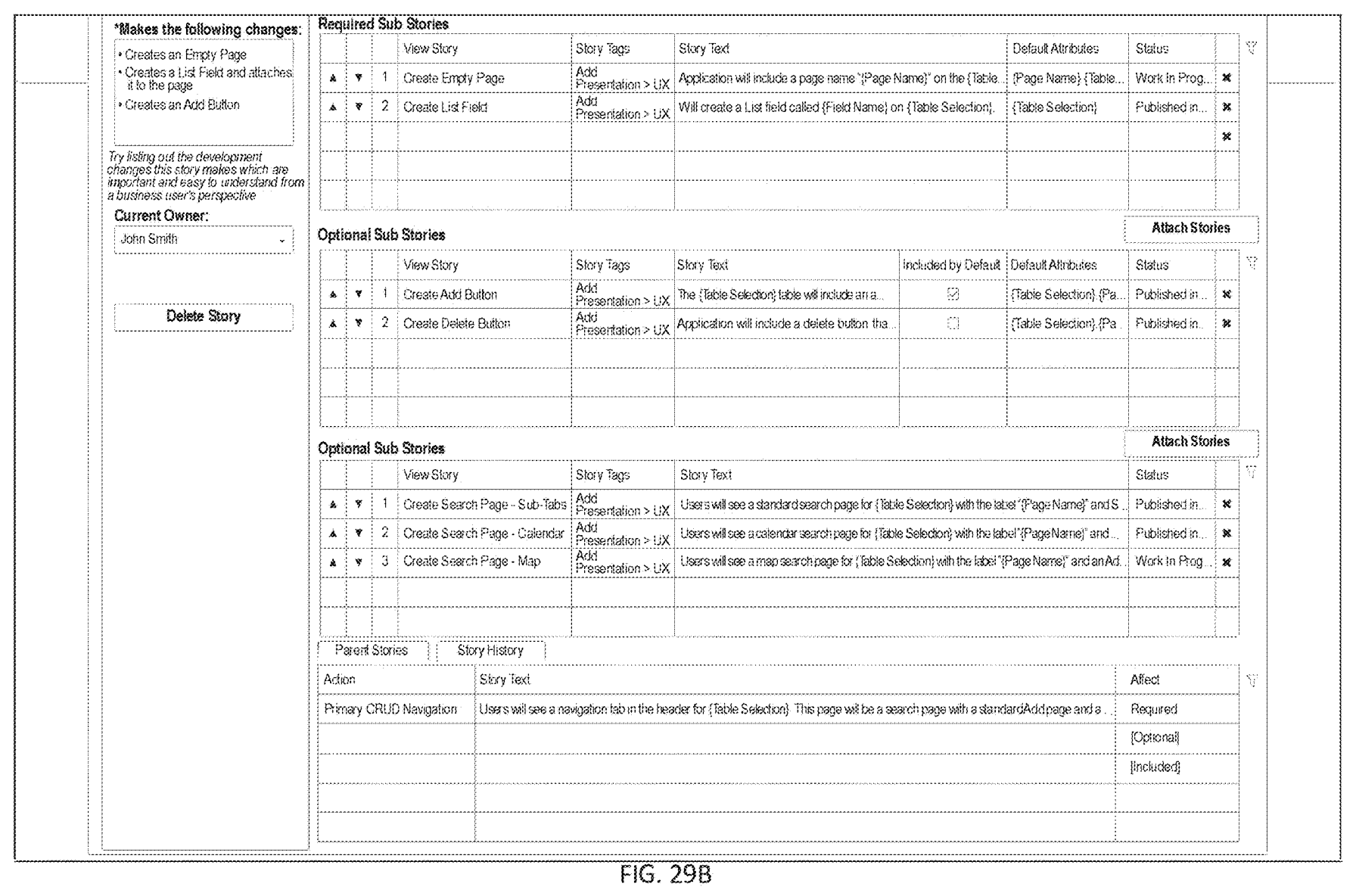

Makes the following changes:
- Creates an Empty Page
- Creates a List Field and attaches it to the page
- Creates an Add Button

*Try listing out the development changes this story makes which are important and easy to understand from a business user's perspective*

Current Owner:
John Smith

[ Delete Story ]

Required Sub Stories

| | | View Story | Story Tags | Story Text | Default Attributes | Status |
|---|---|---|---|---|---|---|
| ▲ ▼ | 1 | Create Empty Page | Add Presentation > UX | Application will include a page name "{Page Name}" on the {Table... | {Page Name}, {Table... | Work in Prog... ✖ |
| ▲ ▼ | 2 | Create List Field | Add Presentation > UX | Will create a List field called {Field Name} on {Table Selection} | {Table Selection} | Published in... ✖ |
| ▲ | | | | | | ✖ |

Attach Stories

Optional Sub Stories

| | | View Story | Story Tags | Story Text | Included by Default | Default Attributes | Status |
|---|---|---|---|---|---|---|---|
| ▲ ▼ | 1 | Create Add Button | Add Presentation > UX | The {Table Selection} table will include an a... | ☑ | {Table Selection}, {Pa... | Published in.. ✖ |
| ▲ ▼ | 2 | Create Delete Button | Add Presentation > UX | Application will include a delete button tha... | ☐ | {Table Selection}, {Pa... | Published in.. ✖ |

Attach Stories

Optional Sub Stories

| | | View Story | Story Tags | Story Text | Status |
|---|---|---|---|---|---|
| ▲ ▼ | 1 | Create Search Page – Sub-Tabs | Add Presentation > UX | Users will see a standard search page for {Table Selection} with the label "{Page Name}" and S... | Published in... ✖ |
| ▲ ▼ | 2 | Create Search Page - Calendar | Add Presentation > UX | Users will see a calendar search page for {Table Selection} with the label "{Page Name}" and... | Published in... ✖ |
| ▲ ▼ | 3 | Create Search Page - Map | Add Presentation > UX | Users will see a map search page for {Table Selection} with the label "{Page Name}" and an Ad... | Work in Prog... ✖ |

Parent Stories | Story History

| Action | Story Text | Affect |
|---|---|---|
| Primary CRUD Navigation | Users will see a navigation tab in the header for {Table Selection}. This page will be a search page with a standard Add page and a ... | Required |
| | | [Optional] |
| | | [Included] |

FIG. 29B

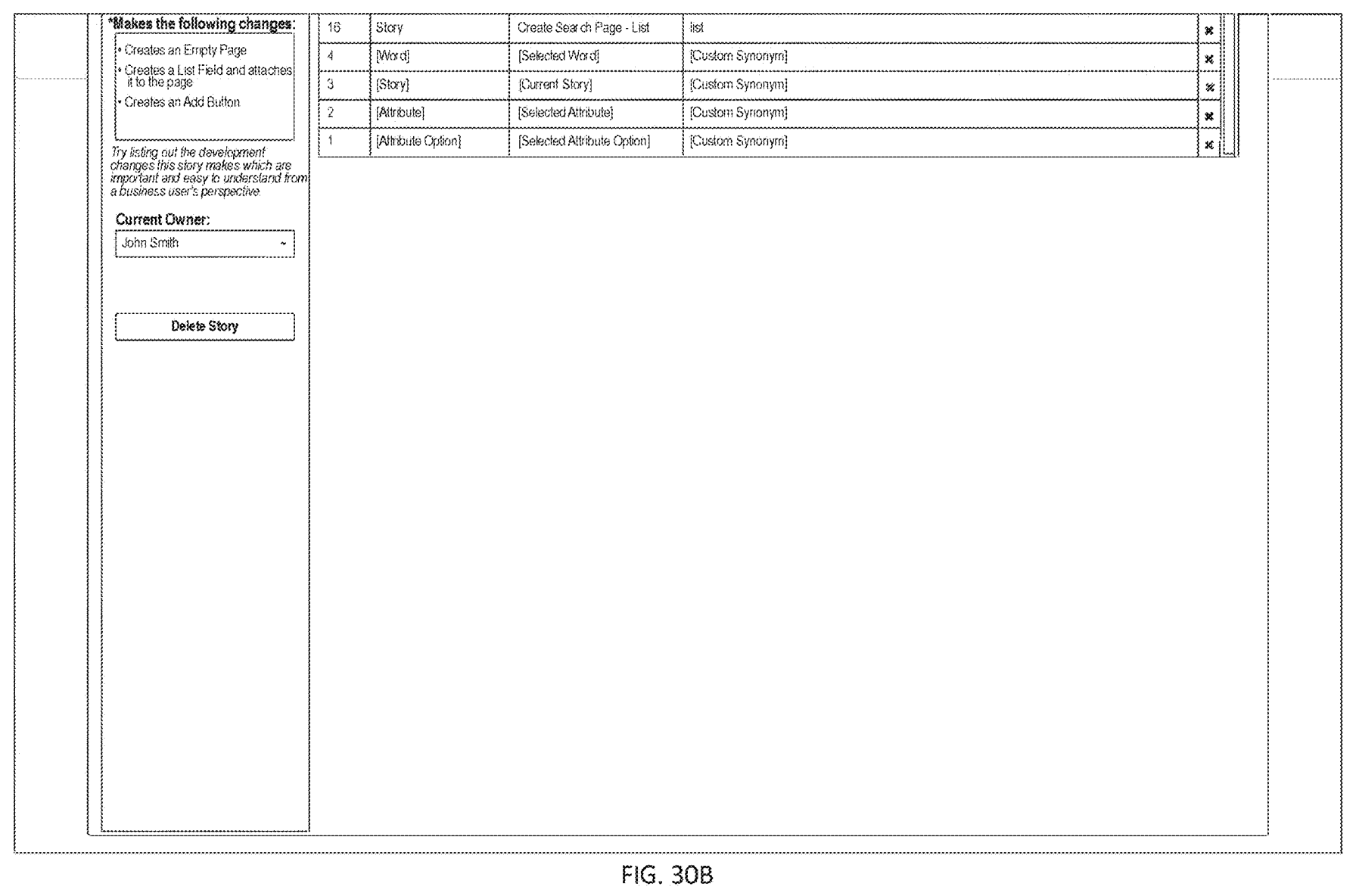

*Makes the following changes:

- Creates an Empty Page
- Creates a List Field and attaches it to the page
- Creates an Add Button

*Try listing out the development changes this story makes which are important and easy to understand from a business user's perspective.

Current Owner:

John Smith

Delete Story

| | Story | | Create Search Page - List | list | |
|---|---|---|---|---|---|
| 16 | Story | | | | ✕ |
| 4 | [Word] | | [Selected Word] | [Custom Synonym] | ✕ |
| 3 | [Story] | | [Current Story] | [Custom Synonym] | ✕ |
| 2 | [Attribute] | | [Selected Attribute] | [Custom Synonym] | ✕ |
| 1 | [Attribute Option] | | [Selected Attribute Option] | [Custom Synonym] | ✕ |

FIG. 30B

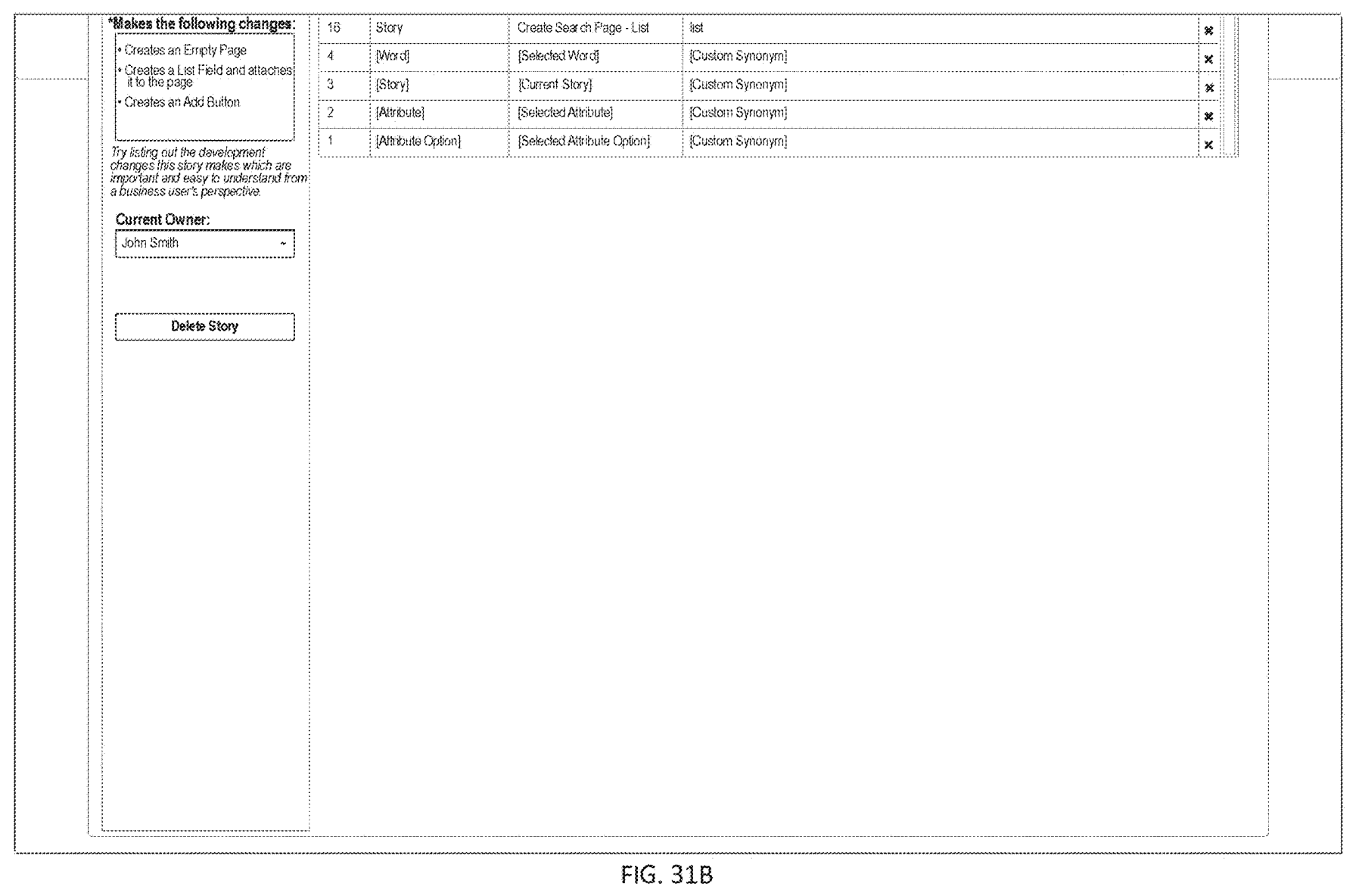

Makes the following changes:
* Creates an Empty Page
* Creates a List Field and attaches it to the page
* Creates an Add Button

*Try listing out the development changes this story makes which are important and easy to understand from a business user's perspective.*

Current Owner:

John Smith

Delete Story

| | Story | | Create Search Page - List | list | |
|---|---|---|---|---|---|
| 16 | [Word] | | [Selected Word] | [Custom Synonym] | ✕ |
| 4 | [Story] | | [Current Story] | [Custom Synonym] | ✕ |
| 3 | [Attribute] | | [Selected Attribute] | [Custom Synonym] | ✕ |
| 2 | [Attribute Option] | | [Selected Attribute Option] | [Custom Synonym] | ✕ |
| 1 | | | | | ✕ |

FIG. 31B

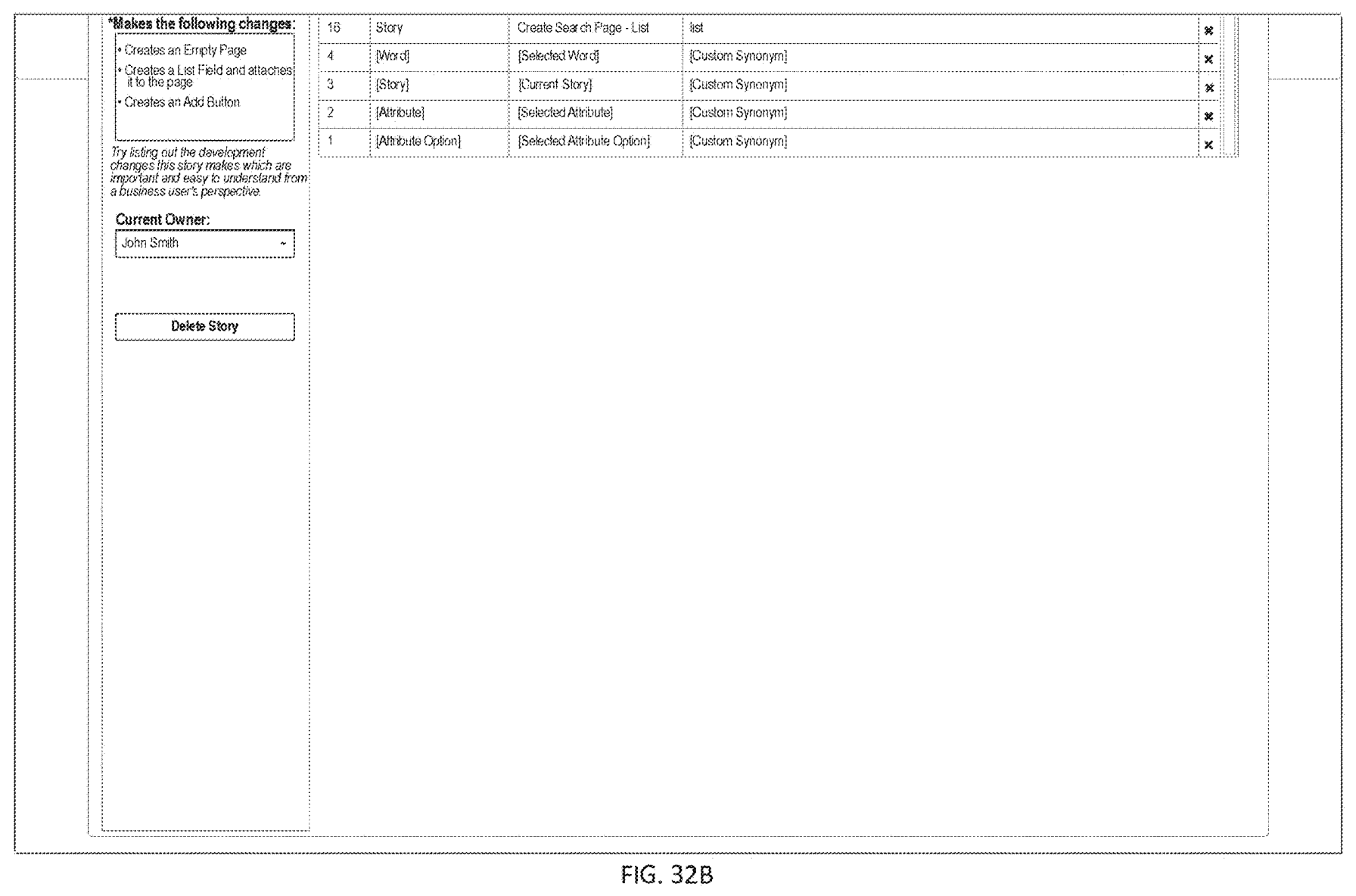

Makes the following changes:
- Creates an Empty Page
- Creates a List Field and attaches it to the page
- Creates an Add Button

*Try listing out the development changes this story makes which are important and easy to understand from a business user's perspective.*

Current Owner:

John Smith

Delete Story

| 16 | Story | Create Search Page - List | list | × |
|----|-------|---------------------------|------|---|
| 4 | [Word] | [Selected Word] | [Custom Synonym] | × |
| 3 | [Story] | [Current Story] | [Custom Synonym] | × |
| 2 | [Attribute] | [Selected Attribute] | [Custom Synonym] | × |
| 1 | [Attribute Option] | [Selected Attribute Option] | [Custom Synonym] | × |

FIG. 32B

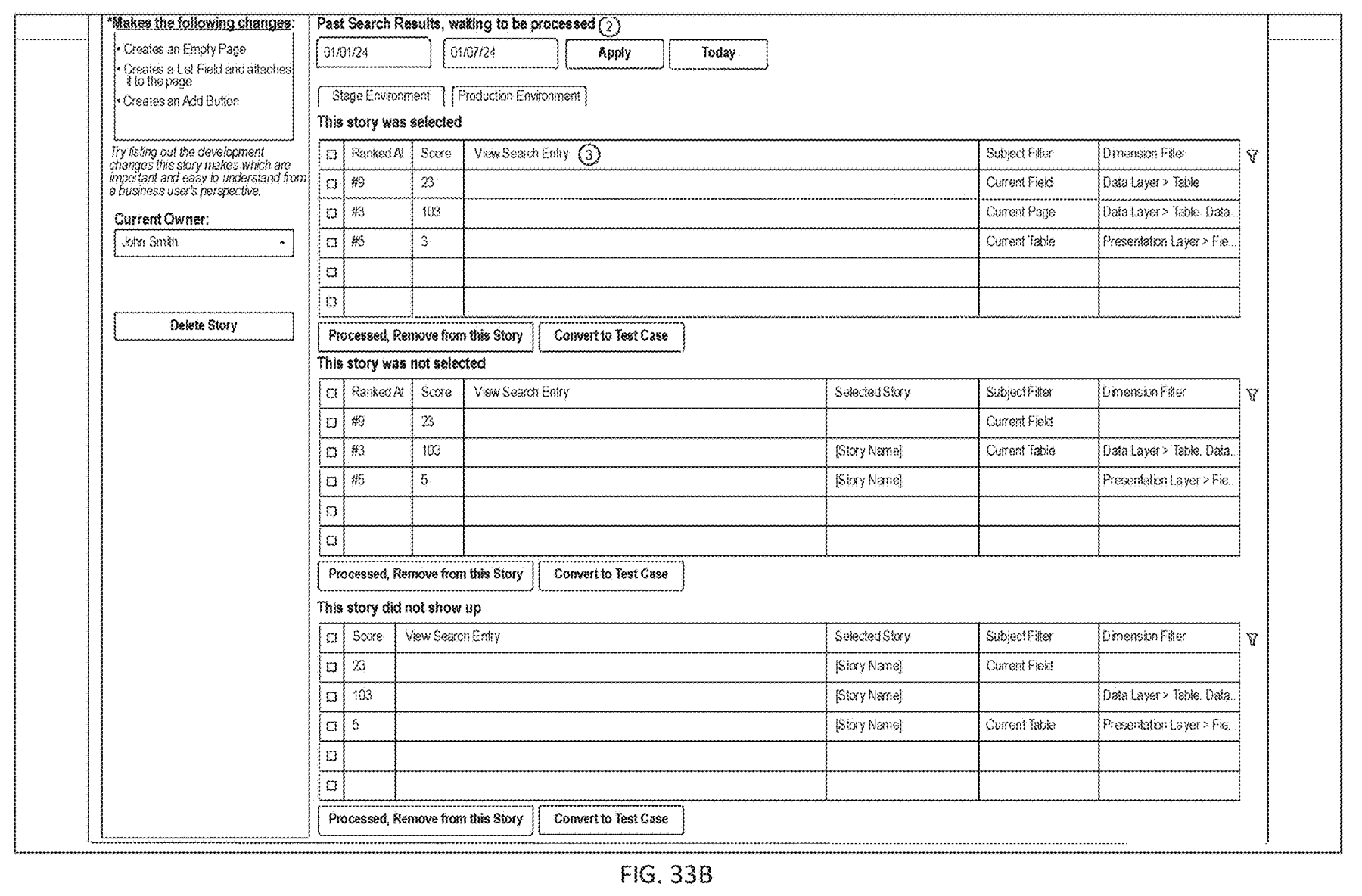

Makes the following changes:
- Creates an Empty Page
- Creates a List Field and attaches it to the page
- Creates an Add Button:

*Try listing out the development changes this story makes which are important and easy to understand from a business user's perspective.*

Current Owner:

John Smith

[ Delete Story ]

Past Search Results, waiting to be processed ②

| 01/01/24 | 01/07/24 | Apply | Today |

| Stage Environment | Production Environment |

This story was selected

| | Ranked At | Score | View Search Entry ③ | | Subject Filter | Dimension Filter |
|---|---|---|---|---|---|---|
| ☐ | #9 | 23 | | | Current Field | Data Layer > Table |
| ☐ | #3 | 103 | | | Current Page | Data Layer > Table. Data. |
| ☐ | #5 | 3 | | | Current Table | Presentation Layer > File. |
| ☐ | | | | | | |
| ☐ | | | | | | |

[ Processed, Remove from this Story ] [ Convert to Test Case ]

This story was not selected

| | Ranked At | Score | View Search Entry | | Subject Filter | Dimension Filter |
|---|---|---|---|---|---|---|
| ☐ | #9 | 23 | Selected Story | | Current Field | |
| ☐ | #3 | 103 | [Story Name] | | Current Table | Data Layer > Table. Data. |
| ☐ | #5 | 5 | [Story Name] | | | Presentation Layer > File. |
| ☐ | | | | | | |
| ☐ | | | | | | |

[ Processed, Remove from this Story ] [ Convert to Test Case ]

This story did not show up

| | Score | View Search Entry | | Subject Filter | Dimension Filter |
|---|---|---|---|---|---|
| ☐ | 23 | Selected Story | | Current Field | |
| ☐ | 103 | [Story Name] | | | Data Layer > Table. Data. |
| ☐ | 5 | [Story Name] | | Current Table | Presentation Layer > File. |
| ☐ | | [Story Name] | | | |
| ☐ | | | | | |
| ☐ | | | | | |

[ Processed, Remove from this Story ] [ Convert to Test Case ]

FIG. 33B

Makes the following changes:

• Creates an Empty Page
• Creates a List Field and attaches it to the page
• Creates an Add Button

*Try listing out the development changes this story makes which are important and easy to understand from a business user's perspective.*

Current Owner:
John Smith

Delete Story

Past Search Results, waiting to be processed

| 01/01/24 | 01/07/24 | Apply | Today |

| Stage Environment | Production Environment |

This story was selected

|  | Ranked At | Score | View Search Entry | | Subject Filter | Dimension: Filter |
|---|---|---|---|---|---|---|
|  | #9 | 23 | | | Current Field | Data Layer > Table |
|  | #3 | 103 | | | Current Page | Data Layer > Table. Data. |
|  | #5 | 3 | | | Current Table | Presentation: Layer > File. |
|  |  |  | | | | |
|  |  |  | | | | |

Processed, Remove from this Story — Convert to Test Case

This story was not selected

|  | Ranked At | Score | View Search Entry | | Selected Story | Dimension: Filter |
|---|---|---|---|---|---|---|
|  | #9 | 23 | | | | |
|  | #3 | 103 | | | [Story Name] | Data Layer > Table. Data. |
|  | #5 | 5 | | | [Story Name] | Presentation: Layer > File. |
|  |  |  | | | Current Field | |
|  |  |  | | | Current Table | |

Processed, Remove from this Story — Convert to Test Case

This story did not show up

|  | Score | View Search Entry | | Selected Story | Subject Filter | Dimension: Filter |
|---|---|---|---|---|---|---|
|  | 23 | | | [Story Name] | Current Field | |
|  | 103 | | | [Story Name] | | Data Layer > Table. Data. |
|  | 5 | | | [Story Name] | Current Table | Presentation: Layer > File. |
|  |  | | | | | |
|  |  | | | | | |

Processed, Remove from this Story — Convert to Test Case

FIG. 34B

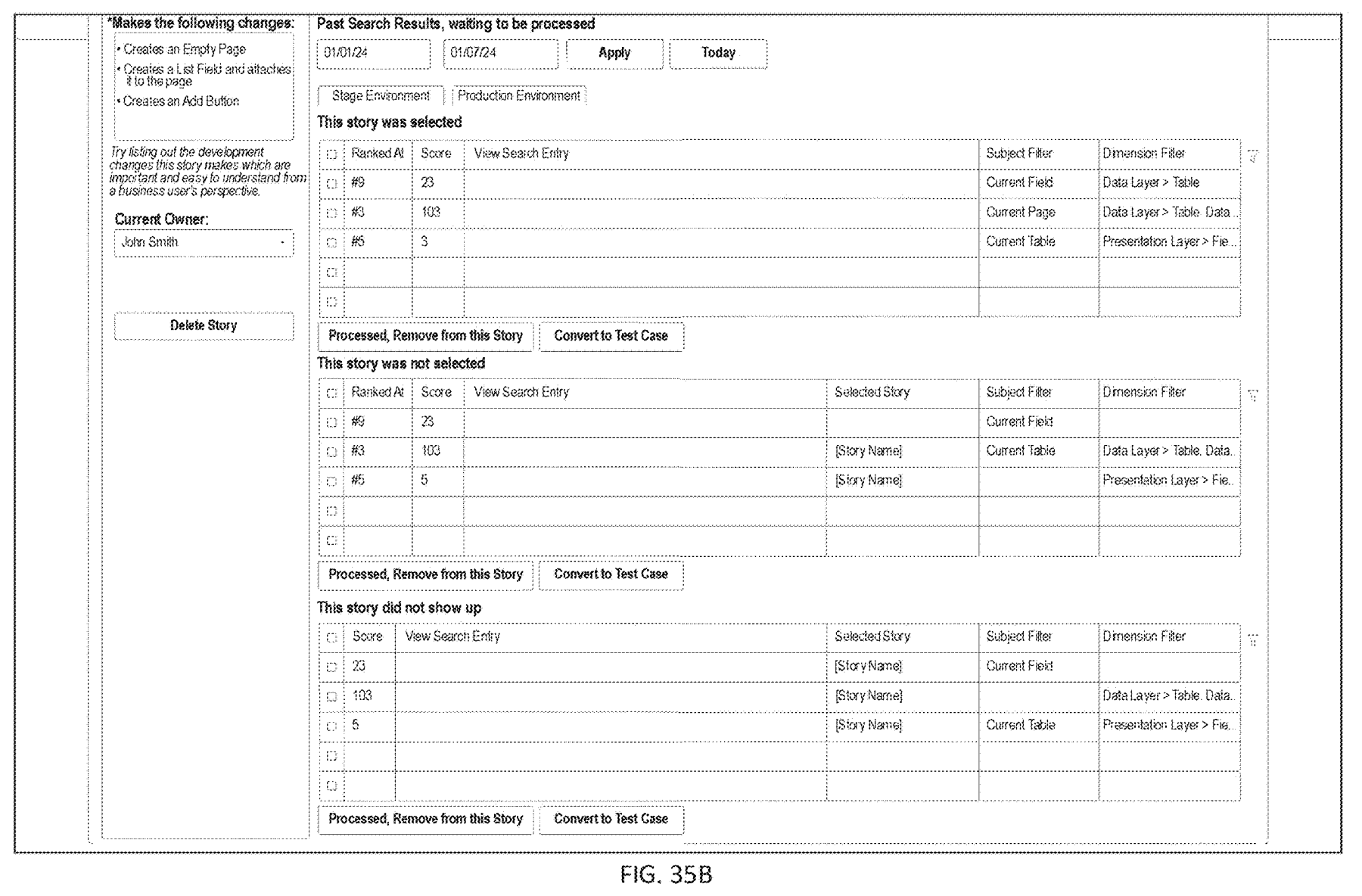

Makes the following changes:

- Creates an Empty Page
- Creates a List Field and attaches it to the page
- Creates an Add Button:

*Try listing out the development changes this story makes which are important and easy to understand from a business user's perspective.*

Current Owner:

John Smith

[ Delete Story ]

Past Search Results, waiting to be processed

| 01/01/24 | 01/07/24 | Apply | Today |

Stage Environment | Production Environment

This story was selected

| | Ranked At | Score | View Search Entry | | Subject Filter | Dimension: Filter |
|---|---|---|---|---|---|---|
| ☐ | #9 | 23 | | | Current Field | Data Layer > Table |
| ☐ | #3 | 103 | | | Current Page | Data Layer > Table. Data. |
| ☐ | #5 | 3 | | | Current Table | Presentation Layer > File. |
| ☐ | | | | | | |
| ☐ | | | | | | |

[ Processed, Remove from this Story ]  [ Convert to Test Case ]

This story was not selected

| | Ranked At | Score | View Search Entry | Selected Story | Subject Filter | Dimension: Filter |
|---|---|---|---|---|---|---|
| ☐ | #9 | 23 | | | Current Field | |
| ☐ | #3 | 103 | | [Story Name] | Current Table | Data Layer > Table. Data. |
| ☐ | #5 | 5 | | [Story Name] | | Presentation Layer > File. |
| ☐ | | | | | | |
| ☐ | | | | | | |

[ Processed, Remove from this Story ]  [ Convert to Test Case ]

This story did not show up

| | Score | View Search Entry | Selected Story | Subject Filter | Dimension: Filter |
|---|---|---|---|---|---|
| ☐ | 23 | | [Story Name] | Current Field | |
| ☐ | 103 | | [Story Name] | | Data Layer > Table. Data. |
| ☐ | 5 | | [Story Name] | Current Table | Presentation Layer > File. |
| ☐ | | | | | |
| ☐ | | | | | |

[ Processed, Remove from this Story ]  [ Convert to Test Case ]

FIG. 35B

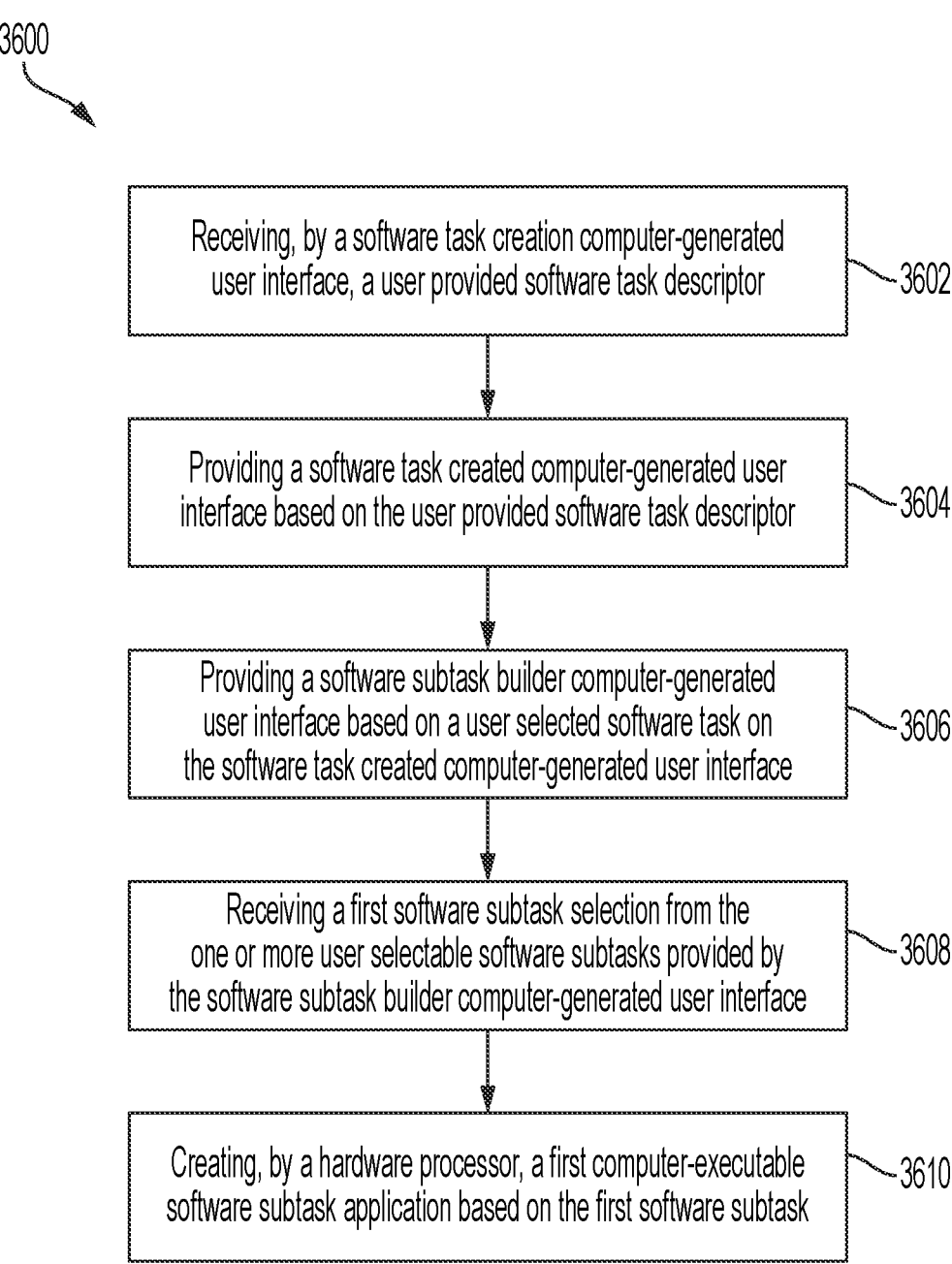

3600

Receiving, by a software task creation computer-generated user interface, a user provided software task descriptor ~3602

Providing a software task created computer-generated user interface based on the user provided software task descriptor ~3604

Providing a software subtask builder computer-generated user interface based on a user selected software task on the software task created computer-generated user interface ~3606

Receiving a first software subtask selection from the one or more user selectable software subtasks provided by the software subtask builder computer-generated user interface ~3608

Creating, by a hardware processor, a first computer-executable software subtask application based on the first software subtask ~3610

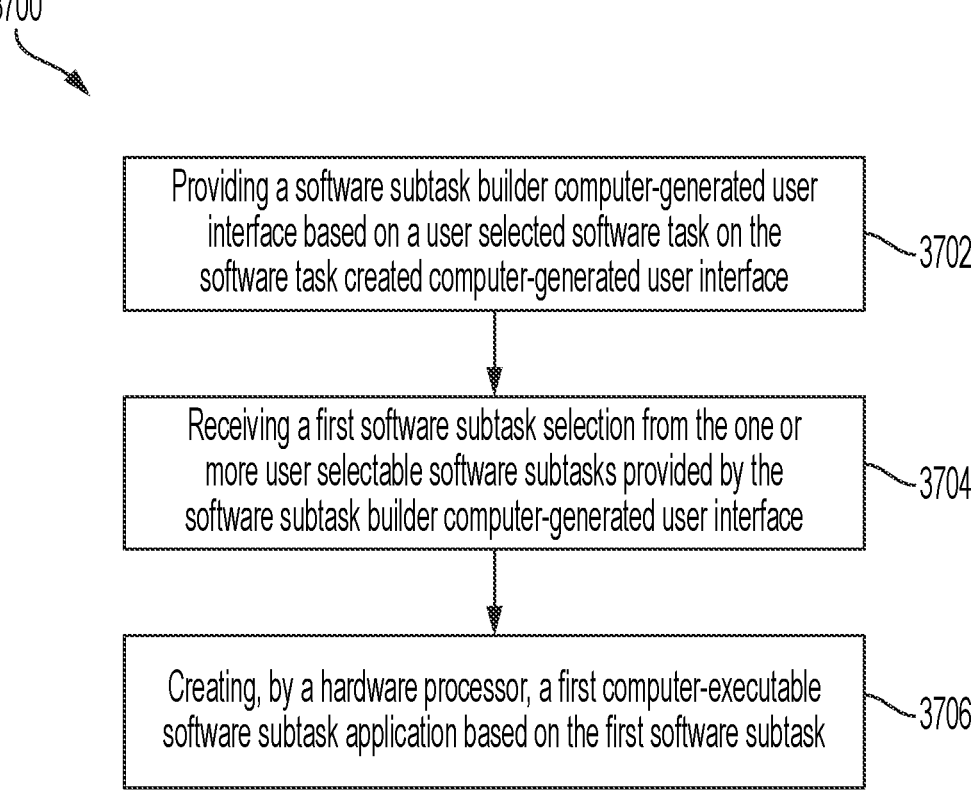

Providing a software subtask builder computer-generated user interface based on a user selected software task on the software task created computer-generated user interface — 3702

Receiving a first software subtask selection from the one or more user selectable software subtasks provided by the software subtask builder computer-generated user interface — 3704

Creating, by a hardware processor, a first computer-executable software subtask application based on the first software subtask — 3706

FIG. 37

SYSTEM AND METHOD FOR CREATING EXECUTABLE SOFTWARE CODE

CROSS REFERENCE TO RELATED APPLICATIONS

This application claims priority to U.S. Provisional Application No. 63/428,588 filed on Nov. 29, 2022, which is hereby incorporated by reference in its entirety.

FIELD

This application is systems and method for creating executable software code.

BACKGROUND

No-code development platforms (NCDPs) are becoming increasingly popular software tools because they allow both programmers and non-programmers to create application software through graphical user interfaces and configuration instead of traditional computer programming. No-code development platforms are closely related to low-code development platforms as both are designed to expedite the application development process. However, unlike low-code, no-code development platforms require no code writing at all, generally offering prebuilt templates that businesses can build apps with. These platforms have both increased in popularity as companies deal with the parallel trends of an increasingly mobile workforce and a limited supply of competent software developers. However, most conventional NCDPs still require some degree of knowledge of software development. Therefore, is need in the art to address the deficiencies in the conventional NCDPs.

SUMMARY

According to examples of the present disclosure, a method is disclosed that comprises receiving, by a software task creation computer-generated user interface, a user provided software task descriptor; providing a software task created computer-generated user interface based on the user provided software task descriptor; providing a software subtask builder computer-generated user interface based on a user selected software task on the software task created computer-generated user interface, wherein the software subtask builder computer-generated user interface comprises one or more user selectable software subtasks; receiving a first software subtask selection from the one or more user selectable software subtasks provided by the software subtask builder computer-generated user interface; and creating, by a hardware processor, a first computer-executable software subtask application based on the first software subtask.

According to examples of the present disclosure, a computer system comprising a hardware processor; a non-transitory computer readable medium that stores instructions that when executed by the hardware processor perform a method comprising: receiving, by a software task creation computer-generated user interface, a user provided software task descriptor; providing a software task created computer-generated user interface based on the user provided software task descriptor; providing a software subtask builder computer-generated user interface based on a user selected software task on the software task created computer-generated user interface, wherein the software subtask builder computer-generated user interface comprises one or more user selectable software subtasks; receiving a first software subtask selection from the one or more user selectable software subtasks provided by the software subtask builder computer-generated user interface; and creating, by a hardware processor, a first computer-executable software subtask application based on the first software subtask.

According to examples of the present disclosure, a non-transitory computer readable medium that comprises instructions that when executed by a hardware processor preform a method comprising: receiving, by a software task creation computer-generated user interface, a user provided software task descriptor; providing a software task created computer-generated user interface based on the user provided software task descriptor; providing a software subtask builder computer-generated user interface based on a user selected software task on the software task created computer-generated user interface, wherein the software subtask builder computer-generated user interface comprises one or more user selectable software subtasks; receiving a first software subtask selection from the one or more user selectable software subtasks provided by the software subtask builder computer-generated user interface; and creating, by a hardware processor, a first computer-executable software subtask application based on the first software subtask.

Various additional features can be included in the method, the computer system, and the non-transitory computer readable medium including one or more of the following features. The method further comprises providing a software subtask selection computer-generated user interface based on the first software subtask selection that was received, wherein the software subtask selection computer-generated user interface comprises one or more user selectable software subtasks. The software subtask selection computer-generated user interface comprises one or more optional user-selectable software sub-subtasks. Each of the one or more user selectable software subtasks and each of the one or more optional user selectable software sub-subtasks comprise one or more user editable fields in a software subtask descriptor string, wherein each of the one or more user editable fields allows one or more words to be replaced with one or more replacement words in the software subtask descriptor string. Each of the one or more user selectable software subtasks and each of the one or more optional user selectable software sub-subtasks comprise a user-selection widget to add, remove, modify, or switch the one or more user selectable software subtasks and each of the one or more optional user selectable software sub-subtasks in the software subtask builder computer-generated user interface. The method further comprising receiving a first custom software subtask. The method further comprising providing a custom software subtask descriptor computer-generated user interface for user entry of a custom software subtask descriptor name and description based on receiving the first custom software subtask. The creating the first computer-executable software sub-task application comprises: matching a first element of the first software subtask selection with a first executable element stored as a first end node of a first data structure; and matching a second element of the first software subtask selection with a second executable element stored as a second end node of a first data structure; and constructing the first computer-executable software sub-task application by combining the first executable element and the second executable element. The first task comprises an epic programming task. The first subtask comprises a user story programming task.

BRIEF DESCRIPTION OF THE DRAWINGS

The accompanying drawings, which are incorporated in and constitute a part of this specification, illustrate embodiments of the present teachings and, together with the description, serve to explain the principles of the present teachings. In the figures:

FIG. 1A and FIG. 1B show a first example computer-generated user interface for creating a first computer software task, according to examples of the present disclosure.

FIG. 4A and FIG. 4B show a first example computer-generated user interface for creating a first computer software subtask, according to examples of the present disclosure.

FIG. 5A and FIG. 5B show a first example computer-generated user interface for creating a first computer software subtask of creating a table, according to examples of the present disclosure.

FIG. 6A and FIG. 6B show a second example computer-generated user interface for creating a first computer software subtask of creating a company table, according to examples of the present disclosure.

FIG. 7A and FIG. 7B show a third example computer-generated user interface for creating a first computer software subtask of creating a company table of FIG. 6A and FIG. 6B, according to examples of the present disclosure.

FIG. 8A and FIG. 8B show a fourth example computer-generated user interface showing three computer software tasks or epics that have been created and multiple computer software subtask or user stories for each of the three computer software tasks or epics, according to examples of the present disclosure.

FIG. 9A and FIG. 9B show a seventh example computer-generated user interface for adding or modifying the missing configuration data of the identified computer software subtask of FIG. 8A and FIG. 8B, according to examples of the present disclosure.

FIG. 10A and FIG. 10B show a second example computer-generated user interface showing three computer software tasks or epics that have been created and multiple computer software subtask or user stories for each of the three computer software tasks or epics, according to examples of the present disclosure.

FIG. 11A and FIG. 1B show another example of the first example computer-generated user interface for creating a first computer software subtask, according to examples of the present disclosure.

FIG. 12A and FIG. 12B show the first example computer-generated user interface for creating a first custom computer software subtask or custom user story showing descriptions added in the fields, according to examples of the present disclosure.

FIG. 13A and FIG. 13B show the second example computer-generated user interface showing three computer software tasks or epics that have been created and multiple computer software subtask or user stories for each of the three computer software tasks or epics, according to examples of the present disclosure.

FIG. 14A and FIG. 14B show the create company table computer-generated user interface of FIG. 7A and FIG. 7B, according to examples of the present disclosure.

FIG. 15A and FIG. 15B show a first example computer-generated user interface for the computer software subtask or user story "Primary Create, Read, Update, Delete (CRUD) Navigation" of FIG. 14A and FIG. 14B and with the cursor shown over the computer software subtask or user story "Create Search Page-List."

FIG. 16A and FIG. 16B show a shows a first example computer-generated user interface for the computer software subtask or user story "Create Search Page-List" of FIG. 15A and FIG. 15B and with the cursor shown over the switch button for the computer software subtask or user story "Create Search Page-Map," which allows the user to select a map rather than a list for the company.

FIG. 17A and FIG. 17B show a first example computer-generated user interface for the computer software subtask or user story "Create Search Page-Map" of FIG. 16A and FIG. 16B and with the cursor shown over the save and close button and a map added to computer-generated user interface.

FIG. 18A and FIG. 18B show the second example computer-generated user interface showing three computer software tasks or epics that have been created and multiple computer software subtask or user stories for each of the three computer software tasks or epics, according to examples of the present disclosure.

FIG. 19A and FIG. 19B show a first example computer-generated user interface showing the "Applicant Summary" computer-generated user interface that was selected from FIG. 18A and FIG. 18B showing a "Data View."

FIG. 20A and FIG. 20B show a first example computer-generated user interface showing the "Application Summary" computer-generated user interface that was selected from FIG. 18A and FIG. 18B showing an "Appearance View."

FIG. 21A and FIG. 21B show a first example computer-generated user interface showing the "Applicant Summary" computer-generated user interface that was selected from FIG. 18A and FIG. 18B showing a "Logic View."

FIG. 22A and FIG. 22B show a backend computer-generated user interface that allows a system administrator to search templates for computer software subtasks or user stories, according to examples of the present disclosure.

FIG. 23A and FIG. 23B show a backend computer-generated user interface that allows a system administrator to build templates for computer software subtasks or user stories, according to examples of the present disclosure.

FIG. 24A and FIG. 24B show a backend computer-generated user interface that allows a system administrator to view templates for computer software subtasks or user stories that have been created, according to examples of the present disclosure.

FIG. 25A and FIG. 25B show a backend computer-generated user interface that allows a system administrator to view templates for computer executable computer software subtasks or computer executable user stories that have been created, according to examples of the present disclosure.

FIG. 26A and FIG. 26B show a backend computer-generated user interface that allows a system administrator to view an attribute for a selected template for computer executable computer software subtask or computer executable user story that have been created from backend computer-generated user interface, according to examples of the present disclosure.

FIG. 27A and FIG. 27B show a backend computer-generated user interface that allows a system administrator to view a table selection attribute for a selected template for computer executable computer software subtask or computer executable user story that have been created from backend computer-generated user interface, according to examples of the present disclosure.

FIG. 28A and FIG. 28B show a backend computer-generated user interface that allows a system administrator to attach a selected template for computer executable computer software subtask or computer executable user story that have been created from backend computer-generated user interface, according to examples of the present disclosure.

FIG. 29A and FIG. 29B show a backend computer-generated user interface that allows a system administrator to change a status of a selected template for computer executable computer software subtask or computer executable user story that have been created from backend computer-generated user interface, according to examples of the present disclosure.

FIG. 30A and FIG. 30B show a backend computer-generated user interface that allows a system administrator to manage a synonym configuration for one or more selected template for computer executable computer software subtasks or computer executable user stories that have been created from backend computer-generated user interface, according to examples of the present disclosure.

FIG. 31A and FIG. 31B show a backend computer-generated user interface that allows a system administrator to a view a word attribute from the list of synonyms for a selected template for computer executable computer software subtask or computer executable user story that have been created from backend computer-generated user interface, according to examples of the present disclosure.

FIG. 32A and FIG. 32B show a backend computer-generated user interface that allows a system administrator to add a custom synonym from the list of synonyms for a selected template for computer executable computer software subtask or computer executable user story that have been created from backend computer-generated user interface, according to examples of the present disclosure.

FIG. 33A and FIG. 33B show a backend computer-generated user interface that allows a system administrator to view a search analysis for a selected template for computer executable computer software subtasks or computer executable user stories that have been created from backend computer-generated user interface, according to examples of the present disclosure.

FIG. 34A and FIG. 34B show a backend computer-generated user interface that allows a system administrator to view a test case for a selected template for computer executable computer software subtasks or computer executable user stories that have been created from backend computer-generated user interface, according to examples of the present disclosure.

FIG. 35A and FIG. 35B show a backend computer-generated user interface that allows a system administrator to view a search entry for a selected template for computer executable computer software subtasks or computer executable user stories that have been created from backend computer-generated user interface, according to examples of the present disclosure.

FIG. 36 shows a method according to examples of the present disclosure.

FIG. 37 shows a method according to examples of the present disclosure.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

Figure 1A:
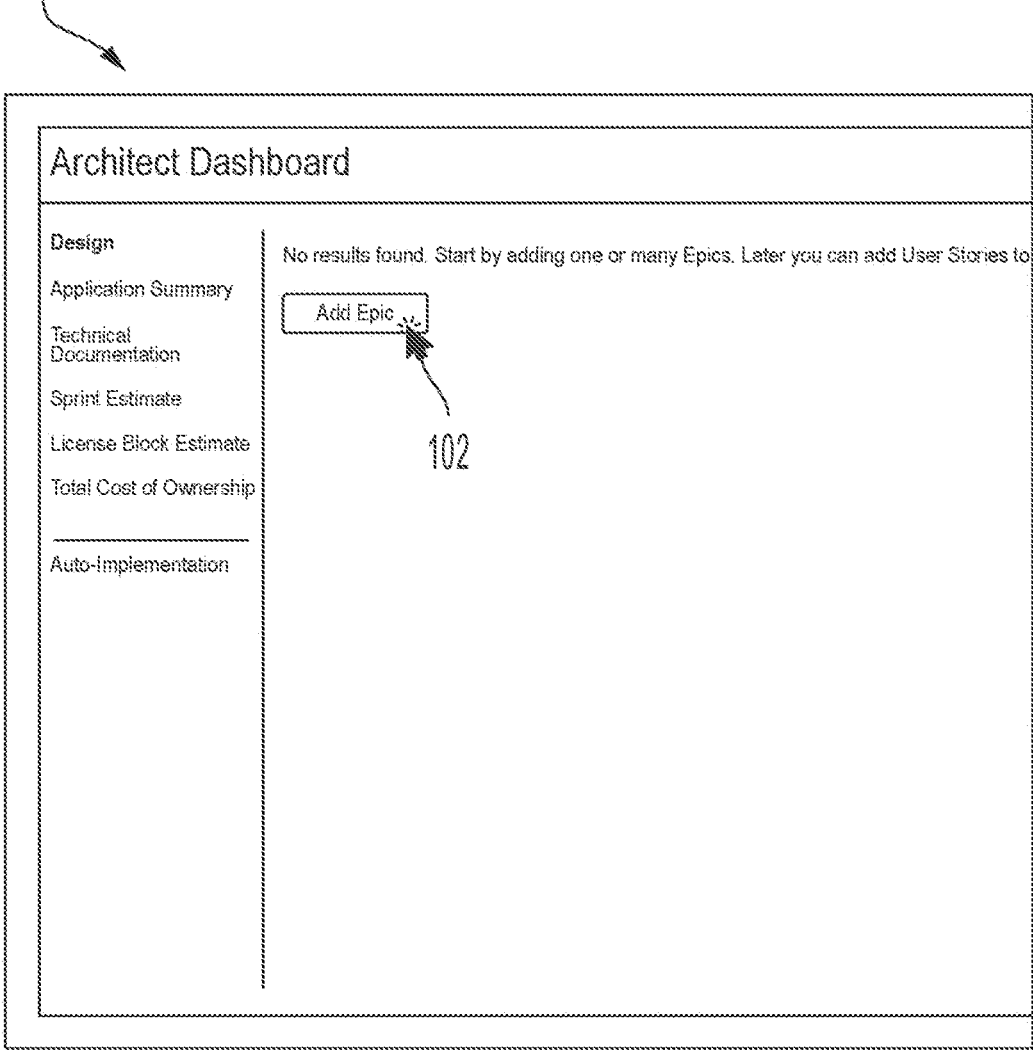
Figure 1B:
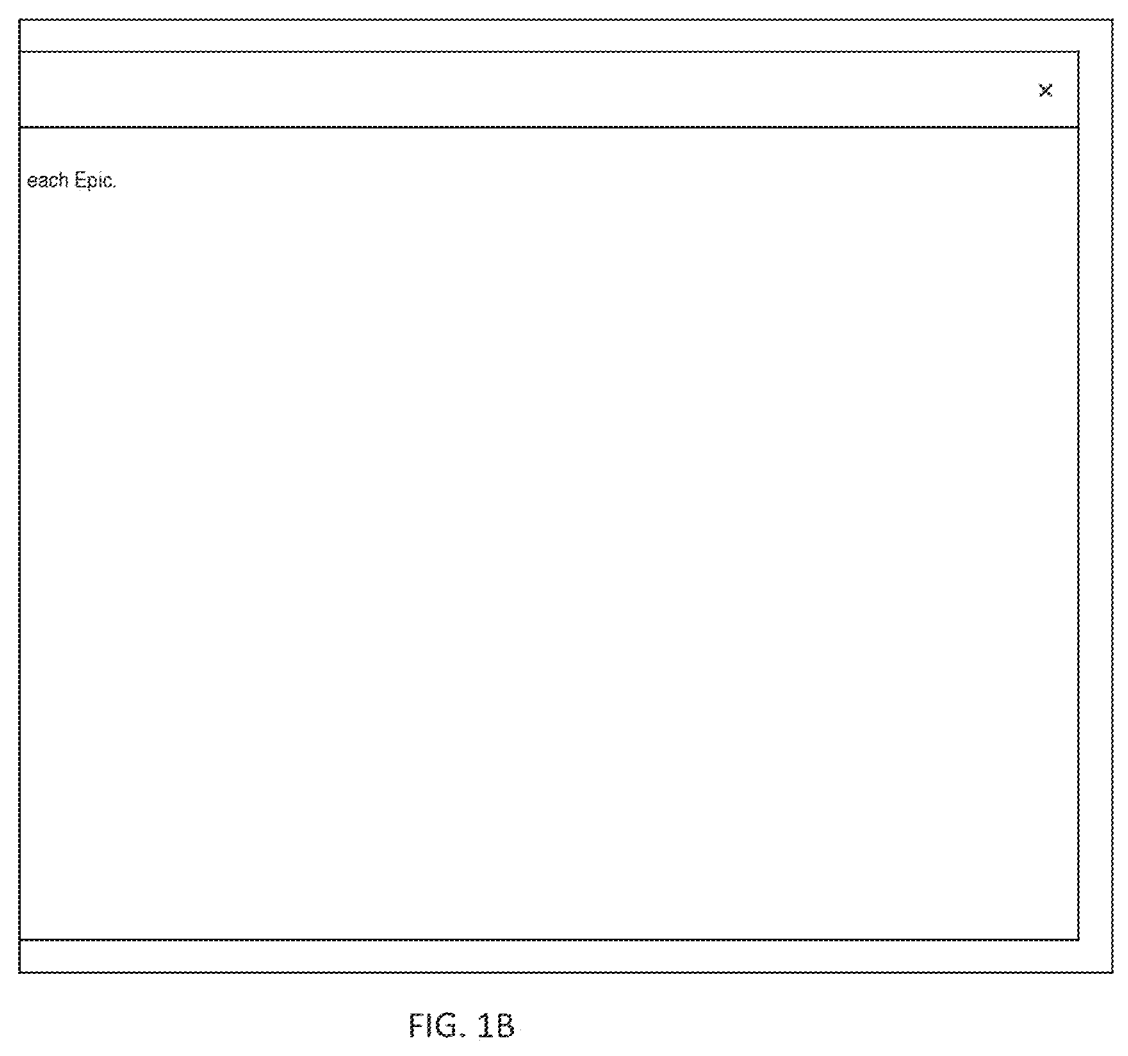

FIG. 1A and FIG. 1B show a first example computer-generated user interface 100 for creating a first computer software task, according to examples of the present disclosure. As shown in this first example, no previous computer software tasks have been created. Computer-generated user interface 100 can be an initial user interface that is presented to the user, which is named "Architect Dashboard," in this example. Computer-generated user interface 100 comprises user-selectable field 102, such as a widget, an icon, a button, a link, or other suitable user selectable browser element, that allows a user to create a new software task. In the example of an agile computing platform, the new software task can be an epic, which is a general term for one or more related sub-tasks or user stories. Computer-generated user interface 100 can also comprise one or more management-type user-selectable fields, such as application summary, technical documentation, sprint estimate, license block estimate, total cost of ownership, and auto-implementation.

Figure 2A:
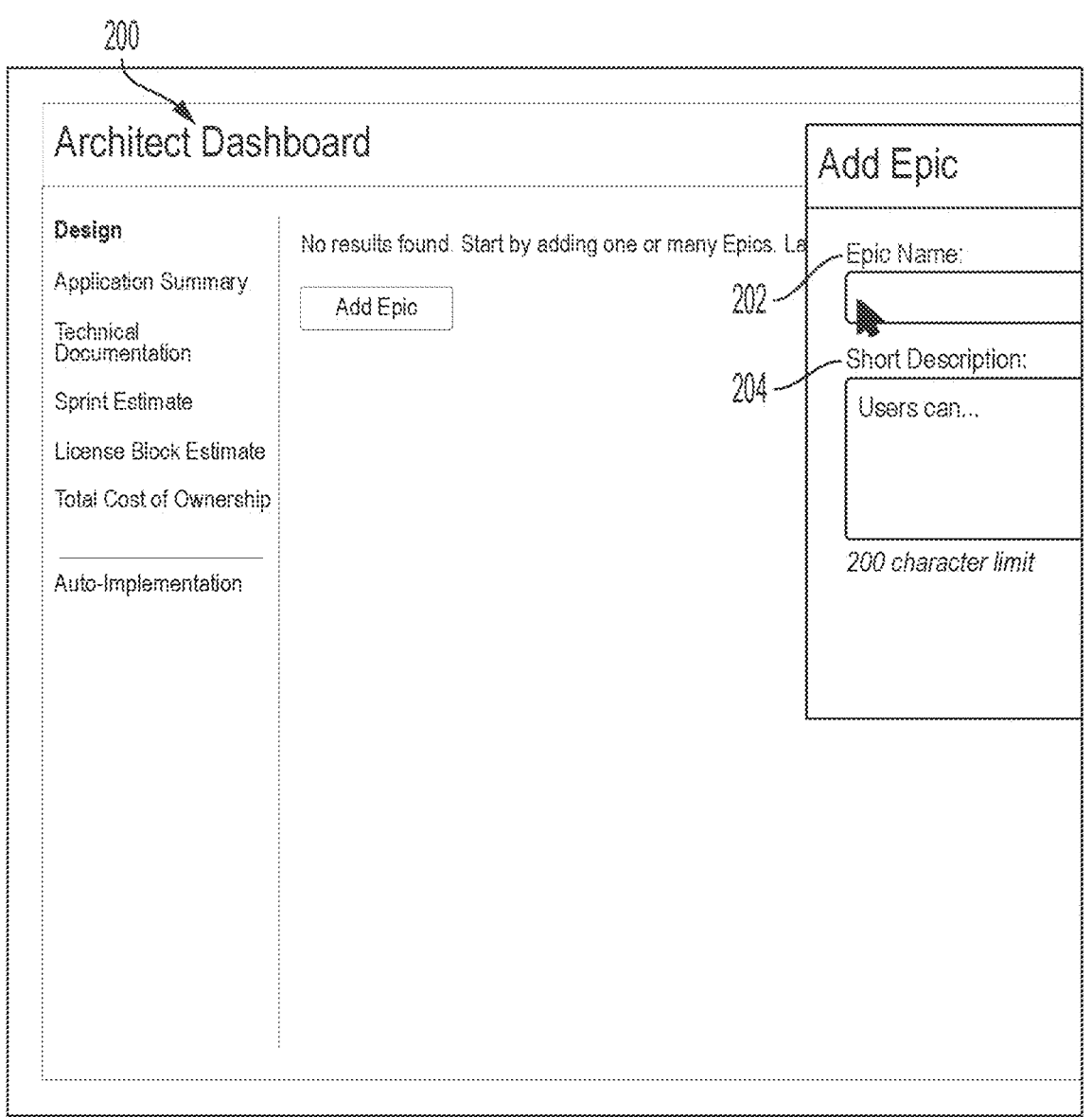
FIG. 2A and FIG. 2B show a second example computer-generated user interface for creating a first computer software task, according to examples of the present disclosure.
Figure 2B:
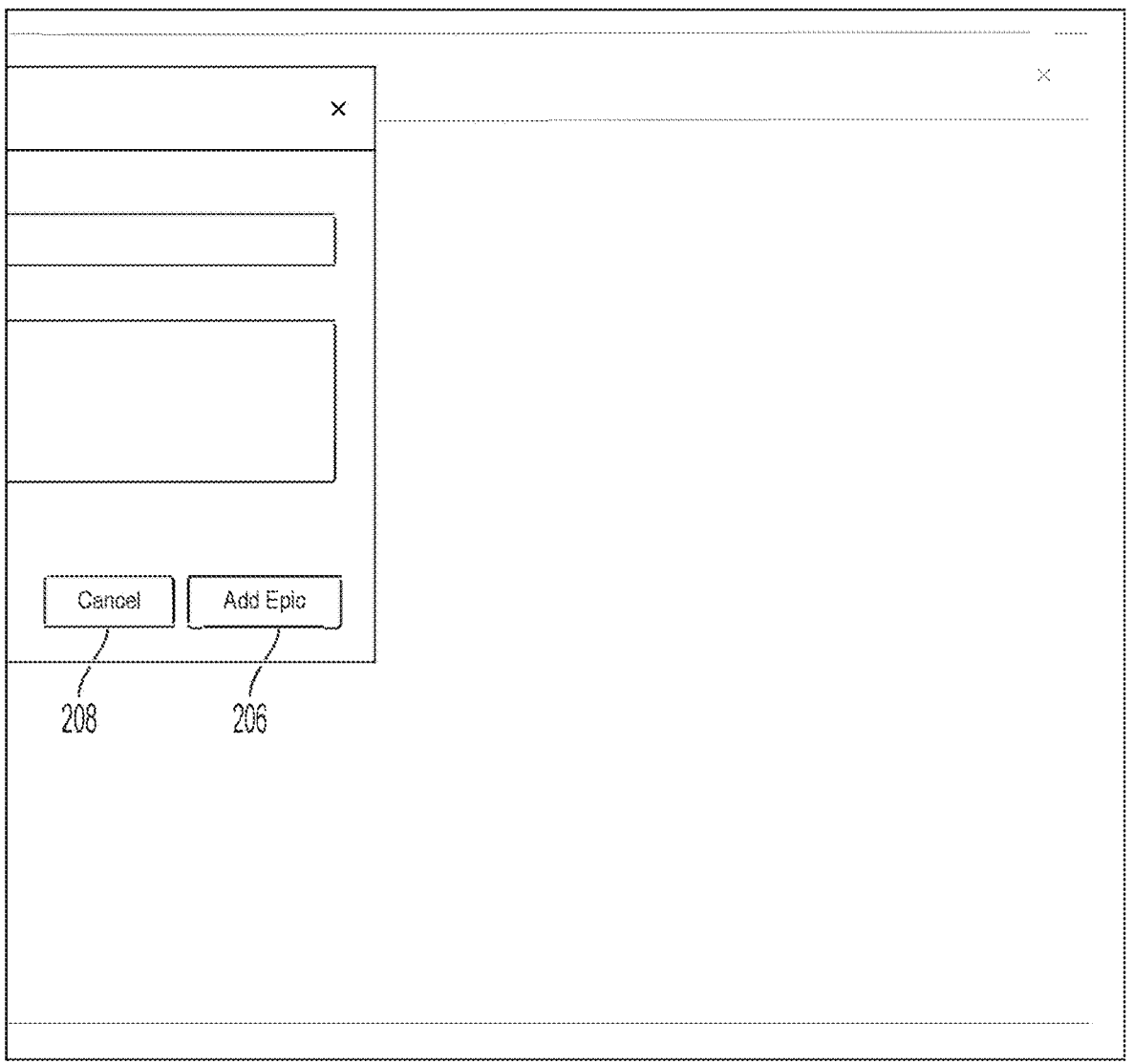

FIG. 2A and FIG. 2B show a second example computer-generated user interface 200 for creating a first computer software task, according to examples of the present disclosure. As shown in this second example, the user selects user-selectable field 102, and computer-generated user interface 200 is generated that comprises software task name field 202 that allows the user to enter a name for the new software task that is being created and software task description field 204 that allows the user to enter a short description of the new software task. Computer-generated user interface 200 also comprises user-selectable add software task button 206 that allows the user to add the new software task to the system to be built by the system and user-selectable cancel button 208 that allows the user to cancel the new software task.

As a second example, the user can enter the name for the new software task in software task name field 202 and enter the description in software task description field 204 of FIG. 2A and FIG. 2B. In this example, the name for the software task can be "Managing Payments" and the description can be "Users can process and log the payments made against Invoices." The user can then select user-selectable add software task button 206 to add the new software task to be built by the system.

Figure 3A:
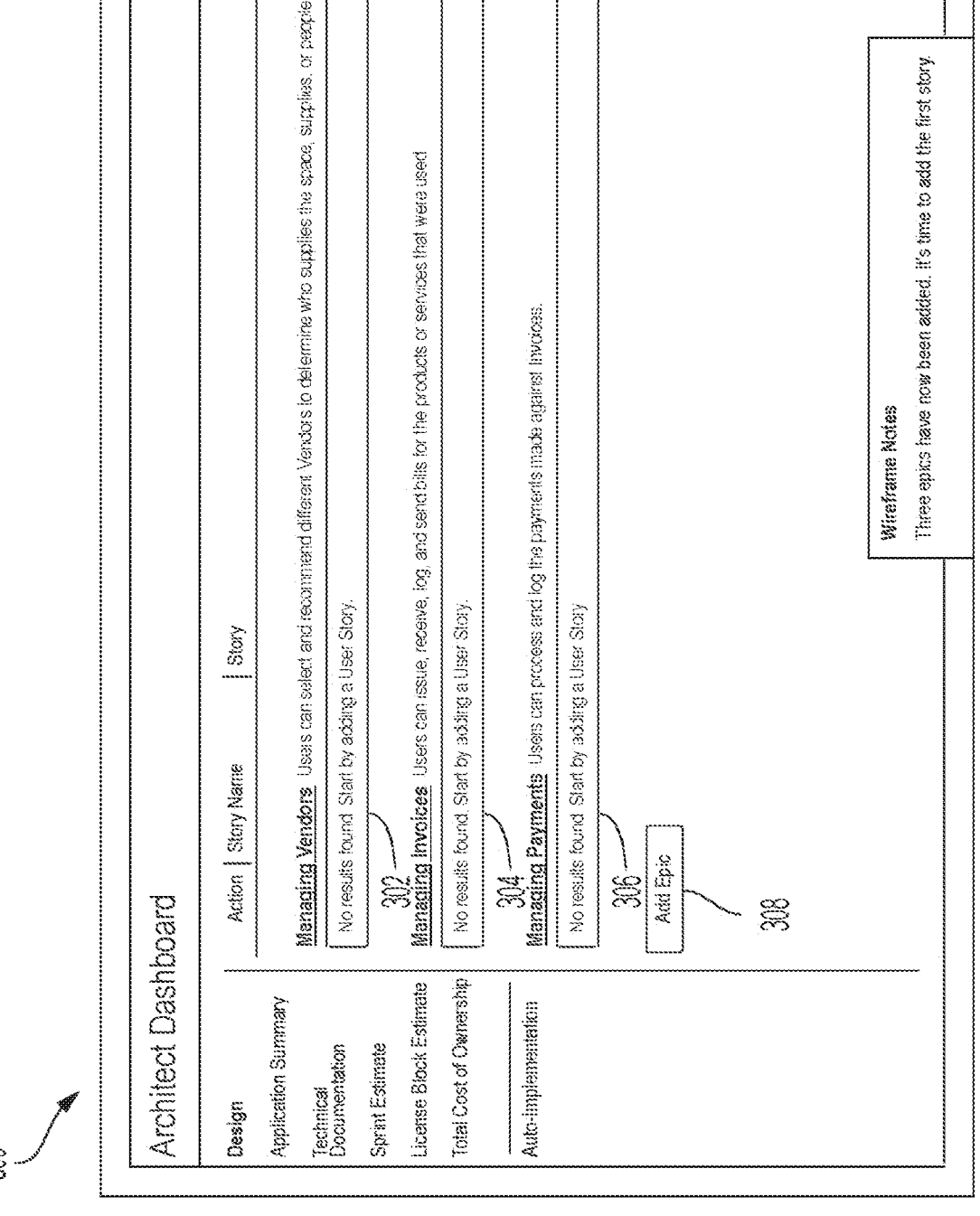
FIG. 3A and FIG. 3B show a third example computer-generated user interface that is similar to FIG. 1A and FIG. 1B but showing the creation of three computer software tasks and also showing a cursor selecting to add a computer software subtask for the first list computer task according to examples of the present disclosure.
Figure 3B:
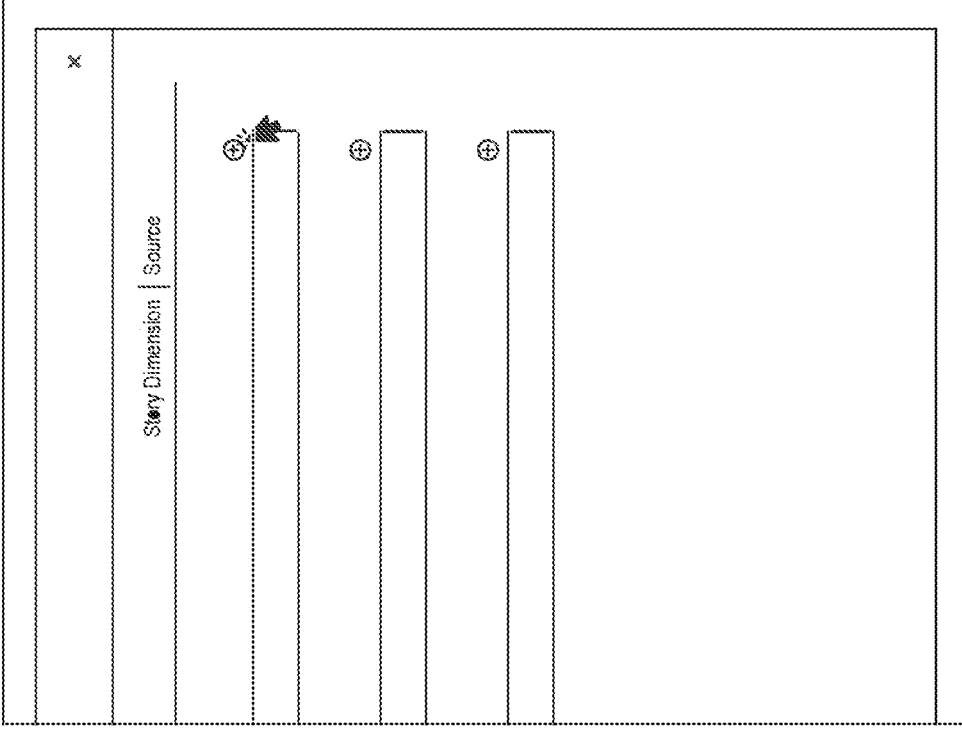

FIG. 3A and FIG. 3B show a third example computer-generated user interface 300 that is similar to FIG. 1A and FIG. 1B but showing the creation of three computer software tasks and also showing a cursor selecting to add a computer software subtask for the first list computer task according to examples of the present disclosure. As shown in this fourth example, which is similar to the example shown in FIG. 1A and FIG. 1B, but with three different software tasks having been created using the process as described in FIG. 2A and FIG. 2B. As shown, the three different software tasks are "Managing Vendors" 302, "Managing Invoices" 304, and "Managing Payments" 306. A new software task can be added by selecting the "Add Epic" button 308.

Figure 4A:
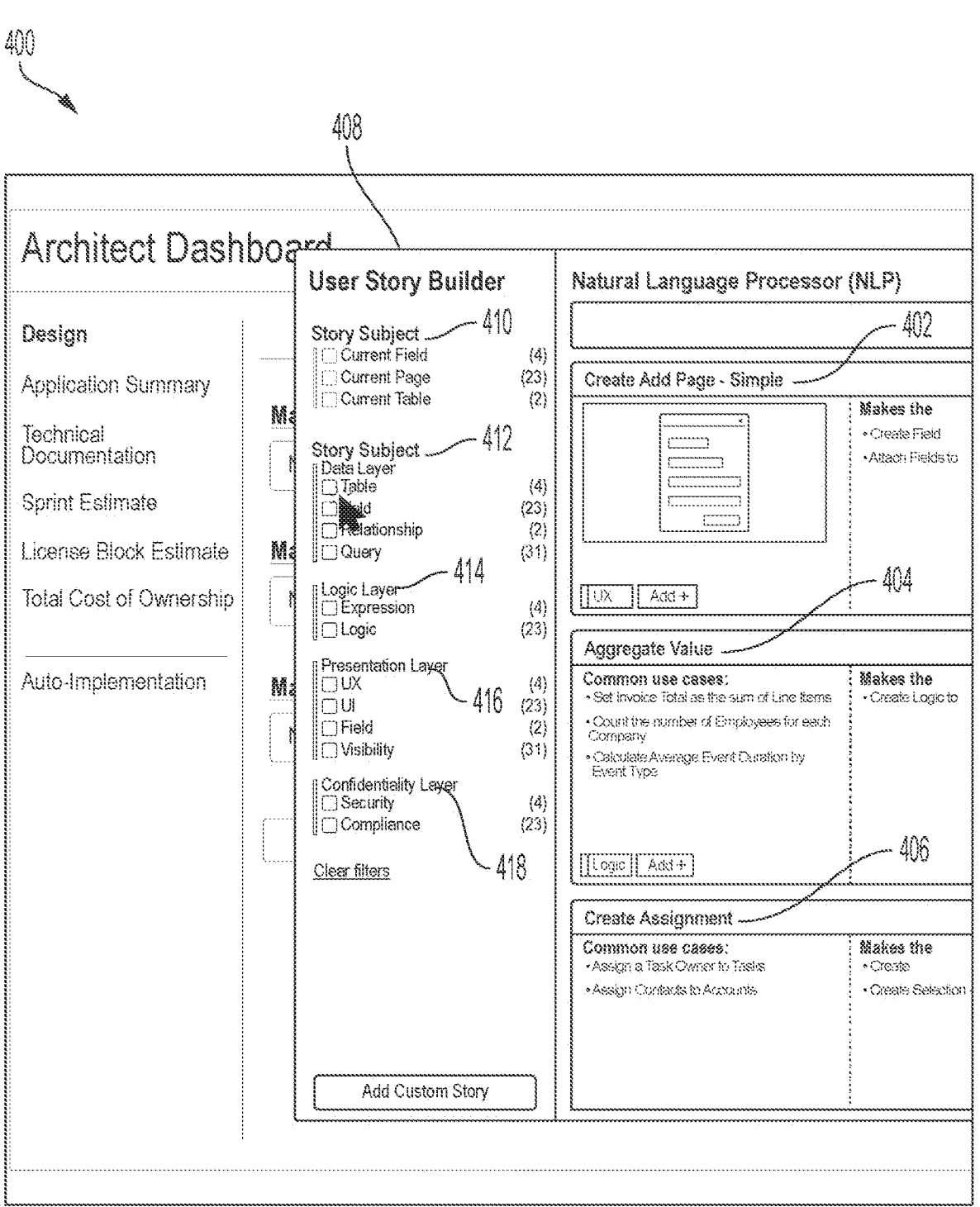

FIG. 4A and FIG. 4B show a first example computer-generated user interface 400 for creating a first computer software subtask, according to examples of the present disclosure. As shown in FIG. 4A and FIG. 4B, the first computer software subtask is created using a first computer subtask builder user interface, or user story builder user interface in the example of the Agile computing platform environment as shown, which comprises one or more sections that allows the user to build the software subtask based on one of previously created software tasks. Additional section can be provided for the user to select from that show additional computer software subtask templates that have been created in stored in a subtask template repository. For example, the one or more sections can include, but are not limited to, select a computer subtask or user story, select one or more computer subtask or user story options, and select one or more computer subtask or user story variations. In the example shown in FIG. 4A and FIG. 4B, first section 402 provides examples to the user for creating a first computer software subtask based on the created or selected computer software task and allows for the user to select a section creation an add page for creating the first computer software subtask. Second section 404 provides examples to the user for aggregate values for common use cases related to the computer software subtask and allows for the user to enter one or more values for the computer software subtask. Third section 406 provides examples to the user for creation of assignment for common use cases and allows for the user to enter a descriptor for the assignment for the computer software subtask. First example computer-generated user interface 400 for creating a first computer software subtask also comprises further user-selectable sections 408 that provides customization to the user in creating the computer software subtask, such as story subject field 410, story dimension field 412, logic layer field 414, presentation layer field 416, and confidentiality layer field 418. Story subject field 410 can include one or more user-selectable subfields, including but are not limited to, current field, current page, and current table. Story dimension field 412 can include one or more user-selectable subfields, including but are not limited to, data layer, which can include one or more further user-selectable subfields, including but are not limited to, table field, relationship, and query. Logic layer field 414 can include one or more user-selectable subfields, including but are not limited to, expression and logic. Presentation Layer field 416 can include one or more user-selectable subfields, including but are not limited to, user experience (UX), user interface (UI), field, and visibility. Confidentiality layer field 418 can include one or more user-selectable subfields, including but are not limited to, security and compliance. As shown in FIG. 4A and FIG. 4B, a cursor is shown over the table subfield of the story dimension field 412, which is further shown in FIG. 5A and FIG. 5B. First example computer-generated user interface 400 for creating a first computer software subtask also comprises further user-selectable field 420 for allowing the user to create a custom computer software subtask, or custom story in the terminology of the Agile computing platform.

FIG. 5A and FIG. 1B show a first example computer-generated user interface 500 for creating a first computer software subtask of creating a table, according to examples of the present disclosure. As shown in FIG. 5A and FIG. 5B, the first computer software subtask being created is a table based on the user selection of FIG. 4A and FIG. 4B and provides the user with a selected set of examples computer software subtasks to be selected for the table that is to be created, such as, but are not limited to, create business document table, create communication table, and create company table. Each example computer software subtask, i.e., create business table, create communication table, create company table, that can be chosen by the user creates different fields or sections and interfaces for the respective table that will be created. In the example shown in FIG. 5A and FIG. 5B, first section 502 provides examples to the user for creating the first computer software subtask of creating a business document table, provides the user with common use case examples for the creation of the business document table, provides the user with common changes that can be made in the creation of the business document table, and provides the user with computer software subtask options in the creation of the business document table. Second section 504 provides examples to the user for creating the first computer software subtask of creating a communication table, provides the user with common use case examples for the creation of the communication table, provides the user with common changes that can be made in the creation of the communication table, and provides the user with computer software subtask options in the creation of the communication table. Third section 506 provides examples to the user for creating the first computer software subtask of creating a company table, provides the user with common use case examples for the creation of the company table, provides the user with common changes that can be made in the creation of the company table, and provides the user with computer software subtask options in the creation of the company table. As shown in FIG. 5A and FIG. 5B, a cursor is shown over a selection button for the creation of the company table, which is further shown in FIG. 6A and FIG. 6B.

FIG. 6A and FIG. 6B show a second example computer-generated user interface 600 for creating a first computer software subtask of creating a company table, according to examples of the present disclosure. As shown in FIG. 6A and FIG. 6B, the first computer software subtask being added is the creation of a company table based on the user selection of FIG. 5A and FIG. 5B and provides the user with a selected set of examples computer software sub-subtask or user stories and optional selected set of alternative examples of computer software sub-subtask or user stories for the company table creation. Each of the selected set of examples computer software sub-subtask or user stories and optional selected set of alternative examples of computer software sub-subtask or user stories can include a user-selectable action item (i.e., button) for the selection or removal of a particular computer software sub-subtask, a computer software sub-subtask name (i.e., story name), and a description of the particular computer software sub-subtask (i.e., user story). In each of the selected set of examples computer software sub-subtask or user stories and optional selected set of alternative examples of computer software sub-subtask or user stories, one or more fields or words in the story description can be customized by the user based on the particular computer software subtask being created.

Figure 7A:
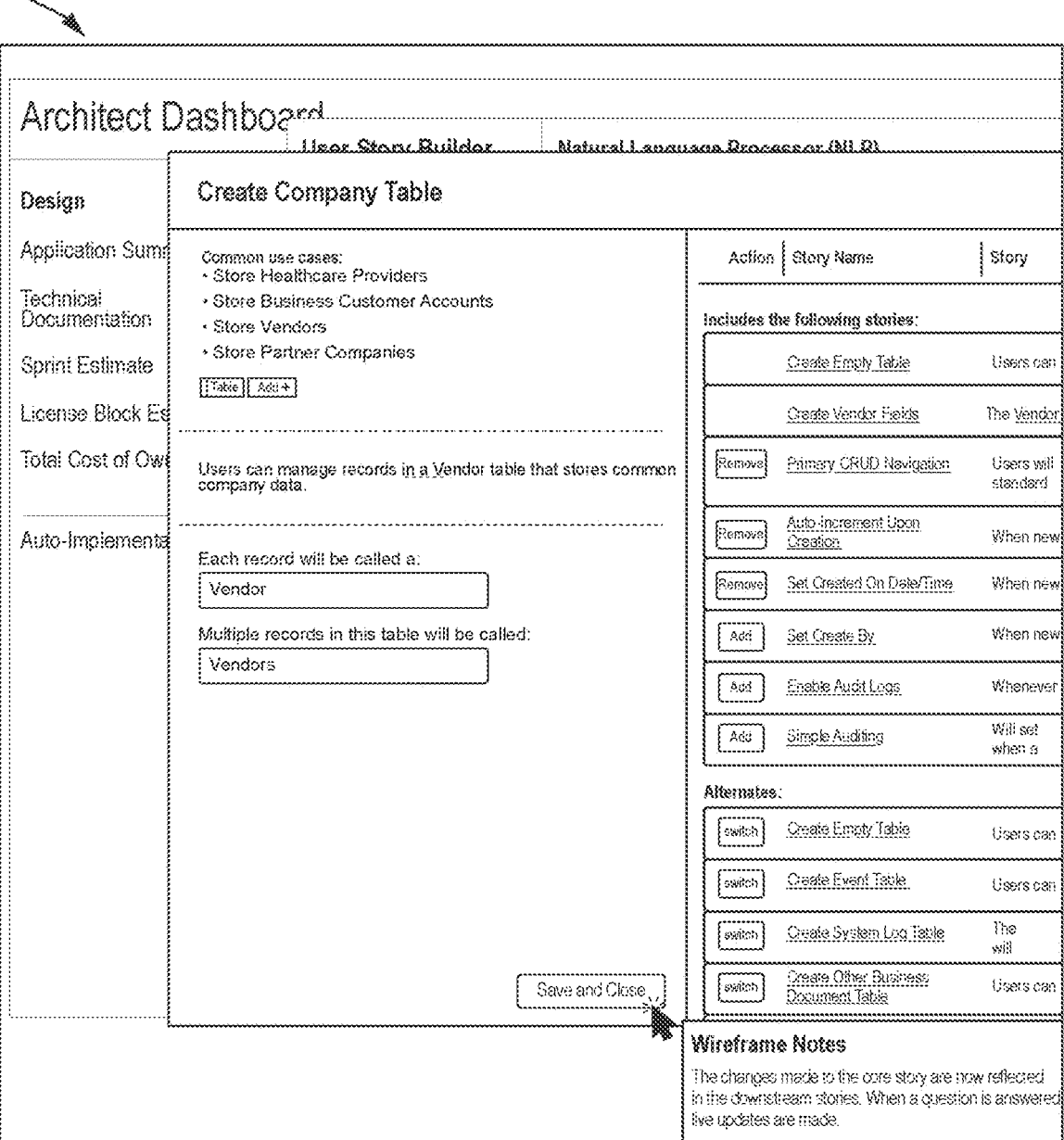

FIG. 7A and FIG. 7B show the third example computer-generated user interface 700 for creating a first computer software subtask of creating a company table of FIG. 6A and FIG. 6B, according to examples of the present disclosure, showing a change being made to in each record to change "company" to "vendor" of the selected set of examples computer software subtask or user stories and optional selected set of alternative examples of computer software subtask or user stories.

FIG. 8A and FIG. 8B show a fourth example computer-generated user interface 800 showing three computer software tasks or epics that have been created and multiple computer software subtask or user stories for each of the three computer software tasks or epics, according to examples of the present disclosure. Computer-generated user interface 800 is an updated version of the initial user interface that is presented to the user, which is named "Architect Dashboard," in this example. As shown in FIG. 8A and FIG. 8B, one computer software subtask or user story is shown that still needs user input to complete the configuration data of the computer software subtask or user story. As shown in FIG. 8A and FIG. 8B, a cursor is shown over the missing configuration data to allow the user select and the system to provide the related computer-generated user interface to enter the missing data, which is further shown in FIG. 9A and FIG. 9B.

Figure 9B:
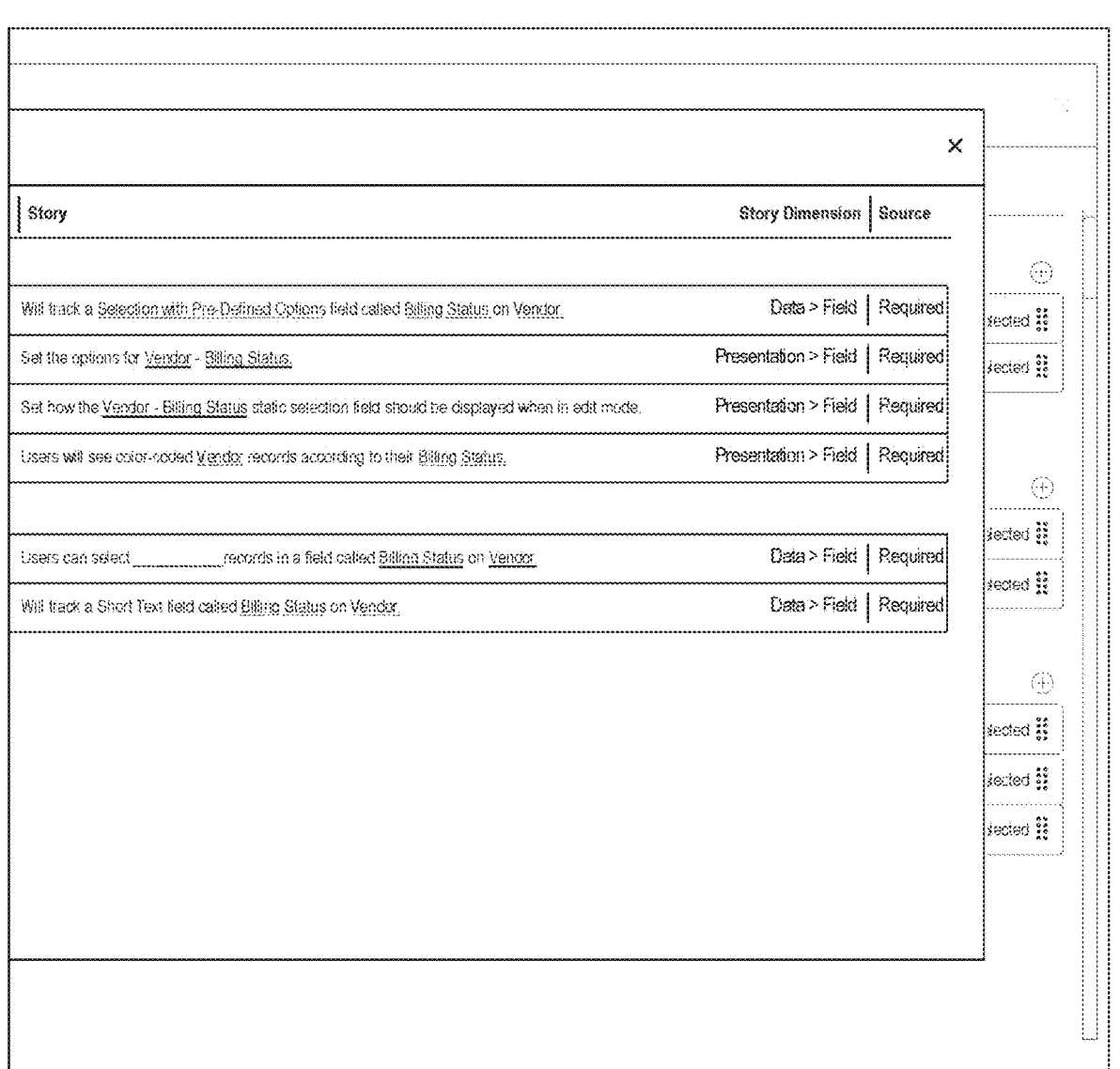

FIG. 9A and FIG. 9B show the fifth example computer-generated user interface 900 for adding or modifying the missing configuration data of the identified computer software subtask, according to examples of the present disclosure. As shown in FIG. 9A and FIG. 9B, the user has added the options of "Pending, Complete, Cancelled" in the field of "What options should be available in this field?" As shown in FIG. 9A and FIG. 9B, a cursor is shown over button "Save and Close" to save the user entered entries on the computer-generated user interface 900.

FIG. 10A and FIG. 10B show the second example computer-generated user interface 1000 showing three computer software tasks or epics that have been created and multiple computer software subtask or user stories for each of the three computer software tasks or epics, according to examples of the present disclosure, with the incomplete computer software subtask or user story of FIG. 10A and FIG. 10B saved, closed, and resolved.

Figure 11B:
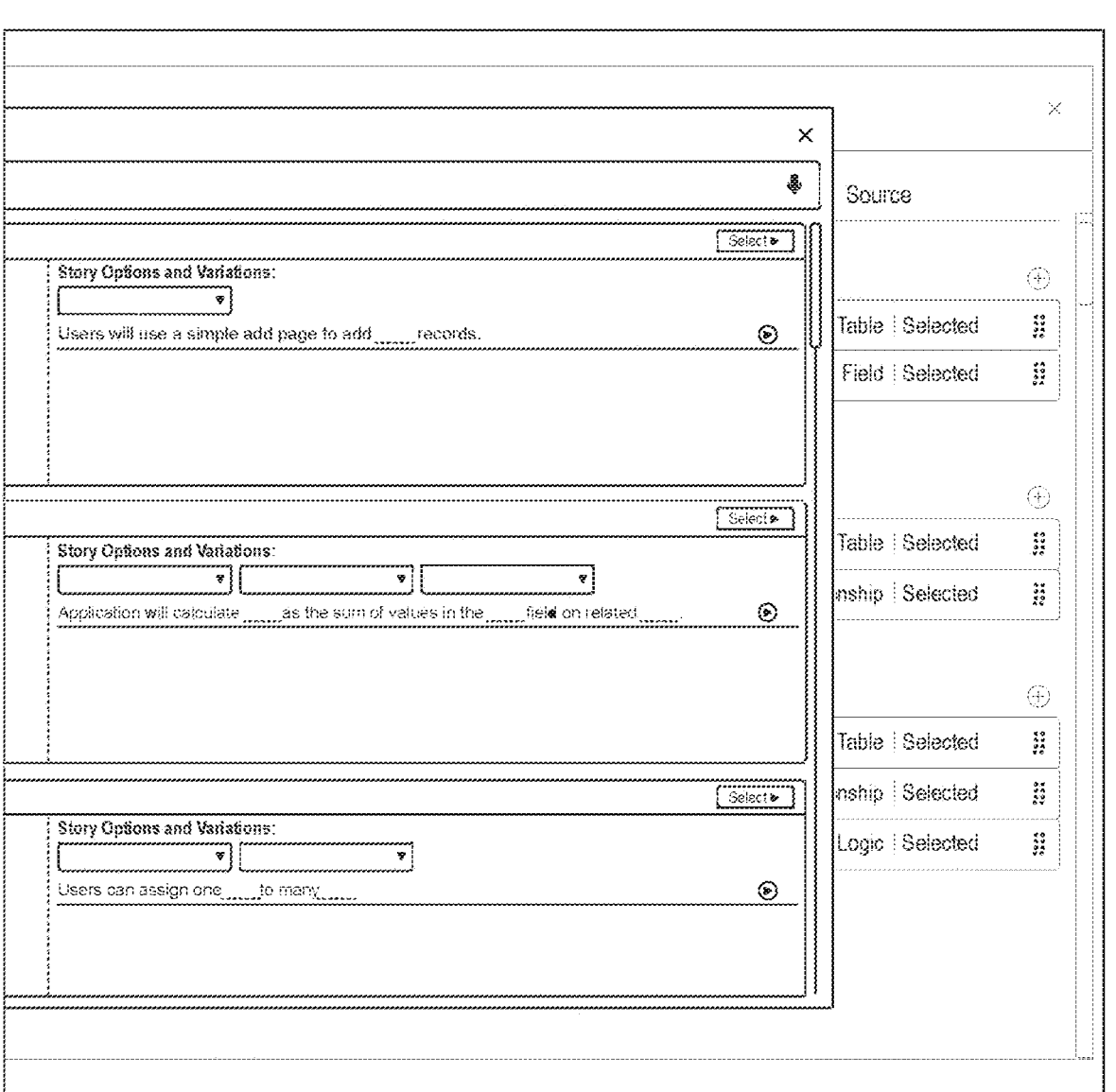

FIG. 11A and FIG. 11B show another example of the first example computer-generated user interface 1100 for creating a first computer software subtask, according to examples of the present disclosure, with the cursor shown over the button "Add Custom Story," which allows the user to create a custom computer software subtask or user story.

In some examples, custom computer software subtask or custom user story can be created based on the selection described in FIG. 11A and FIG. 11B. For example, a computer-generated user interface can comprise a first field that allows the user to enter a name for the new custom software subtask or custom user story that is being created and a second field that allows the user to enter a short description for the new custom software subtask or custom user story. The computer-generated user interface can also comprise user-selectable add software subtask button that allows the user to add the new software custom subtask or custom user story to be built by the system and user-selectable cancel button that allows the user to cancel the new custom software subtask or custom user story.

Figure 12B:
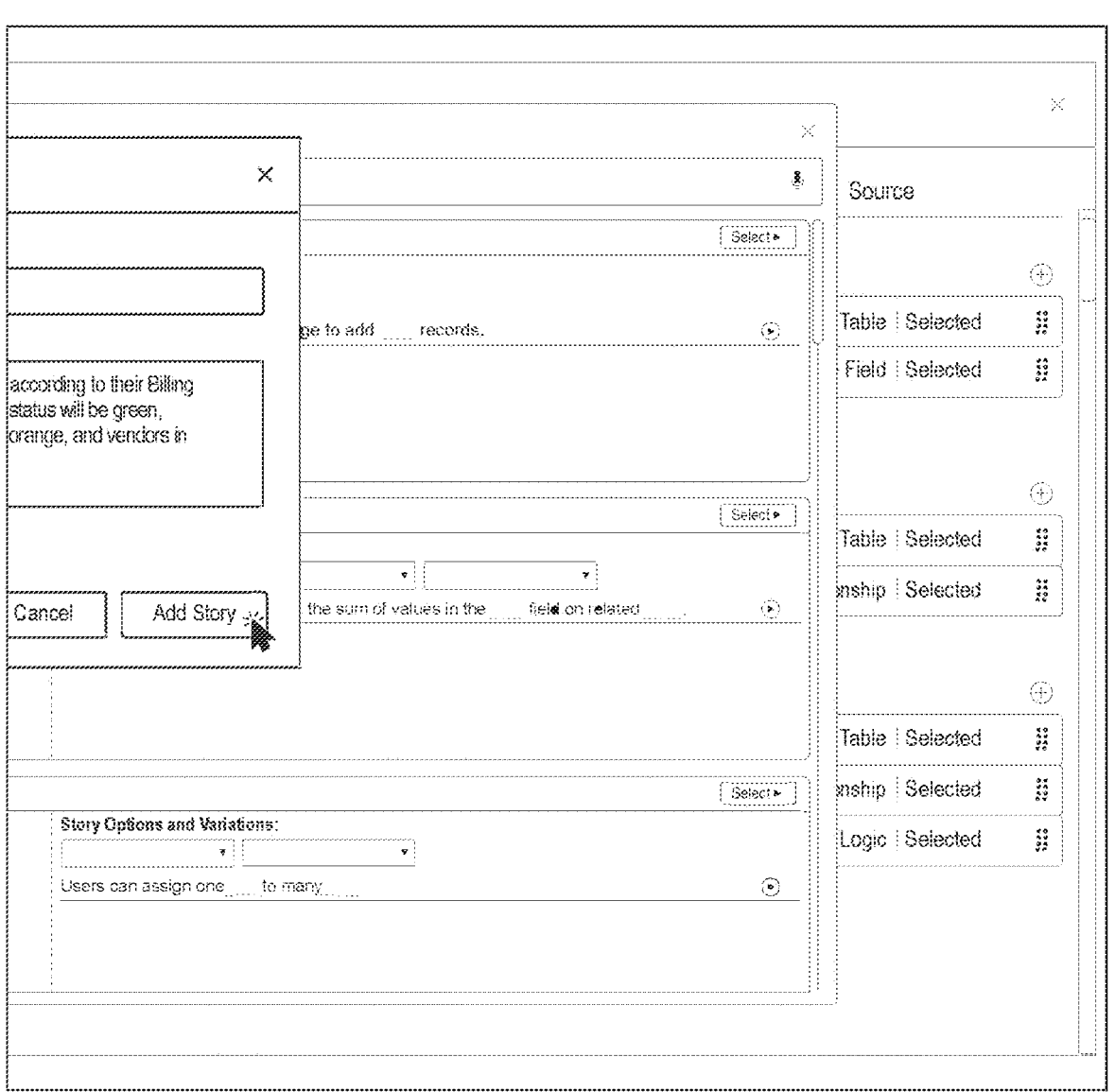

FIG. 12A and FIG. 12B show a first example computer-generated user interface 1200 for creating a first custom computer software subtask or custom user story showing descriptions added in the fields, according to examples of the present disclosure, with the user story field and short description field completed by the user and with the cursor shown over the button "Add Story."

FIG. 13A and FIG. 13B show a second example computer-generated user interface 1300 showing three computer software tasks or epics that have been created and multiple computer software subtask or user stories for each of the three computer software tasks or epics, according to examples of the present disclosure, with the addition of the first custom computer software subtask or custom user story of FIG. 12A and FIG. 12B added.

FIG. 14A and FIG. 14B show a create company table computer-generated user interface 1400 similar to that shown in FIG. 6A and FIG. 6B, according to examples of the present disclosure, showing the cursor over the computer software subtask or user story "Primary CRUD Navigation.

FIG. 15A and FIG. 15B show a first example computer-generated user interface 1500 for the computer software subtask or user story "Primary Create, Read, Update, Delete (CRUD) Navigation" that is similar to that shown in FIG. 14A and FIG. 14B and with the cursor shown over the computer software subtask or user story "Create Search Page-List."

FIG. 16A and FIG. 16B show a first example computer-generated user interface 1600 for the computer software subtask or user story "Create Search Page-List" that is similar to that shown in FIG. 15A and FIG. 15B and with the cursor shown over the switch button for the computer software subtask or user story "Create Search Page-Map," which allows the user to select a map rather than a list for the company.

FIG. 17A and FIG. 17B show a first example computer-generated user interface 1700 for the computer software subtask or user story "Create Search Page-Map" that is similar to that shown in FIG. 16A and FIG. 16B and with the cursor shown over the save and close button and a map added to computer-generated user interface 1700.

FIG. 18A and FIG. 18B show the second example computer-generated user interface 1800 showing three computer software tasks or epics that have been created and multiple computer software subtask or user stories for each of the three computer software tasks or epics, according to examples of the present disclosure, with each computer software subtask or user story dialog having been individually saved and closed and with the cursory shown over the "Application Summary" user-selectable field.

FIG. 19A and FIG. 9B show a first example computer-generated user interface 1900 showing the "Applicant Summary" computer-generated user interface that was selected from FIG. 18A and FIG. 18B showing a "Data View."

FIG. 20A and FIG. 20B show a first example computer-generated user interface 2000 showing the "Application Summary" computer-generated user interface that was selected from FIG. 18A and FIG. 18B showing an "Appearance View."

FIG. 21A and FIG. 21B show a first example computer-generated user interface 2100 showing the "Applicant Summary" computer-generated user interface that was selected from FIG. 18A and FIG. 18B showing a "Logic View."

FIG. 22A and FIG. 22B show a backend computer-generated user interface 2200 that allows a system administrator to search templates for computer software subtasks or user stories, according to examples of the present disclosure. As shown in FIG. 22A and FIG. 22B, each computer software subtask or user story is arranged in a row in a table format, or other suitable format, with various attributes arranged in as an entry in a column format, including, but are not limited to, a computer software subtask or a user story tag, a computer software subtask text or a user story text, a list of synonyms for selected words in the computer software subtask or the user story, a number of synonyms in the list of synonyms for selected words found in other computer software subtasks or other the user stories, a date at which the computer software subtask or the user story was last updated, a date at which the computer software subtask or the user story was last stage pushed, a date at which the computer software subtask or the user story was last product pushed, and a status indicator that indicates that the computer software subtask or the user story is still being worked on or is ready to be published by the system for use by an end user.

Figure 23A:
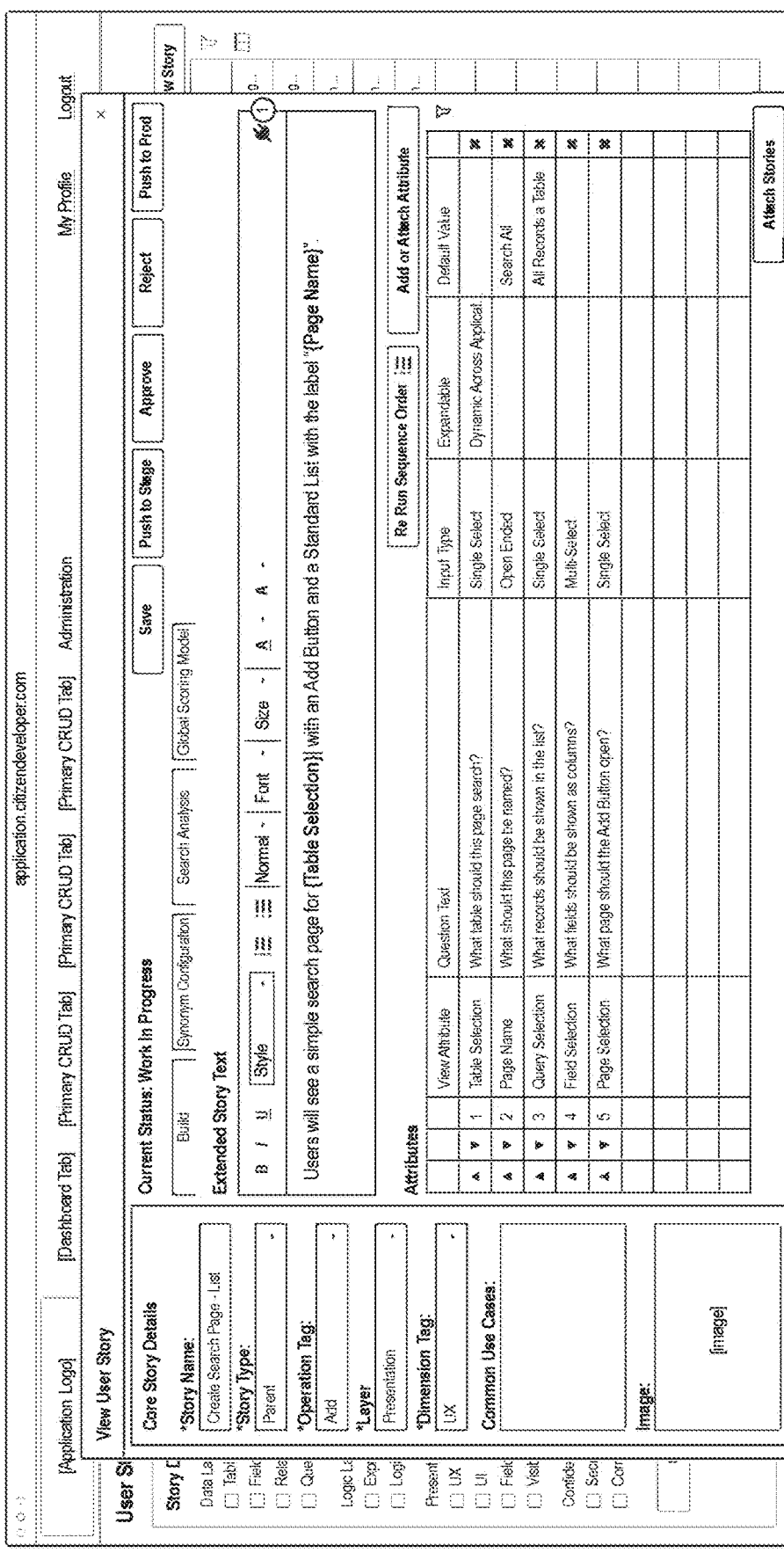

FIG. 23A and FIG. 23B show a backend computer-generated user interface 2300 that allows a system administrator to build templates for computer software subtasks or user stories, according to examples of the present disclosure. For example, the system administrator can place a cursor at a desired spot in a field on backend computer-generated user interface 2300 in a sentence and then select and insert an attribute from a template plugin, such as a TinyMCE template plugin. The templates to choose from can be dynamically driven from the attribute on the selected computer software subtask or user story for insertion. As shown in FIG. 23A and FIG. 23B, backend computer-generated user interface 2300 comprises a plurality of system administrator editable or fillable fields for core computer software subtask or core user story details including, but are not limited to, story name, story type, operation tags, layer, dimension tags, and common use cases. Backend computer-generated user interface 2300 also comprises a plurality of system administrator editable or fillable fields including, but are not limited to, an extended story text field that allows the system administrator to enter the text of a particular computer software subtask or user story that can be in the form of a sentence with typical sentence syntax, a list of attributes for the particular computer software subtask or user story, and a list of required, and alternative computer software subsubtasks or sub user stories for the particular computer software subtask or user story.

Figure 24A:
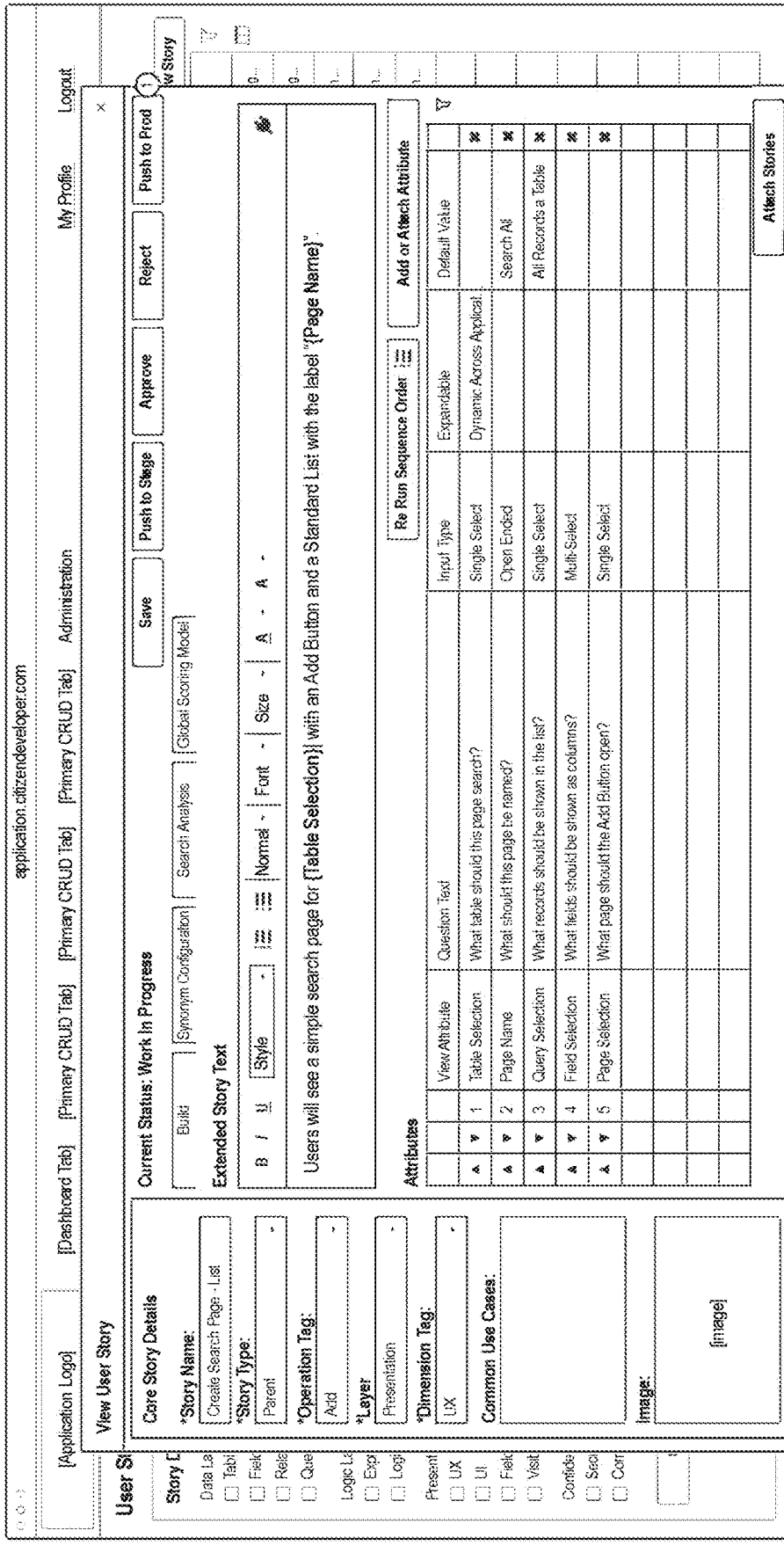

FIG. 24A and FIG. 24B show a backend computer-generated user interface 2400 that allows a system administrator to view templates for computer software subtasks or user stories that have been created, according to examples of the present disclosure. As shown in FIG. 24A and FIG. 24B, backend computer-generated user interface 2400 is similar to backend computer-generated user interface 2300, but allows the system administrator to view the various attributes and fields of a particular computer software subtask or user story.

Figure 25A:
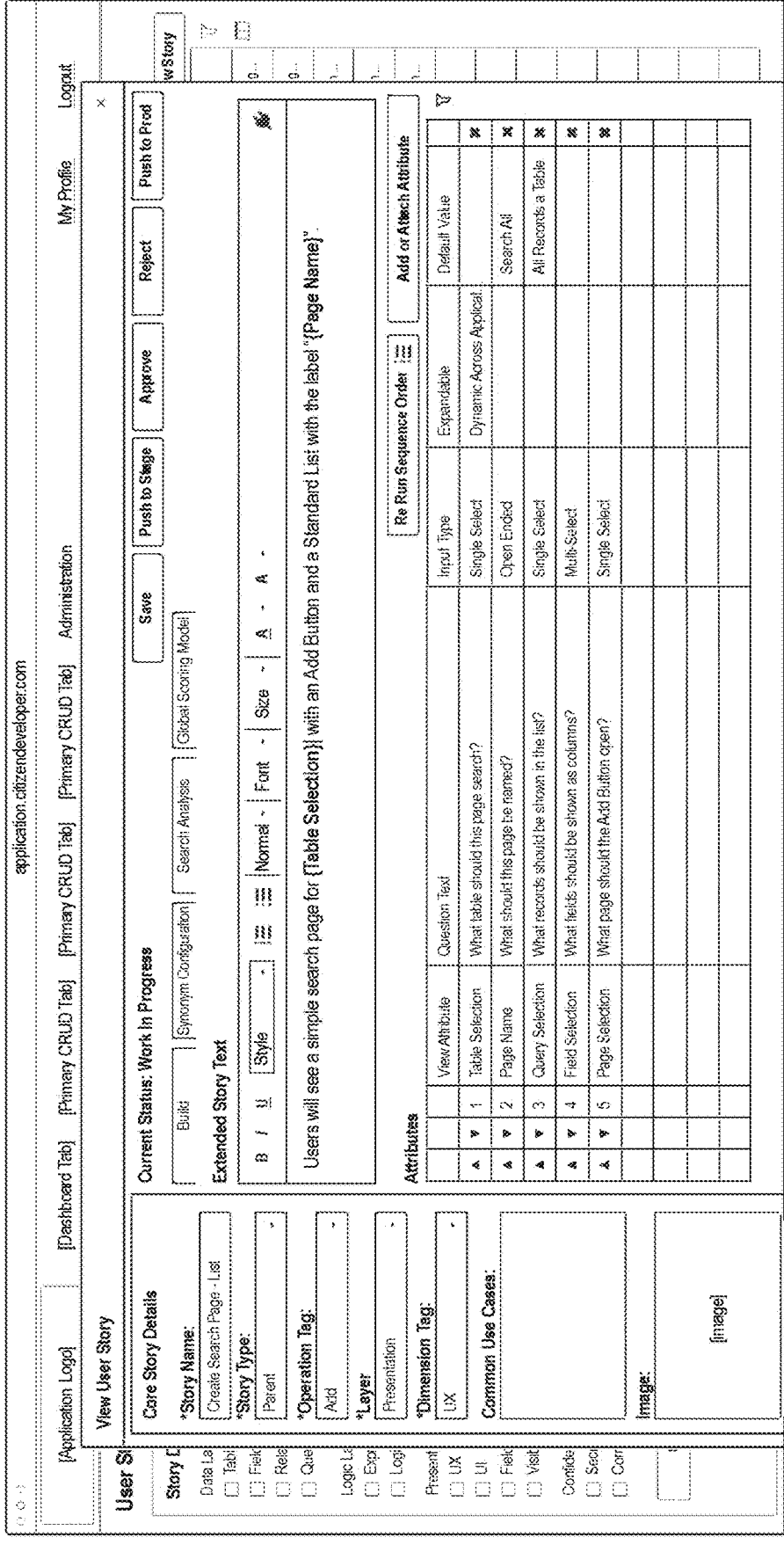

FIG. 25A and FIG. 25B show a backend computer-generated user interface 2500 that allows a system administrator to view templates for computer executable computer software subtasks or computer executable user stories that have been created, according to examples of the present disclosure. As shown in FIG. 25A and FIG. 25B, backend computer-generated user interface 2500 is similar to backend computer-generated user interface 2300, but allows the system administrator to view and edit various attributes and/or fields of a particular executable computer software subtask or executable user story.

Figure 26A:
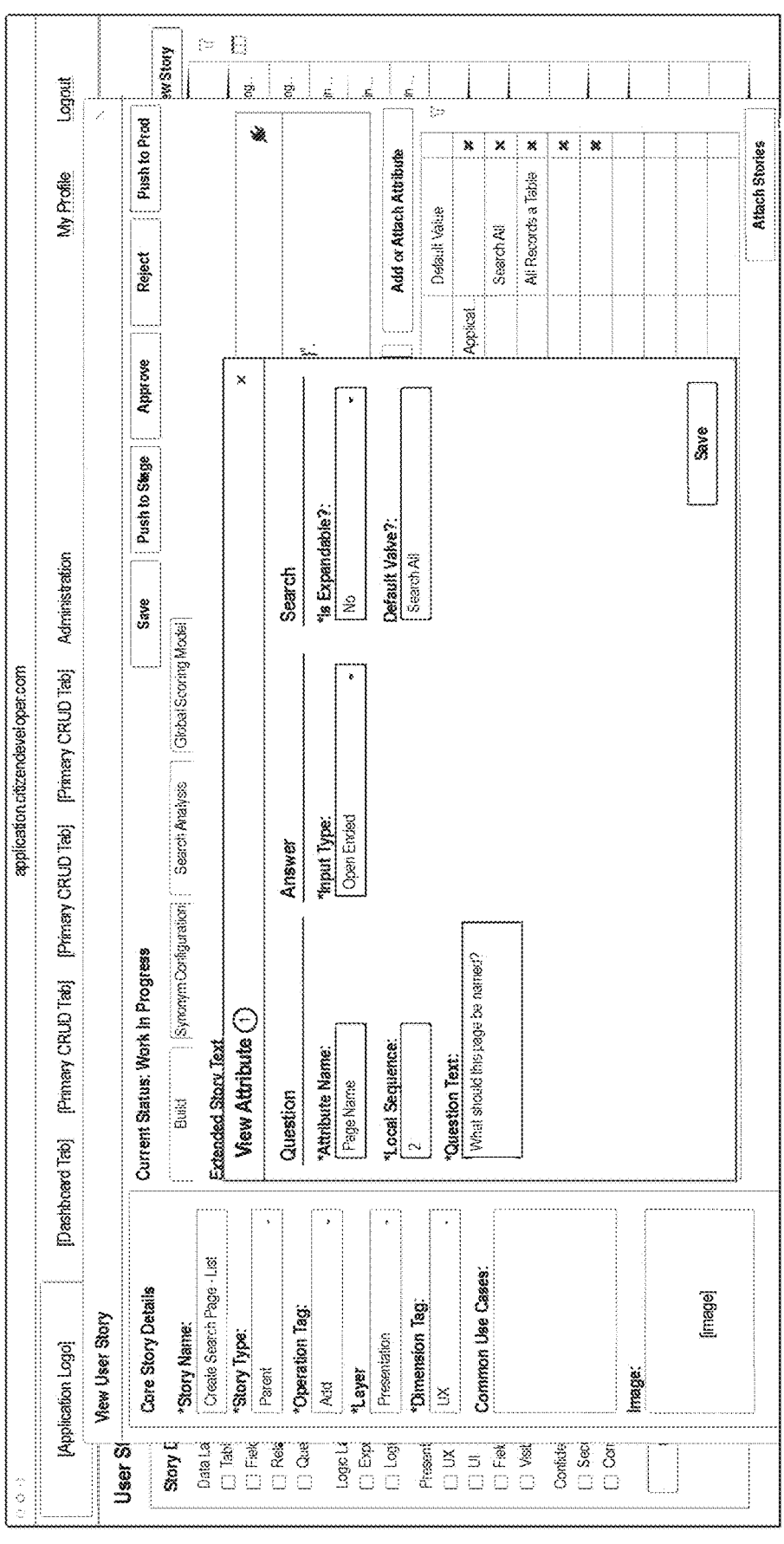

FIG. 26A and FIG. 26B show a backend computer-generated user interface 2600 that allows a system administrator to view an attribute for a selected template for computer executable computer software subtask or computer executable user story that have been created from backend computer-generated user interface 2300, according to examples of the present disclosure.

Figure 27A:
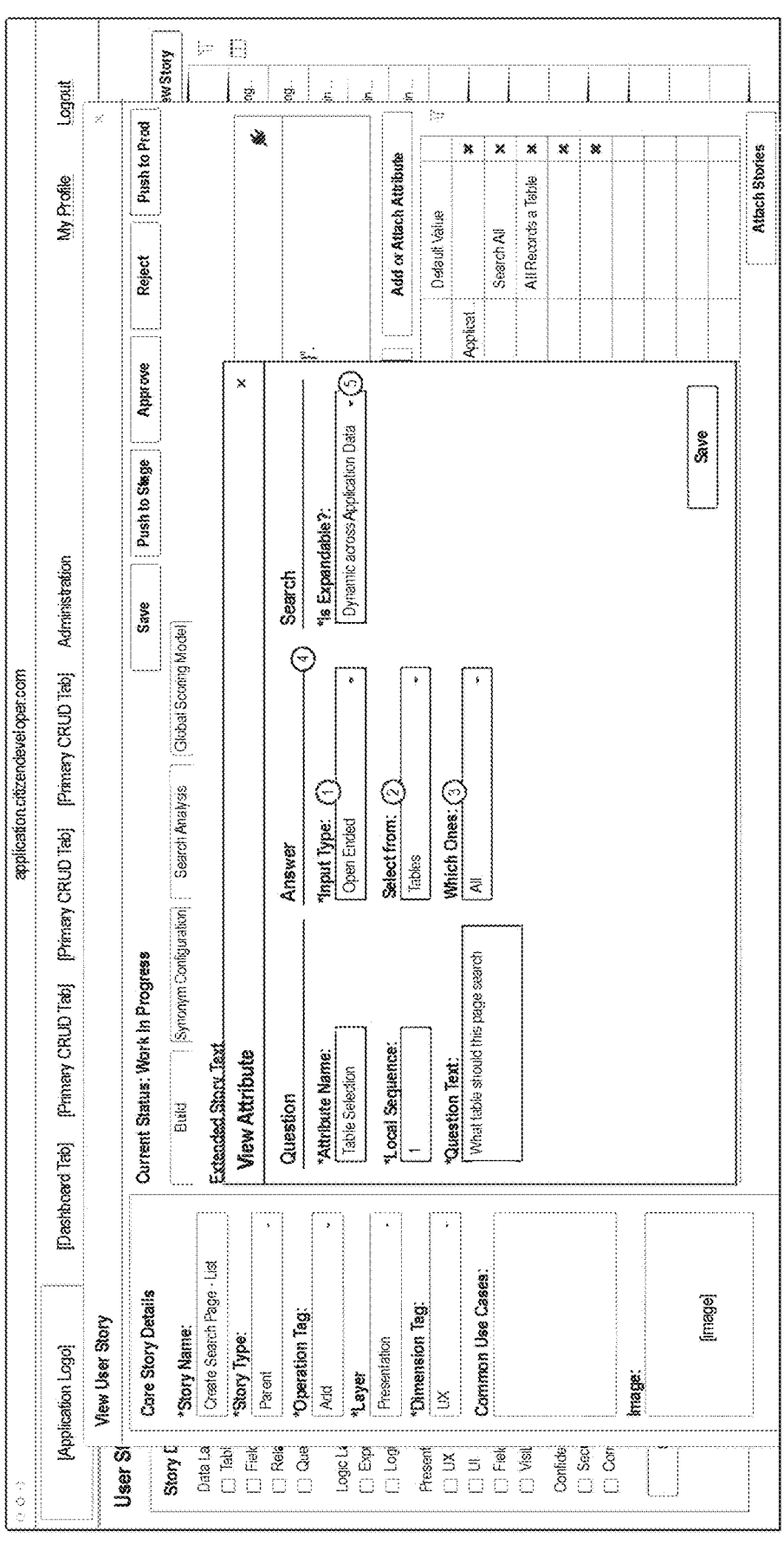

FIG. 27A and FIG. 27B show a backend computer-generated user interface 2700 that allows a system administrator to view a table selection attribute for a selected template for computer executable computer software subtask or computer executable user story that have been created from backend computer-generated user interface 2300, according to examples of the present disclosure.

Figure 28A:
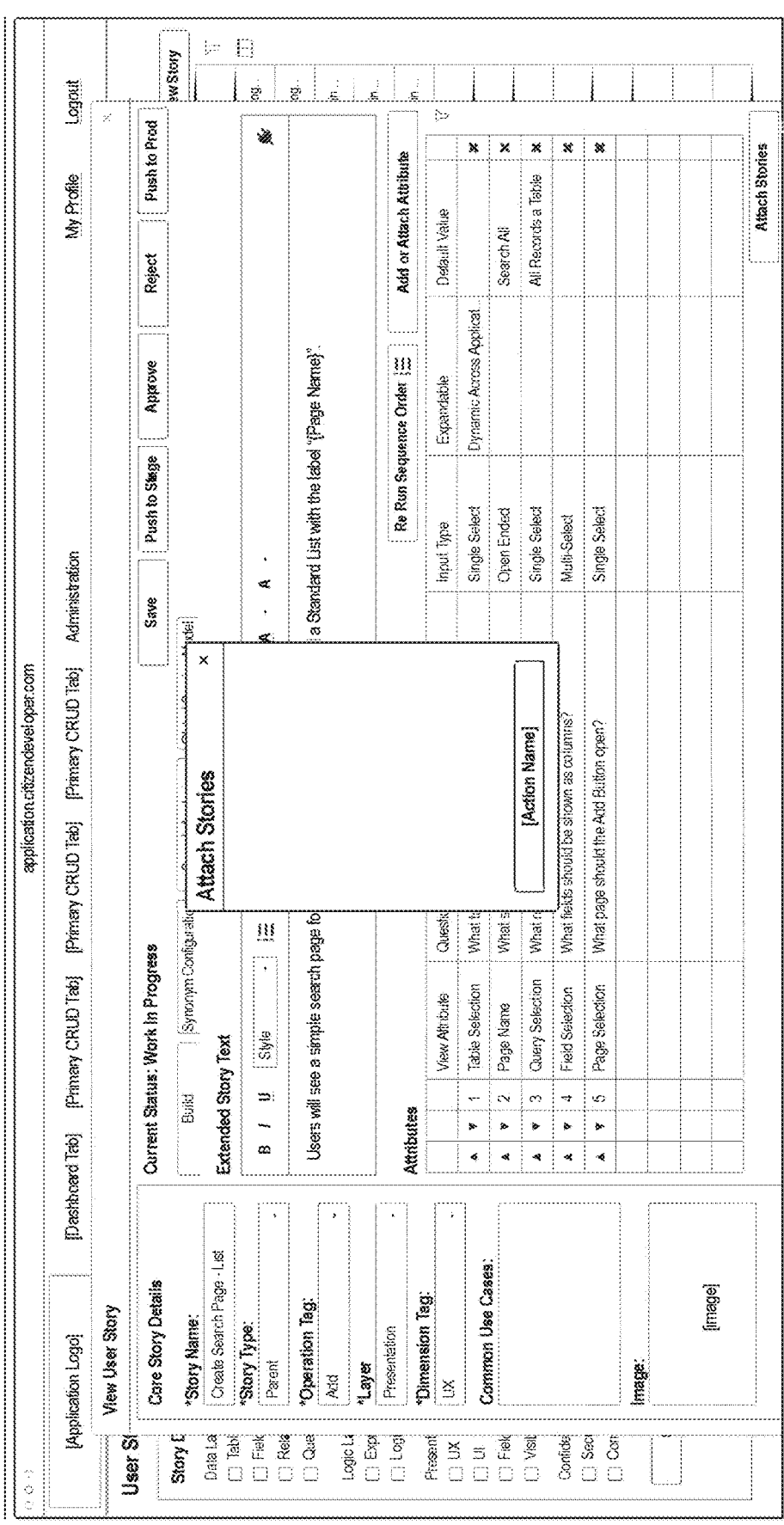

FIG. 28A and FIG. 28B show a backend computer-generated user interface 2800 that allows a system administrator to attach a selected template for computer executable computer software subtask or computer executable user story that have been created from backend computer-generated user interface 2300, according to examples of the present disclosure.

Figure 29A:
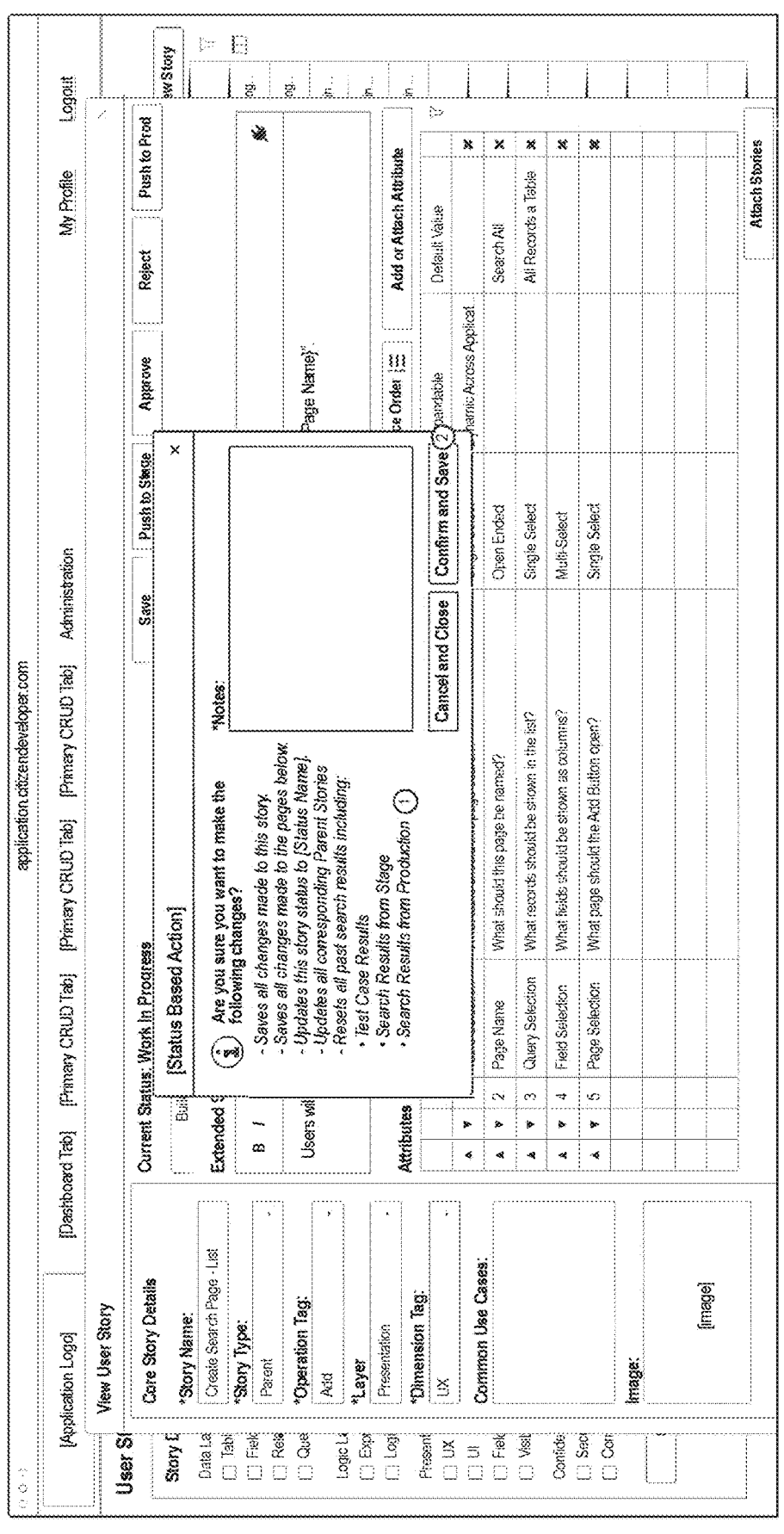

FIG. 29A and FIG. 29B show a backend computer-generated user interface 2900 that allows a system administrator to change a status of a selected template for computer executable computer software subtask or computer executable user story that have been created from backend computer-generated user interface 2300, according to examples of the present disclosure.

Figure 30A:
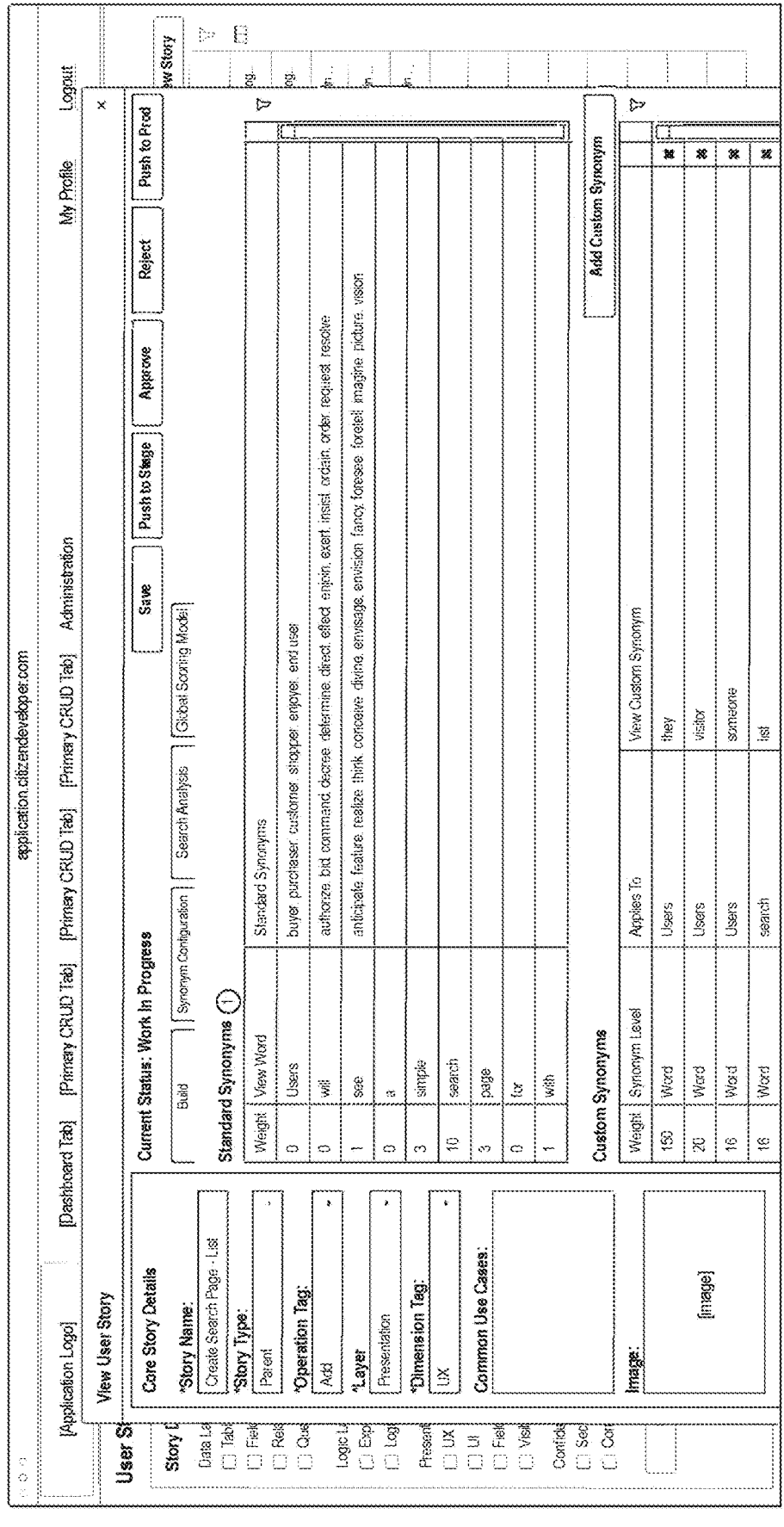

FIG. 30A and FIG. 30B show a backend computer-generated user interface 3000 that allows a system administrator to manage a synonym configuration for one or more selected template for computer executable computer software subtasks or computer executable user stories that have been created from backend computer-generated user interface 2300, according to examples of the present disclosure. For example, the system administrator can manually add or remove records from a standard synonym list. The list of synonyms can be auto-generated and managed using a computer software subtask text interface, a user story text interface, or an application programming interface.

Figure 31A:
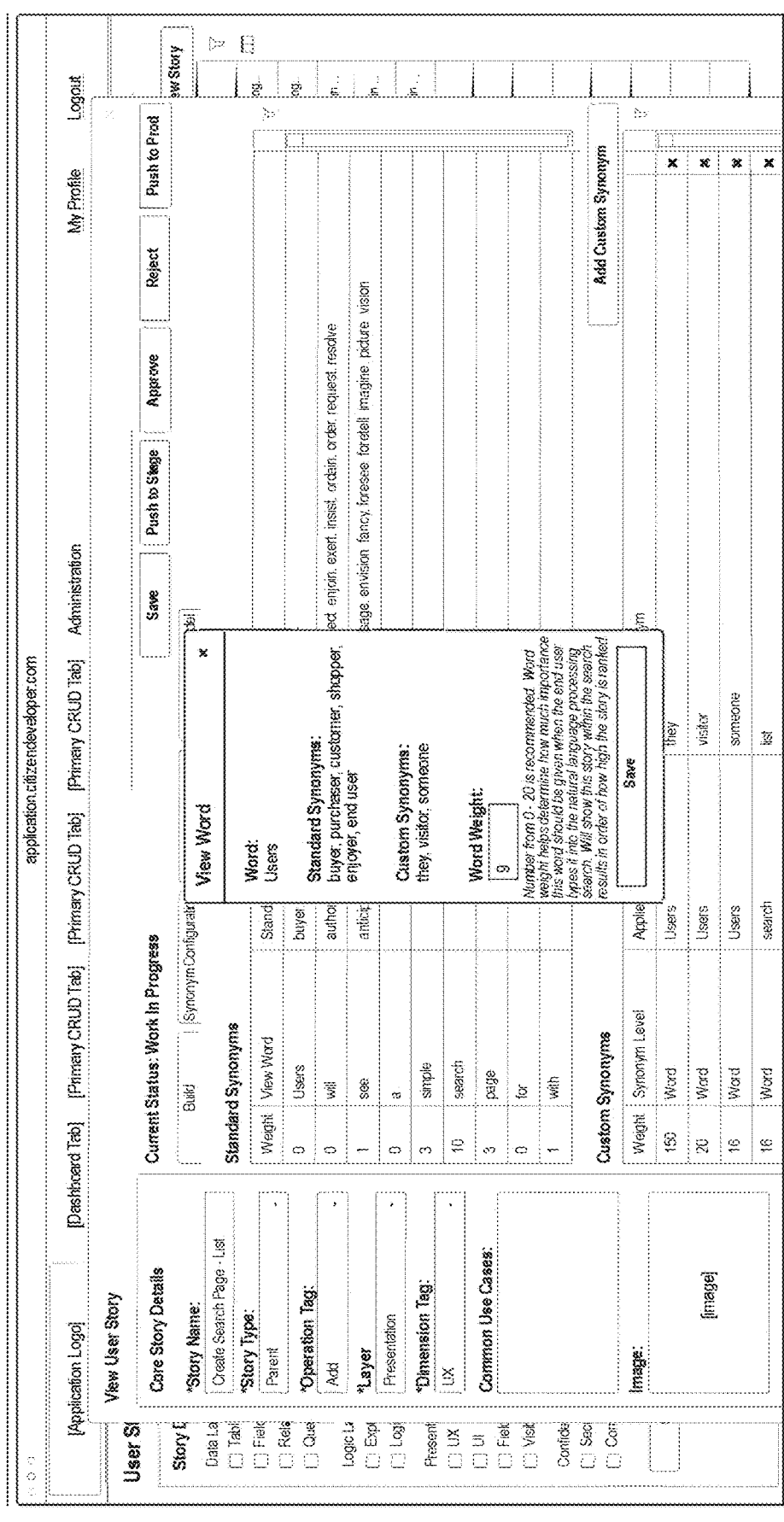

FIG. 31A and FIG. 31B show a backend computer-generated user interface 3100 that allows a system administrator to a view a word attribute from the list of synonyms for a selected template for computer executable computer software subtask or computer executable user story that have been created from backend computer-generated user interface 2300, according to examples of the present disclosure.

Figure 32A:
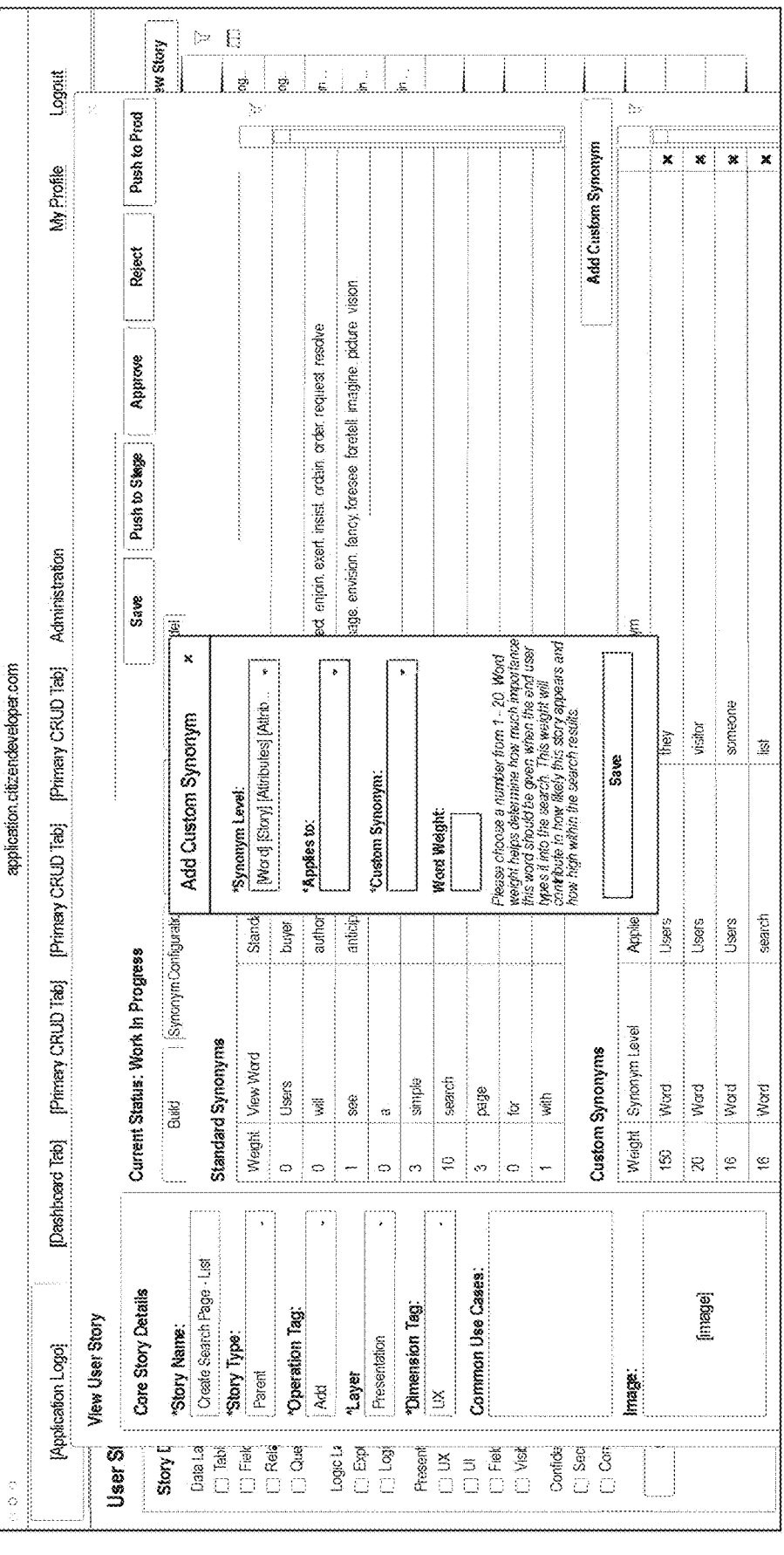

FIG. 32A and FIG. 32B show a backend computer-generated user interface 3200 that allows a system administrator to add a custom synonym from the list of synonyms for a selected template for computer executable computer software subtask or computer executable user story that have been created from backend computer-generated user interface 2300, according to examples of the present disclosure.

Figure 33A:
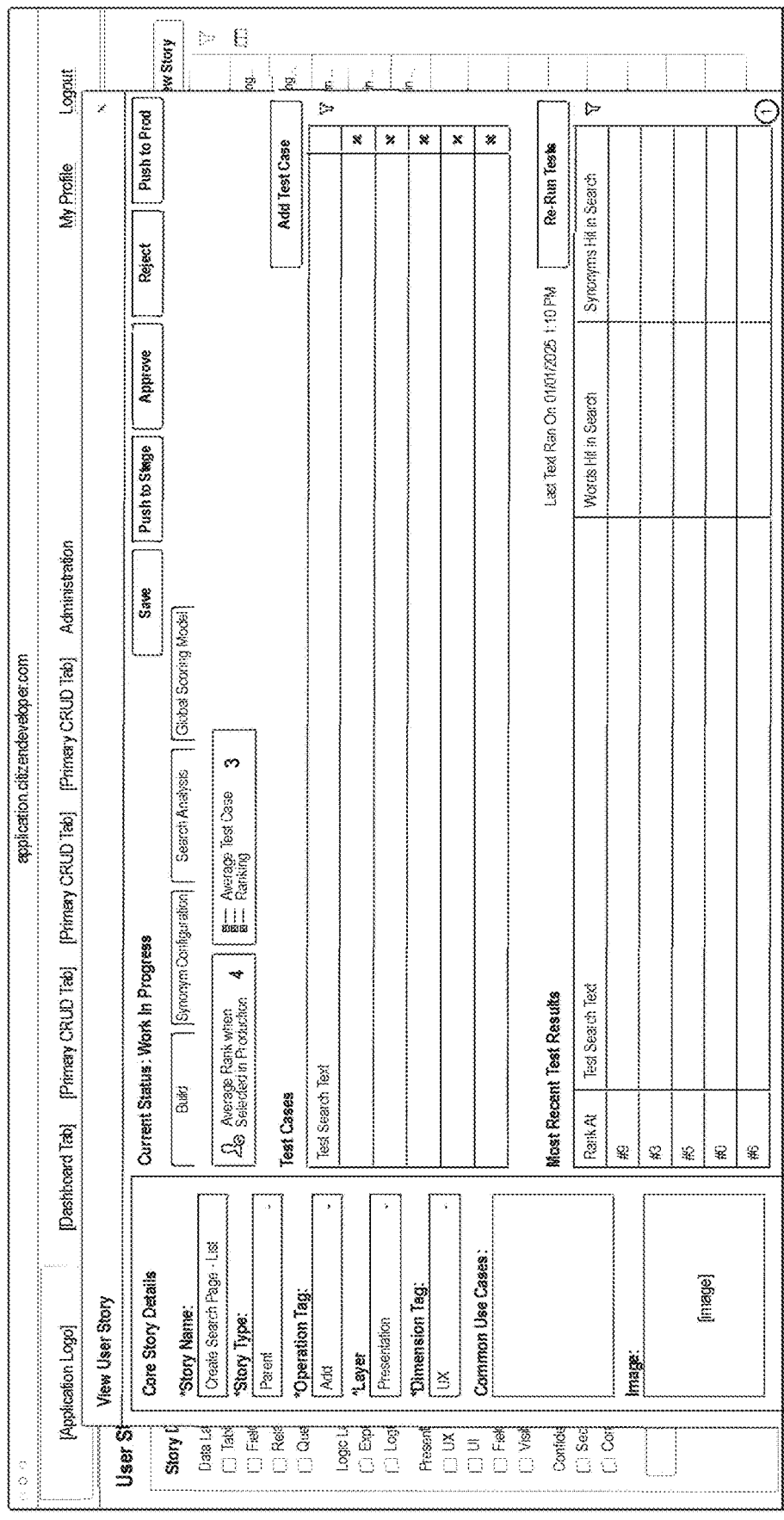

FIG. 33A and FIG. 33B show a backend computer-generated user interface 3300 that allows a system administrator to view a search analysis for a selected template for computer executable computer software subtasks or computer executable user stories that have been created from backend computer-generated user interface 2300, according to examples of the present disclosure. For example, the search analysis can include, but are not limited to, a list of all the words and synonyms that the search hit on, the score of each, and how those scores add up.

Figure 34A:
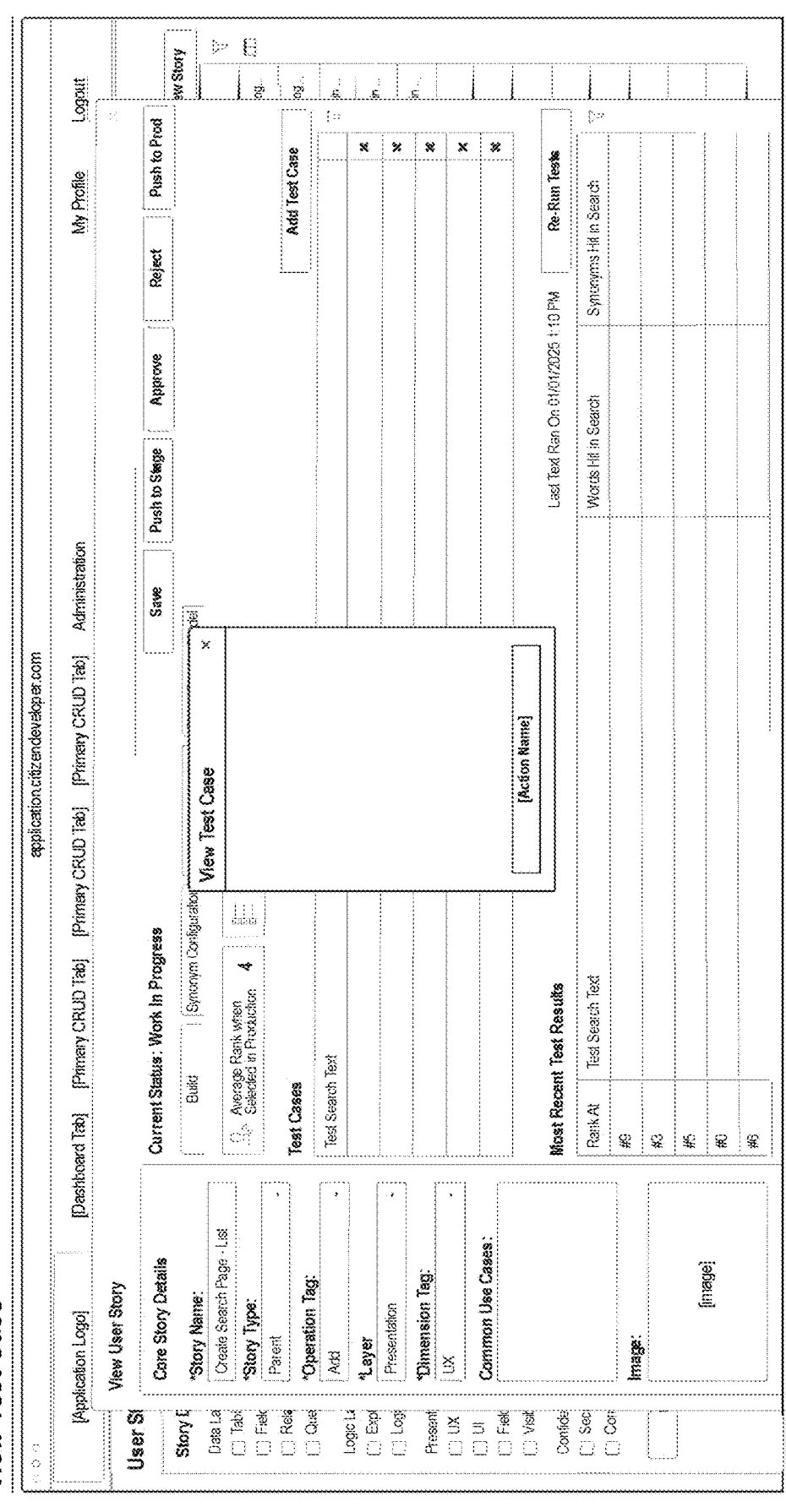

FIG. 34A and FIG. 34B show a backend computer-generated user interface 3400 that allows a system administrator to view a test case for a selected template for computer executable computer software subtasks or computer executable user stories that have been created from backend computer-generated user interface 2300, according to examples of the present disclosure.

Figure 35A:
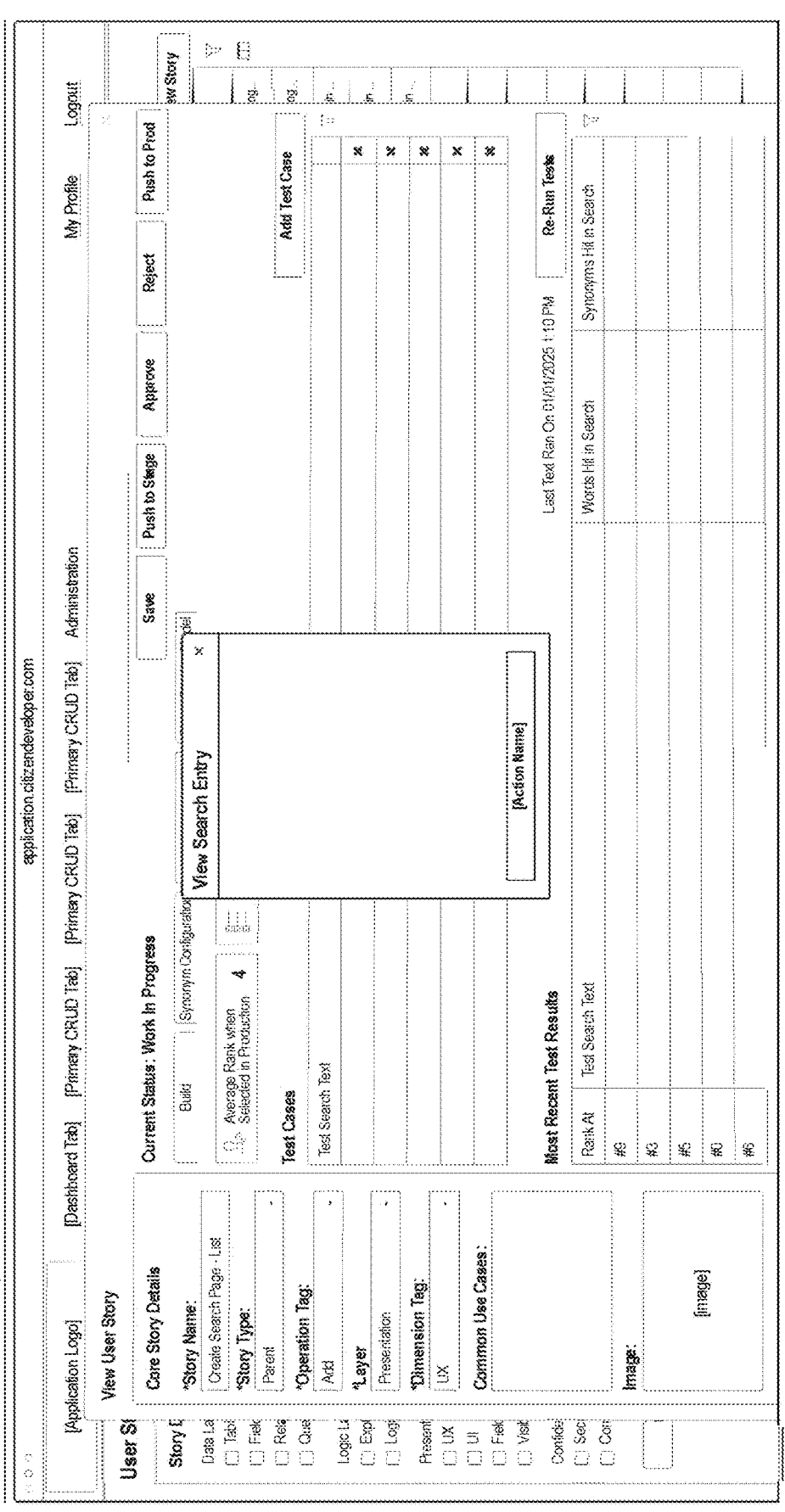

FIG. 35A and FIG. 35B show a backend computer-generated user interface 3500 that allows a system administrator to view a search entry for a selected template for computer executable computer software subtasks or computer executable user stories that have been created from backend computer-generated user interface 2300, according to examples of the present disclosure.

In some examples, the backend computer-generated user interface can allow a system administrator to view a scoring model for a selected template for computer executable computer software subtasks or computer executable user stories that have been created from backend computer-generated user interface 2300, according to examples of the present disclosure. For example, the scoring model can include one or more scoring settings that can include, but are not limited to, a scoring level, a scoring level options of word story, attribute, multiplier if an exact match is found, and/or a multiplier if a synonym match is found. The backend computer-generated user interface can allows a system administrator to view a scoring setting for a selected template for computer executable computer software sub-tasks or computer executable user stories that have been created from backend computer-generated user interface 2300, according to examples of the present disclosure.

FIG. 36 shows method 3600 that comprises receiving, by a software task creation computer-generated user interface, a user provided software task descriptor, as in 3602. Method 3600 further comprises providing a software task created computer-generated user interface based on the user provided software task descriptor, as in 3604. Method 3600 further comprises providing a software subtask builder computer-generated user interface based on a user selected software task on the software task created computer-generated user interface, wherein the software subtask builder computer-generated user interface comprises one or more user selectable software subtasks, as in 3606. Method 3600 further comprises receiving a first software subtask selection from the one or more user selectable software subtasks provided by the software subtask builder computer-generated user interface, as in 3608. Method 3600 further comprises creating, by a hardware processor, a first computer-executable software subtask application based on the first software subtask, as in 3610.

FIG. 37 shows method 3700 that comprises providing a software subtask builder computer-generated user interface, wherein the software subtask builder computer-generated user interface comprises one or more user searchable and selectable software subtasks, as in 3702. Method 3700 further comprises receiving a first software subtask selection from the one or more user searchable and selectable software subtasks provided by the software subtask builder computer-generated user interface, as in 3704. Method 3700 further comprises creating, by a hardware processor, a first computer-executable software subtask application based on the first software subtask, as in 3706. For example, the first computer-executable software subtask application can be created using a compiler, an interpreter and complier, or other similar type software programs that translates a programming language source code into machine code, byte-code, or another programming language.

For example, the process includes building a logical tree and tracing through each branch of that tree for execution. In one non-limiting example, the process operates by as follows. Frist, the first epic (or software task) and the first user story (or software subtask), which itself is composed of a tree of sub user stories (or software sub-subtasks), is obtained. The process then takes the top branch of that tree (a branch is a trace of epic to user story to sub user story and so on to the lowermost sub user story). Each lowermost sub story is a unique branch that contains executable content and executes that functionality in order. The process continues by building functionality by working through each branch from top to bottom, one branch at a time, executing the content of the lowermost sub story of the branch. Then, the process moves to the next user story.

In the above non-limiting example, the stories can be processed in parallel when possible, and in sequence elsewhere. When a user selects a story (or software subtask) to add to an epic (or software task), the sequencing can be important—as fields have to exist before they can be attached to other fields, or pages. In the below example, parent node 1 for software task 1 has three child sub-nodes (denoted as 1.1, 1.2, and 1.3) for software subtask 1, software subtask 2, and software subtask 3, and one child sub-node (1.2) has two children sub-sub nodes (denoted as 1.2.1 and 1.2.2) for software sub-subtask 1 and software sub-subtask 2. Parent node 2, which is executed in parallel with parent node 1, for software task 2 has one child sub-node (denoted as 2.1) for software subtask 3, which is a parent node for two children sub-sub nodes (denoted as 2.1.1 and 2.1.2) for software sub-subtask 4 and sub-subtask 5. Child node 2.1.1 is also a parent node for children nodes (denoted as 2.1.1.1 and 2.1.1.2).

Parent—1
    Child—1.1
    Child—1.2 [which is a parent]
    Child—1.2.1
    Child—1.2.2
    Child—1.3
Parent 2 [Happening in Parallel with Parent 1]
    Child—2.1 [which is a parent]
    Child—2.1.1 [which is a parent]
    Child—2.1.1.1
    Child—2.1.1.2
    Child—2.1.2

In the above example, the children under a given parent run in sequence and the top-level parents run in parallel. At the end, when the very final elements are made permanent, everything can be run in parallel because all of the dependencies have previously been met. So, in the example above, the branches for Parent 1 would be ordered as Child 1.1, Child 1.2.1, Child 1.2.2, Child 1.3. The branches for Parent 2 would be ordered as Child 2.1.1.1, Child 2.1.1.2, then Child 2.1.2. These branches would each be run in order or in parallel, building actual software functionality based on the information in the branch.

In some examples, the software subtask builder computer-generated user interface that is provided is based on or with respect to a user selected software task on the software task created computer-generated user interface. In some examples, the sub task may be optionally based on the existence of some task. In other words, the list of sub tasks that populate the search interface are dependent upon the search string the user enters, and may not be dependent on the text of the task or epic. In this example, the task or epic is just a categorization. In some examples, a subtask can have a plurality of sub-sub-tasks, and those sub-sub-tasks are dependent on the sub-task, and vary based on the sub-task chosen. However, in this example, the sub-task is not dependent on the task. So, sub-sub-tasks are dependent on sub-tasks, but sub-tasks are not dependent on tasks.

The following are examples of user story patterns by story dimension according to examples of the present disclosure. The following example story patterns can be stored in one or more computer readable storage media (i.e., databases) in a variety of manners of the computer system of FIG. 38.

Example 1. The story name is "delete table" and the operation is "delete." The primary story is that the field {Table Selection} table will be deleted and users will no longer be able to manage the field {Table Selection} records.

Example 2: The story name is "rename table" and the operation is "change." The primary story will rename the field {Table Selection} table to field {Table Name}.

Example 3: The story name is "create empty table" and the operation is "add." The primary story is that users can manage records in a field {Table Name} table.

Example 4: The story name is "create event table" and the operation is "add." The synonyms for event can be meeting, appointment, and task. The primary story is that users can manage records in a field {Table Name} table that stores common event data. The configuration questions for this story can include the following: 1. Field for Start Date/Time Defaults to field with Start Date Time tag; 2. Field for End Date/Time Defaults to field with End Date Time tag; 3. Each record will be called a _____. (default to Event); 4. Multiple records in this table will be called _____. (default to Events). The stories included by default can include the following: 1. (UI) Users can manage {Events} using a List interface and 2. Create Empty Table. The optional stories can include the following: 1. (Logic) The application will send out reminder emails a fixed amount of time prior to each {Event's} Start Time; 2. (UI) Users can manage field {Events} using a Calendar interface.

Example 5: The story name is "create system log table" and the operation is "add." The primary story is that the application will include a field {Table Name} table storing system logs. Whenever a field {Event} occurs, a record will be created in this table to track its outcome. The configuration questions for this story can include the following: 1. Field to store Logs defaults to field with Log tag; 2. Event to Trigger Log Creation options: Incoming API Call, Scheduled Logic Runs; 3. Each record will be called a _____. (default to System Log); 4. Multiple records in this table will be called _____. (default to System Logs). The stories included by default can include the following: 1. (UI) Users will be able to browse and search records in the {System Log} table and 2. (Logic) The application will create a new record in the {System Log} table whenever an {Incoming API Call} occurs.

Example 6: The story name is "create other business document table" and the operation is "add." The primary story is that users can manage records in a field {Table Name} table that stores common business document data. The configuration questions for this story can include the following: 1. Type of Business Document (Options: Invoice, Purchase Order, Sales Order, Packing Slip, etc.) and 2. Field for PDF document* defaults to new PDF file field (* only applies when optional PDF story is selected). The stories included by default can include the following: 1. (UI) Users will be able to browse, search, and create records in the {Invoice/Purchase Order/etc} table. The optional stories can include the following: 1. (Logic) The application will generate a PDF document with respect to each {Table Name}; 2. (Logic) The application will send an email to the {Client/Vendor} associated with the {Table Name}, including the generated PDF as an attachment; 3. (Visibility) {Table Name} records will be view only after the Status is set to closed.

Example 7: The story name is "create communication table" and the operation is "add." The primary story is that the application will track a communication table, which tracks emails and/or SMS messages sent from the application. The configuration questions can include the following: the need to define all the communication fields like from address, to address, subject, body, etc. The stories included by default can include the following: 1. (UI) Users will be able to browse and search records in the field {Communication} table and 2. (Logic) The application will create a communication record whenever an Email and/or SMS is sent.

Example 8: The story name is "create transaction table" and the operation is "add." The primary story is that users can manage records in a field {Table Name} table. This table will store common transaction data and will allow financial adjustments to be made to various accounts. The stories included by default can include the following: 1. (UI) Users will be able to browse, search and add records in the field {Transaction} table. The optional stories can include the following: 1. (Logic) The application will include automation to adjust the balance on accounts whenever Transactions are created in the application.

Example 9: The story name is "create lookup table" and the operation is "add." The primary story is that users can manage records in a field {Table Name} table, which will be used to calculate values on field {Table Selection}. The stories included by default can include the following: 1. (UI) Users will be able to manage records in the field {Lookup Table} and 2. (Logic) The application will include logic to lookup and calculate values based on a matching {Value} in the {Lookup Table}.

Example 10: The story name is "create import table" and the operation is "add." The primary story is users will be able to import field {Table Selection} records, and the application will track a record in the field {Table Name} table as a history of this activity. The stories included by default can include the following: 1. (UI) Users will be able to search and browse records in the {Import} table; 2. (UI) Users will be able to {Import} records by {Uploading} a CSV spreadsheet; and 3. (Logic) The application will include logic to {Import} data in the {Target Table}.

Example 11: The story name is "create export table" and the operation is "add." The primary story is users will be able to export field {Table Selection} records, and the application will track a record in the field {Table Name} table as a history of this activity. The stories included by default can include the following: 1. (UI) Users will be able to search and browse records in the field {Export} table; 2. (UI) Users will be able to field {Export} records by field {Generating} a CSV spreadsheet; and 3. (Logic) The application will include logic to field {Export} data in the field {Target Table}.

Example 12: The story name is "create invoice table" and the operation is "add." The primary story is users can manage records in a field {Table Name} table that stores common invoice data. The configuration questions can include the following: 1. Field for PDF document* defaults to new PDF file field * only applies when optional PDF story is selected. The stories included by default can include the following: 1. (UI) Users will be able to browse, search, and create records in the field {Invoice/Purchase Order/etc} table. The optional stories can include the following: 1. (Logic) The application will generate a PDF document with respect to each {Table Name}; 2. (Logic) The application will send an email to the field {Client/Vendor} associated with the {Table Name}, including the generated PDF as an attachment; 3. (Visibility) Field {Table Name} records will be view only after the status is set to closed.

Example 13: The story name is "create purchase order table" and the operation is "add." The primary story is users can manage records in a field {Table Name} table that stores common purchase order data. The configuration questions can include the following: 1. Field for PDF document* defaults to new PDF file field (* only applies when optional PDF story is selected). The stories included by default can include the following: 1. (UI) Users will be able to browse, search, and create records in the field {Invoice/Purchase Order/etc} table. The optional stories can include the following: 1. (Logic) The application will generate a PDF document with respect to each field {Table Name}; 2. (Logic) The application will send an email to the field {Client/Vendor} associated with the {Table Name}, including the generated PDF as an attachment; and 3. (Visibility) Field {Table Name} records will be view only after the Status is set to closed.

Example 13: The story name is "create statement table" and the operation is "add." The primary story is users can manage records in a field {Table Name} table that stores common statement data. The configuration questions can include the following: 1. Field for PDF document* defaults to new PDF file field (* only applies when optional PDF story is selected). The stories included by default can include the following: 1. (UI) Users will be able to browse, search, and create records in the field {Invoice/Purchase Order/etc} table. The optional stories can include the following: 1. (Logic) The application will generate a PDF document with respect to each field {Table Name}; 2. (Logic) The application will send an email to the field {Client/Vendor} associated with the field {Table Name}, including the generated PDF as an attachment; and 3. (Visibility) Field {Table Name} records will be view only after the status is set to closed.

Example 14: The story name is "create company table" and the operation is "add." The primary story is users can manage records in a field {Table Name} table that stores common company data. The configuration questions can include the following: 1. Each record will be called a _____. (default to Company) and 2. Multiple records in this table will be called _____. (default to Companies). The stories included by default can include the following: 1. (Table) Users can manage records in a field {Table Name} table; 2. (Fields) The field {Table Selection} table will include common company fields; 3. (UX) Users will see a navigation tab in the header for field {Table Selection}. This page will be a standard search page with a standard Add page and a standard view/edit page; 4. (Logic) Application will set the field {Field Selection} field for each new {Table Selection} to the next sequential number . . . [Field Selection defaults to the company ID field from the UDM template]; 5. (Logic) Application will store the Date-Time a new field {Table Selection} record is created in its {Field Selection . . . default to Created On time from UDM Template}. The optional stories can include the following: set created by enable audit logs, and add simple auditing. Alternative stories can include the following: create empty table; create event table; create system log table; create other business. The alternative story related to the document table can include the following: create communication table; create transaction table; create lookup table; create invoice table; create purchase order table; create statement table; create file table; create location table; create person table; and create product table.

Example 15: The story name is "create file table" and the operation is "add. The primary story is users can manage records in a field {Table Name} table that stores common file data. The stories included by default can include the following: 1. (UX) Users can manage field {Files} using a list interface.

Example 16: The story name is "create location table" and the operation is "add." The primary story is users can manage records in a field {Table Name} table that stores common location data. The stories included by default can include the following: 1. (UX) Users can manage field {Locations} using a list interface. The optional stories can include the following: 1. (UI) Users can manage field {Locations} using a map interface.

Example 17: The story name is "create person table" and the operation is "add." The primary story is users can manage records in a field {Table Name} table that stores common person data. The stories included by default can include the following: 1. (UX) Users can manage field {People} using a list interface.

Example 18: The story name is "create product table" and the operation is "add." The primary story is users can manage records in a field {Table Name} table that stores common product data. The stories included by default can include the following: 1. (UX) Users can manage field {Products} using a list interface.

Example 19: The story name is "enable audit logs" and the operation is "change." The configuration questions can include the following: 1. What table should be audited?

Example 20: The story name is "convert field to different type (PRESERVE DATA)" and the operation is "change." The story description will change the field {Field Name} field on the field {Table Selection} table from a field {Original Field Type} field to a field {New Field Type} field. The configuration questions can include the following: If new field type is static select: 1. Options available to User. If new field type is dynamic select: 1. Table to select from 2. Relationship to manage . . . etc. (each field type may have some type-specific configuration questions; may want each field type to have its own story instead of having field type be a variable in a single story). The stories included by default can include the following: 1. New Field "FIELD NAME" and 2. Conversion Script.

Example 21: The story name is "convert field to different type (DELETE EXISTING DATA)" and the operation is "change." The story description will change the field {Field Name} field on the field {Table Selection} table from a field {Original Field Type} field to a field {New Field Type} field. The configuration questions include the following: If new field type is Static Select: 1. Options available to User. If new field type is Dynamic Select: 1. Table to select from 2. Relationship to manage . . . etc. (each field type may have some type-specific configuration questions; may want each field type to have its own story instead of having field type be a variable in a single story). The stories included by default can include the following: 1. Delete "FIELD SELECTION" and 2. Create New Field "FIELD NAME".

Example 22: The story name is "delete field" and the operation is "delete." The story description will delete the field {Field Name} field from the field {Table Selection} table. The configuration questions can include the following: 1. Does data need to be converted to a different format or storage location? and 2. Where does converted data need to be stored?

Example 23: The story name is "create address field" and the operation is "add." The story description will track an address field called field {Field Name} on field {Table Selection}. Alternatively, users will be able to enter a field {Field Name} on field {Table Selection} records in an address field. The optional stories can include the following: 1. Allow only US Addresses and 2. Allow International Addresses.

Example 24: The story name is "create authorize net payment field," the synonyms for this story can include integrate, integration, or pay, and the operation is "add." The story description will create an Authorize. Net field called field {Field Name} on field {Table Selection}. 1. What field has the total Amount to be Paid?

Example 25: The story name is "create CAPTCHA field" and the operation is "add." The story description will create a CAPTCHA field called field {Field Name} on field {Table Selection}.

Example 26: The story name is "create calendar field" and the operation is "add." The story description will create a Calendar field called field {Field Name} on field {Table Selection}. The stories included by default can include Calendar Event Records.

Example 27: The story name is "create checkbox field" and the operation is "add." The story description will track a Checkbox field called {Field Name} on {Table Selection}.

Example 28: The story name is "create colorpicker field" and the operation is "add." The story description will track a Colorpicker field called {Field Name} on {Table Selection}.

Example 29: The story name is "create content drop-down field" and the operation is "add." The story description will track a Content Drop-Down field called {Field Name} on {Table Selection}. The configuration questions can include the following: 1. Should the options be static, dynamic, or both? 2. If static: Options available. 3a) If dynamic: Records to display in the selection {Query Story Selection}. 3b) If dynamic: Name for the selections {Expression Story Selection}

Example 30: The story name is "create content tabs field" and the operation is "add." The story description will create a Content Tabs field called {Field Name} on {Table Selection}. The configuration questions can include the following: 1. Should the tab options be static, dynamic, or both?; 2. If static: Options available; 3a) If dynamic: Records to display in the tab {Query Story Selection}; and 3b) If dynamic: Name for the tabs {Expression Story Selection}.

Example 31: The story name is "create currency field" and the operation is "add." The story description will track a Currency field called {Field Name} on {Table Selection}.

Figure 38:
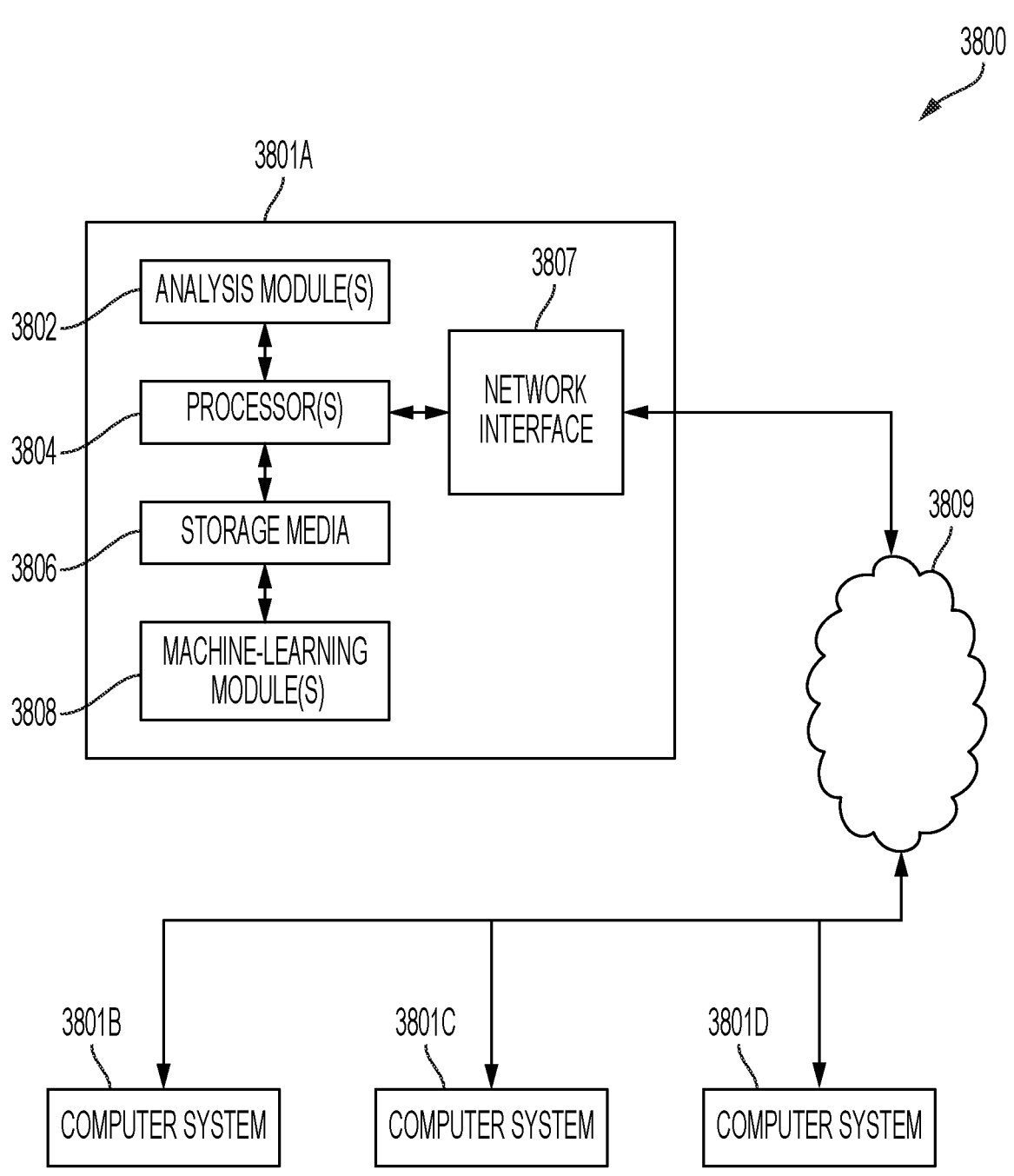
FIG. 38 illustrates a schematic view of a computing system according to examples of the present disclosure.

In some embodiments, any of the methods of the present disclosure may be executed by a computing system. FIG. 38 illustrates an example of such a computing system 3800, in accordance with some embodiments. The computing system 3800 may include a computer or computer system 3801A, which may be an individual computer system 3801A or an arrangement of distributed computer systems. The computer system 3801A includes one or more analysis module(s) 3802 configured to perform various tasks according to some embodiments, such as one or more methods disclosed herein. To perform these various tasks, the analysis module 3802 executes independently, or in coordination with, one or more processors 3804, which is (or are) connected to one or more storage media 3806. The processor(s) 3804 is (or are) also connected to a network interface 3807 to allow the computer system 3801A to communicate over a data network 3809 with one or more additional computer systems and/or computing systems, such as 3801B, 3801C, and/or 3801D (note that computer systems 3801B, 3801C and/or 3801D may or may not share the same architecture as computer system 3801A, and may be located in different physical locations, e.g., computer systems 3801A and 3801B may be located in a processing facility, while in communication with one or more computer systems such as 3801C and/or 3801D that are located in one or more data centers, and/or located in varying countries on different continents). A processor can include a microprocessor, microcontroller, processor module or subsystem, programmable integrated circuit, programmable gate array, or another control or computing device.

The storage media 3806 can be implemented as one or more computer-readable or machine-readable storage media. The storage media 3806 can be connected to or coupled with a machine learning module(s) 3808. Note that while in the example embodiment of FIG. 38 storage media 3806 is depicted as within computer system 3801A, in some embodiments, storage media 3806 may be distributed within and/or across multiple internal and/or external enclosures of computing system 3801A and/or additional computing systems. Storage media 3806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 3800 is only one example of a computing system, and that computing system 3800 may have more or fewer components than shown, may combine additional components not depicted in the example embodiment of FIG. 38, and/or computing system 3800 may have a different configuration or arrangement of the components depicted in FIG. 38. The various components shown in FIG. 38 may be implemented in hardware, software, or a combination of both hardware and software, including one or more signal processing and/or application specific integrated circuits.

Further, the steps in the processing methods described herein may be implemented by running one or more functional modules in an information processing apparatus such as general-purpose processors or application specific chips, such as ASICs, FPGAs, PLDs, or other appropriate devices. These modules, combinations of these modules, and/or their combination with general hardware are all included within the scope of protection of the invention.

Models and/or other interpretation aids may be refined in an iterative fashion; this concept is applicable to embodiments of the present methods discussed herein. This can include the use of feedback loops executed on an algorithmic basis, such as at a computing device (e.g., computing system 3800, FIG. 38), and/or through manual control by a user who may make determinations regarding whether a given step, action, template, model, or set of curves has become sufficiently accurate for the evaluation of the signal(s) under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:

providing a software subtask builder computer-generated user interface, wherein the software subtask builder computer-generated user interface comprises one or more user searchable and selectable software subtasks;

providing a software subtask selection computer-generated user interface based on the first software subtask selection that was received, wherein the software subtask selection computer-generated user interface comprises one or more user selectable software subtasks, wherein each of the one or more user selectable software subtasks and each of the one or more optional user selectable software sub-subtasks comprise a user-selection widget to add, remove, modify, or switch the one or more user selectable software subtasks and each of the one or more optional user selectable software sub-subtasks in the software subtask builder computer-generated user interface;

receiving a first software subtask selection from the one or more user searchable and selectable software subtasks provided by the software subtask builder computer-generated user interface; and creating, by a hardware processor, a first computer-executable software subtask application based on the first software subtask.

2. The method of claim 1, further comprising receiving, by a software task creation computer-generated user interface, a user provided software task descriptor.

3. The method of claim 2, further comprising providing a software task created computer-generated user interface based on the user provided software task descriptor.

4. The method of claim 3, wherein the software subtask builder computer-generated user interface that is provided is based on or with respect to a user selected software task on the software task created computer-generated user interface.

5. The method of claim 1, wherein the software subtask selection computer-generated user interface comprises one or more optional user-selectable software sub-subtasks.

6. The method of claim 1, wherein each of the one or more user selectable software subtasks and each of the one or more optional user selectable software sub-subtasks comprise one or more user editable fields in a software subtask descriptor string, wherein each of the one or more user editable fields allows one or more words to be replaced with one or more replacement words in the software subtask descriptor string.

7. The method of claim 1, further comprising receiving a first custom software subtask.

8. The method of claim 7, further comprising providing a custom software subtask descriptor computer-generated user interface for user entry of a custom software subtask descriptor name and description based on receiving the first custom software subtask.

9. The method of claim 1, wherein the creating the first computer-executable software sub-task application comprises matching a first element of the first software subtask selection with a first executable element stored as a first end node of a first data structure; and matching a second element of the first software subtask selection with a second executable element stored as a second end node of a first data structure; and constructing the first computer-executable software subtask application by combining the first executable element and the second executable element.

10. The method of claim 2, wherein the first task comprises an epic programming task.

11. The method of claim 1, wherein the first subtask comprises a user story programming task.

12. A computer system comprising:

a hardware processor;

a non-transitory computer readable medium that stores instructions that when executed by the hardware processor perform a method comprising:

providing a software subtask builder computer-generated user interface, wherein the software subtask builder computer-generated user interface comprises one or more user searchable and selectable software subtasks;

providing a software subtask selection computer-generated user interface based on the first software subtask selection that was received, wherein the software subtask selection computer-generated user interface comprises one or more user selectable software subtasks, wherein each of the one or more user selectable software subtasks and each of the one or more optional user selectable software sub-subtasks comprise a user-selection widget to add, remove, modify, or switch the one or more user selectable software subtasks and each of the one or more optional user selectable software sub-subtasks in the software subtask builder computer-generated user interface;

receiving a first software subtask selection from the one or more user searchable and selectable software subtasks provided by the software subtask builder computer-generated user interface; and creating, by a hardware processor, a first computer-executable software subtask application based on the first software subtask.

13. The computer system of claim 12, wherein the hardware processor is further configured to perform the method comprising receiving, by a software task creation computer-generated user interface, a user provided software task descriptor.

14. The computer system of claim 13, wherein the hardware processor is further configured to perform the method comprising providing a software task created computer-generated user interface based on the user provided software task descriptor.

15. The computer system of claim 14, wherein the software subtask builder computer-generated user interface that is provided is based on or with respect to a user selected software task on the software task created computer-generated user interface.

16. A non-transitory computer readable medium that comprises instructions that when executed by a hardware processor preform a method comprising:

providing a software subtask builder computer-generated user interface, wherein the software subtask builder computer-generated user interface comprises one or more user searchable and selectable software subtasks;

providing a software subtask selection computer-generated user interface based on the first software subtask selection that was received, wherein the software subtask selection computer-generated user interface comprises one or more user selectable software subtasks, wherein each of the one or more user selectable software subtasks and each of the one or more optional user selectable software sub-subtasks comprise a user-selection widget to add, remove, modify, or switch the one or more user selectable software subtasks and each of the one or more optional user selectable software sub-subtasks in the software subtask builder computer-generated user interface;

receiving a first software subtask selection from the one or more user searchable and selectable software subtasks provided by the software subtask builder computer-generated user interface; and creating, by a hardware processor, a first computer-executable software subtask application based on the first software subtask.

17. The non-transitory computer readable medium of claim 16, further comprising receiving, by a software task creation computer-generated user interface, a user provided software task descriptor.

\* \* \* \* \*